United States Patent
Shimada et al.

(10) Patent No.: US 6,512,899 B2
(45) Date of Patent: Jan. 28, 2003

(54) IMAGE FORMING APPARATUS CAPABLE OF PROCESSING IMAGES OF PLURAL DOCUMENTS

(75) Inventors: Bungo Shimada, Tokyo (JP); Hirohiko Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/799,706

(22) Filed: Mar. 7, 2001

(65) Prior Publication Data
US 2001/0031150 A1 Oct. 18, 2001

(30) Foreign Application Priority Data

| Mar. 7, 2000 | (JP) | 2000-061327 |
| Apr. 20, 2000 | (JP) | 2000-119166 |
| Jun. 6, 2000 | (JP) | 2000-168843 |

(51) Int. Cl.$^7$ .............................................. G03G 15/00
(52) U.S. Cl. ........................................ 399/82; 399/408
(58) Field of Search ............................... 399/52, 82, 83, 399/84, 182, 183, 329, 364, 401, 407, 408, 410, 85; 358/296, 400, 401, 442

(56) References Cited

U.S. PATENT DOCUMENTS

| 4,310,235 | A | * | 1/1982 | Lorenzo et al. | 399/84 |
| 5,243,381 | A | * | 9/1993 | Hube | 399/84 |
| 5,531,429 | A | * | 7/1996 | Clark | 399/408 X |
| 5,634,187 | A | * | 5/1997 | Ross | 399/365 |
| 5,671,463 | A | * | 9/1997 | Morikawa et al. | 399/86 |
| 5,983,051 | A | * | 11/1999 | Mishima et al. | 399/83 |
| 6,111,659 | A | * | 8/2000 | Murata | 399/83 X |

FOREIGN PATENT DOCUMENTS

JP      5136979      11/1991

\* cited by examiner

Primary Examiner—Sophia S. Chen
Assistant Examiner—Hoan Tran
(74) Attorney, Agent, or Firm—Fitzpatrick, Cella, Harper & Scinto

(57) ABSTRACT

An image forming apparatus includes a memory which stores one or more images as one document, and an image forming unit which forms on a sheet the image of the document stored in the memory. Also included is a controller which causes the image forming unit to perform the image forming of the plural documents stored in the memory, as one document. The image forming unit includes a binder for binding the sheets on which the images of the plural documents are respectively formed, as one sheaf.

33 Claims, 44 Drawing Sheets

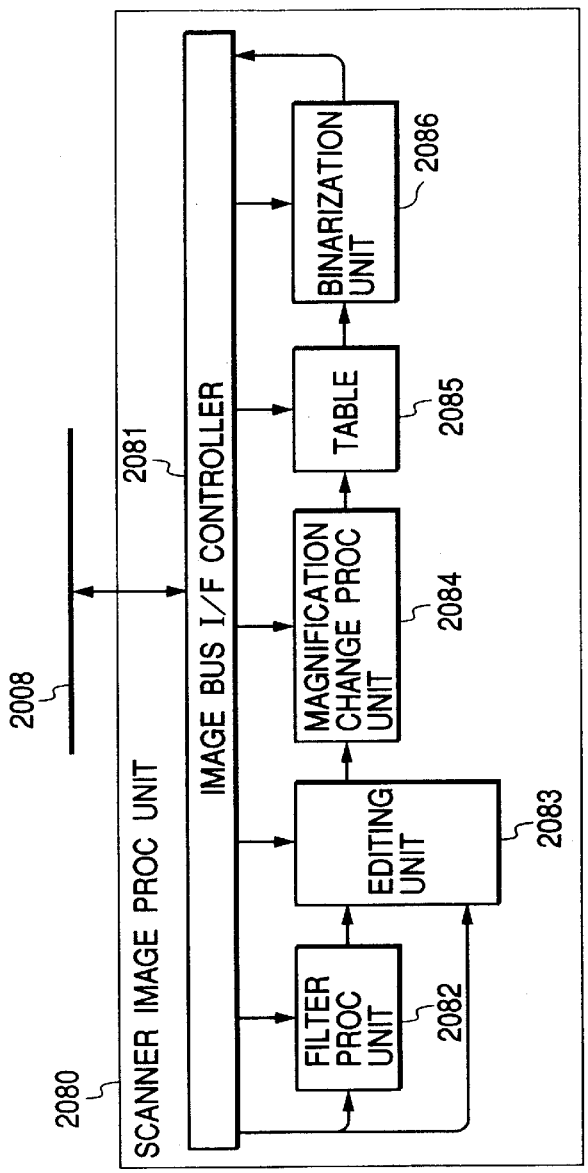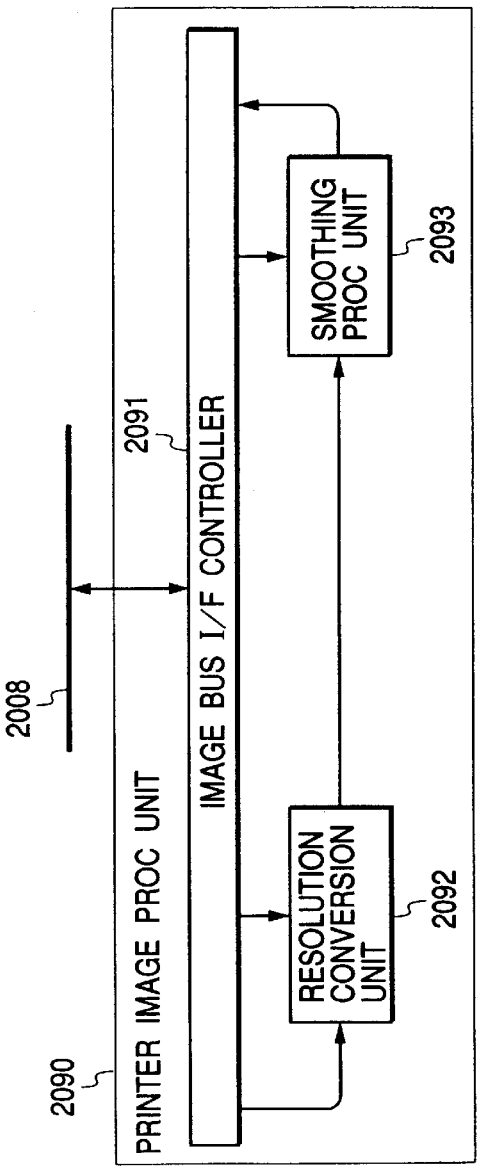

FIG. 14

```
OUTPUT SETTING
    ☐ DOCUMENT COMBINATION ~14001
    ☐ STAPLE ~14002
    [TWO-FACED PRINT SETTING]~14003
    THE NUMBER
    OF COPIES    [ 1 ]~14004

[CLOSE]                    [OUTPUT START]
      )                              )
     14005                          14006
```

FIG. 15

```
TWO-FACED PRINT : SELECTION OF KIND
 SELECT KIND OF TWO-FACED PRINT
                                    * IN DOCUMENT COMBINATION
                                         [CONTINUITY]~15003
  [DOUBLE SPREAD]  [VERTICAL SPREAD]    [NONCONTINUITY]~15004
        )                )
      15001            15002

[SETTING CANCEL]                           [OK]
        )                                     )
      15005                                 15006
```

FIG. 47

| DOCUMENT 1 -PAGE 1- | DOCUMENT 1 -PAGE 2- |
|---|---|
| DOCUMENT 1 -PAGE 3- | DOCUMENT 1 -PAGE 4- |

SHEET 1

| DOCUMENT 2 -PAGE 1- | DOCUMENT 2 -PAGE 2- |
|---|---|
| DOCUMENT 2 -PAGE 3- | DOCUMENT 2 -PAGE 4- |

SHEET 3

| DOCUMENT 1 -PAGE 5- | |
|---|---|
| | |

SHEET 2

| DOCUMENT 2 -PAGE 5- | DOCUMENT 2 -PAGE 6- |
|---|---|
| DOCUMENT 2 -PAGE 7- | |

SHEET 4

FIG. 48

| DOCUMENT 1 -PAGE 1- | DOCUMENT 1 -PAGE 2- |
|---|---|
| DOCUMENT 1 -PAGE 3- | DOCUMENT 1 -PAGE 4- |

SHEET 1

| DOCUMENT 2 -PAGE 4- | DOCUMENT 2 -PAGE 5- |
|---|---|
| DOCUMENT 2 -PAGE 6- | DOCUMENT 2 -PAGE 7- |

SHEET 3

| DOCUMENT 1 -PAGE 5- | DOCUMENT 2 -PAGE 1- |
|---|---|
| DOCUMENT 2 -PAGE 2- | DOCUMENT 2 -PAGE 3- |

SHEET 2

FIG. 49

| STORAGE MEDIUM SUCH AS FD, CD-ROM, ETC. |
|---|
| DIRECTORY INFORMATION |
| 1ST DATA PROC PROGRAM<br>PROGRAM CODE GROUP CORRESPONDING TO STEPS OF FLOW CHART SHOWN IN FIG. 25 |
| 2ND DATA PROC PROGRAM<br>PROGRAM CODE GROUP CORRESPONDING TO STEPS OF FLOW CHART SHOWN IN FIG. 33 |
| 3RD DATA PROC PROGRAM<br>PROGRAM CODE GROUP CORRESPONDING TO STEPS OF FLOW CHART SHOWN IN FIG. 43 |
| 4TH DATA PROC PROGRAM<br>PROGRAM CODE GROUP CORRESPONDING TO STEPS OF FLOW CHART SHOWN IN FIG. 44 |
| 4TH DATA PROC PROGRAM<br>PROGRAM CODE GROUP CORRESPONDING TO STEPS OF FLOW CHART SHOWN IN FIG. 45 |
| 4TH DATA PROC PROGRAM<br>PROGRAM CODE GROUP CORRESPONDING TO STEPS OF FLOW CHART SHOWN IN FIG. 46 |
|  |

MEMORY MAP OF STORAGE MEDIUM

FIG. 56

STORAGE MEDIUM SUCH AS FD, CD-ROM, ETC.

| DIRECTORY INFORMATION |
|---|
| 1ST DATA PROC PROGRAM<br>PROGRAM CODE GROUP CORRESPONDING TO<br>STEPS OF FLOW CHART SHOWN IN FIG. 25 |
| 2ND DATA PROC PROGRAM<br>PROGRAM CODE GROUP CORRESPONDING TO<br>STEPS OF FLOW CHART SHOWN IN FIG. 55 |
| |

MEMORY MAP OF STORAGE MEDIUM

IMAGE FORMING APPARATUS CAPABLE OF PROCESSING IMAGES OF PLURAL DOCUMENTS

BACKGROUND OF THE INVENTION

1. Field of the Invention

The present invention relates to an image forming apparatus capable of processing plural documents as one document, a control method thereof, a storage medium and the like.

2. Related Background Art

For example, in a conventional image processing system which includes image forming apparatuses such as a copying machine, a printer, a fax machine and the like, in case of outputting stored images, even if plural documents are selected, these selected documents are output respectively as separate jobs.

However, in the conventional image processing system, for example, even when the plural documents are selected and printed, these selected documents are printed respectively as separate jobs. Thus, since finishing such as stapling or the like is performed in the unit of document, the plural documents can not be stapled together.

Further, since the plural documents are also subjected to two-faced processes respectively as separate jobs, the two-faced process is performed for each document. For example, when a first document consists of three pages and a second document consists of one page, even if two-faced output is designated, two sheets are output as the output of the first document, and the back face of the output second sheet is blank. Further, one sheet is output as the output of the second document, and the back face of the output sheet is blank. Thus, the three sheets including the blank faces are resultingly output, and these blank faces can not be filled with the output documents, whereby the sheets are consumptive.

Further, as disclosed in Japanese Patent Application Laid-Open No. 5-136979, a so-called reduction layout copying function has been known. This function is to reduce and read plural original images, and arrange the read original images of the predetermined number on one sheet in the predetermined order, whereby the original images can be output and laid out on the sheets the number of which is smaller than the number of originals.

However, in the conventional image processing system, when the two-faced output is performed for the plural documents stored in a hard disk, two-faced setting is available only for each document. For example, when a document (a document 1) first processed consists of image data of plural pages, the image data of the last page of the document 1 is formed on the front face of a sheet, and image data of the first page of a document (a document 2) next processed is surely formed on the front face of another sheet, whereby the images of the plural documents can not be continuously formed on the front and back faces of the sheet. Thus, there is a problem that a user must perform a very complex operation of performing two-faced printing after editing and putting the plural documents together into one document.

Further, in an image input/output apparatus such as a conventional multifunctional machine or the like, when reduction layout output is performed to plural documents stored in a hard disk, reduction layout setting is available only for each document. Thus, for example, in a case where four originals are reduced by 50% and laid out on one sheet, when the document (the document 1) first processed consists of original image data of three pages, the image data of the document 1 is formed in the area occupying ¾ of one sheet, and the image data of the first page of the document (the document 2) next processed is surely formed on another sheet, whereby the images of the plural documents can not be continuously formed in the layout areas of the sheet. Thus, there is a problem that a user must perform a very complex operation of performing reduction layout printing after editing and putting the plural documents together into one document.

Further, in a case where the size of the image data stored in the hard disk for each document or each page is different from others, there is a problem that the image is partially dropped out when reduction layout outputting is performed for the plural documents.

Further, in the conventional image processing system, when the plural documents stored in the hard disk are output, a job is created for each document for image forming. Thus, there is a problem that the boundary between the continuous documents can not be understood or found easily.

In the conventional image processing system, there is an insert sheet function which is to insert an insert sheet (or a partition sheet). Here, the insert sheet and the partition sheet are assumed to indicate the same one, i.e., the insert sheet and the partition sheet are used as the same meaning. In this system, in order to designate the position where the insert sheet is inserted, it is necessary for an operator to first confirm the sheaf of originals, determine in this sheaf the page position where the insert sheet should be inserted, and then designate the corresponding page position in this sheaf through an operation unit or the like. Namely, there is a problem that it is very difficult to designate the page position of the arbitrarily combinable plural documents once stored in the hard disk.

SUMMARY OF THE INVENTION

The present invention was made in consideration of such problems as above included in the prior art, and an object of the present invention is to provide an image forming apparatus which copes with various needs from users in a case where plural documents are output, a control method thereof, and a storage medium.

In order to achieve the above object, the present invention provides an image forming apparatus comprising: a memory for storing one or more images as one document; an image forming unit for forming the images of the document stored in the memory, on a sheet; and a controller for causing the image forming unit to perform the image forming for the plural documents stored in the memory as one document.

Other objects and features of the present invention will become apparent from the following detailed description and the attached drawings.

BRIEF DESCRIPTION OF THE DRAWINGS

FIG. 5 is an image processing block diagram showing the image input apparatus (a scanner);

FIG. 6 is an image processing block diagram showing the image output apparatus (a printer);

FIG. 14 is a diagram showing an output setting screen displayed on the operation unit;

FIG. 15 is a diagram showing a two-faced printing setting screen displayed on the operation unit;

FIG. 47 is a schematic diagram showing an output example in a case where document combination is not performed in reduction layout output (i.e., a second reduction image arrangement mode is selected);

FIG. 48 is a schematic diagram showing an output example in a case where document combination is performed in the reduction layout output (i.e., a first reduction image arrangement mode is selected);

FIG. 49 is a diagram for explaining a memory map of a storage medium which stores various data processing programs capable of being read by the image input/output apparatus according to the present invention;

FIG. 56 is a diagram for explaining a memory map of a storage medium which stores various data processing programs capable of being read by the image forming apparatus according to the present invention.

DETAILED DESCRIPTION OF THE PREFERRED EMBODIMENTS

First Embodiment

Figure 1:
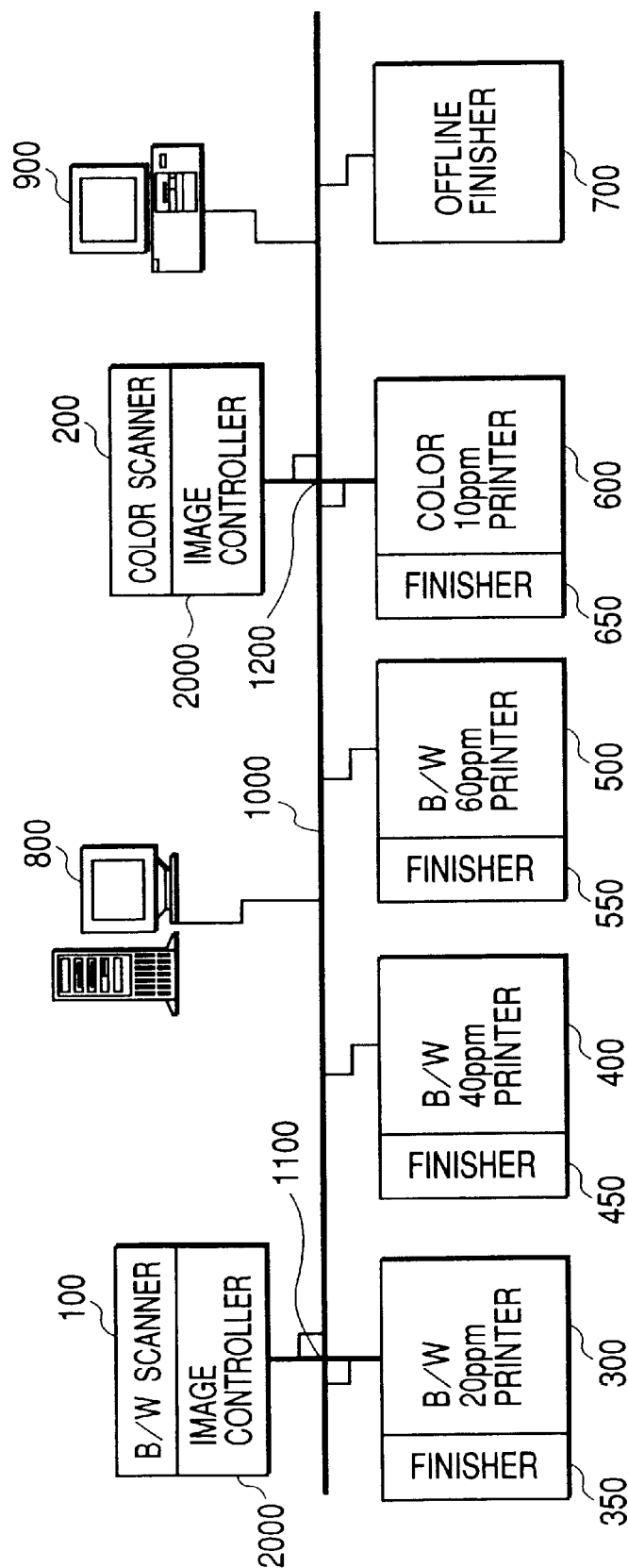
FIG. 1 is a block diagram showing an example of the entire structure of an image forming system.

Hereinafter, the first embodiment of the present invention will be explained with reference to the attached drawings. FIG. 1 shows an entire structure of an image processing system according to the present invention. The image processing system includes a black and white (B/W) scanner 100 which acts as an image input unit and can read a B/W original, a color scanner 200 which can read a color original, a low-speed B/W printer 300, an intermediate-speed B/W printer 400, a high-speed B/W printer 500 capable of performing two-faced printing and a color printer 600. These printers act as image output units. Further, the image processing system includes an off-line finisher 700 which acts as a sheet processing apparatus capable of performing off-line sheet processes to sheets such as a stapling process, a punching process, a bookbinding process and the like, a server computer 800 which has a large-capacity storage, a personal computer (PC) 900 which is used by an individual user. Further, the image processing system includes an Ethernet 1000 which acts as a transmission means in a known network structure, a B/W-dedicated video bus (a local video bus) 1100 which connects the B/W scanner 100 and the low-speed printer 300, and a color-dedicated video bus (a local video bus) 1200 which connects the color scanner 200 and the color printer 600. Further, an image controller 2000 which performs image reading control and image transfer control is connected respectively to the scanners 100 and 200 through not-shown dedicated lines. Further, finishers 350, 450, 550 and 650 which act as on-line sheet processing apparatuses and can perform the above various sheet processes are connected to the printers 300, 400, 500 and 600, respectively. For example, the present embodiment is applicable to a remote-type structure that the various units such as the image controller 2000, the scanner 100, the printer 300 and the like are remotely located and data is exchanged among them through a predetermined communication medium, and also to a single-unit structure of an image forming apparatus such as a digital multifunctional machine or the like.

Hereinafter, the image processing system will be explained with the scanner 100, the image controller 2000 and the printer 200 as examples.

Figure 2:
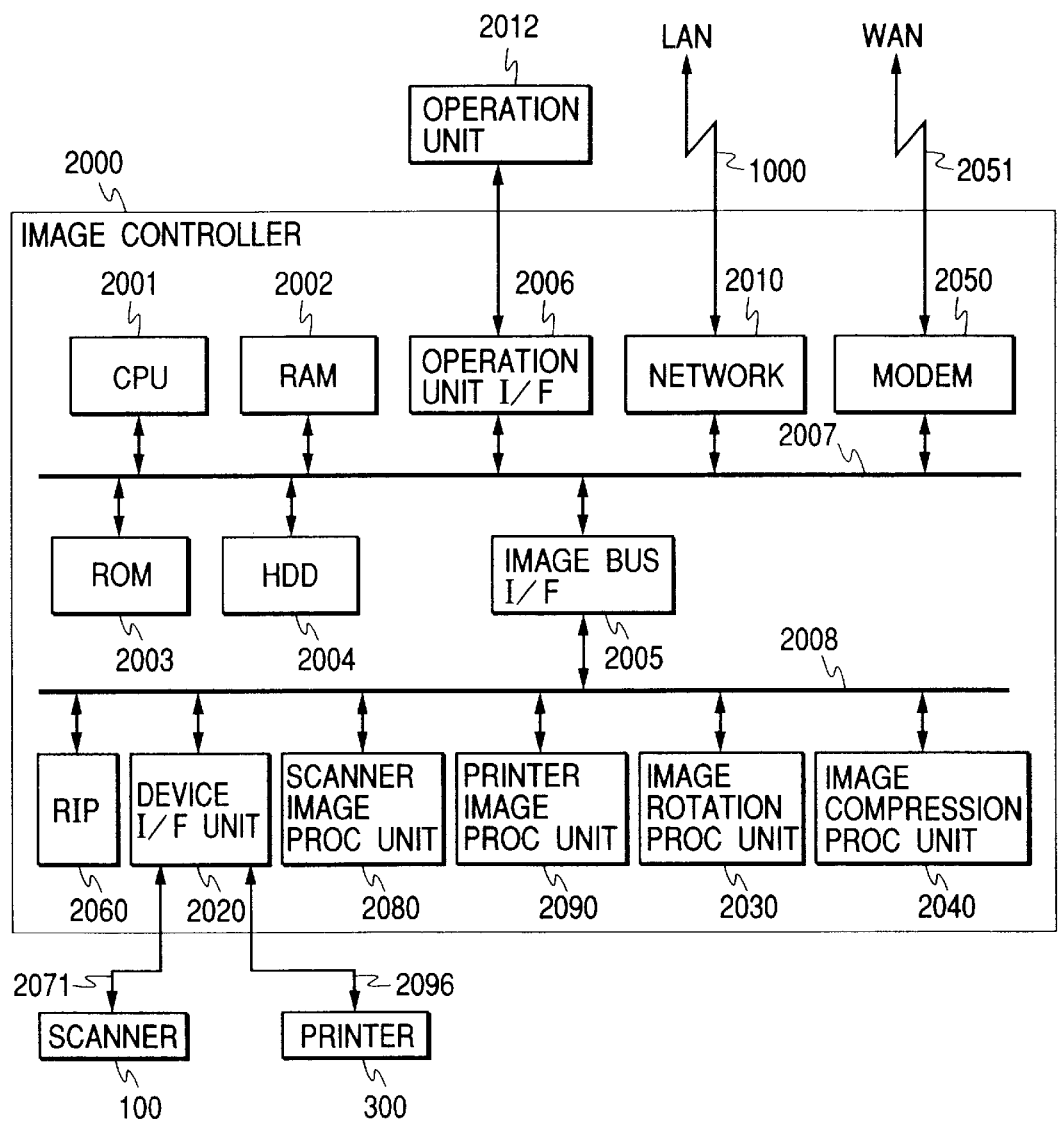
FIG. 2 is a block diagram showing an image controller.

FIG. 2 is a block diagram showing the structure of the image controller 2000. The image controller 2000 is connected to the scanner 100 acting as the image input apparatus and the printer 300 acting as the image output apparatus, and equally connected to the LAN 1000 and a public line or a WAN (wide area network) 2051, whereby input and output of image information and device information are controlled. A CPU 2001 is the controller which controls the system as a whole, and performs entire control for the various units (the scanner 100, the printer 300, the finisher 350 connected to the printer 300, and the like). Namely, the CPU 2001 operates the various units on the basis of an operator's instruction and setting information input through an operation unit 2012. A RAM 2002 which temporarily stores image data acts as a system working memory used when the CPU 2001 operates. A ROM 2003 which is a boot ROM stores a system boot program (including programs for performing processes in later-described flow charts). By reading and executing the program in the ROM 2003 with the CPU 2001, various processes (including processes in flow charts shown in later-described FIGS. 16 to 18) are performed.

The image controller 2000, the scanner 100, the printer 300, the finisher 350 and the like can transmit and receive various data (e.g., image data, instruction data input from the operation unit 2012 or the like, status information of the devices themselves, control data, and the like), through signal lines 2071 and 2096. Then, on the basis of the instruction and the setting information input by the operator on the operation unit 2012, the CPU 2001 of the image controller 2000 issues instructions to the various units. Further, the CPU 2001 outputs the image data input from the scanner 100 through the signal line 2071 and the image data input from a remote external apparatus such as a host computer or the like through the LAN 1000 or the WAN 2051, to the printer 300 through the signal line 2096. Thus, the CPU 2001 enables the printer 300 to perform an image forming operation based on the image data, and also enables a large-capacity HDD (hard disk drive) 2004 to classify, store and manage the image data from the above various image generation sources in respective memory boxes (later described).

The HDD 2004 stores system software and various image data from the image generation sources. It should be noted that one or plural images input from the scanner 100 and a network 2010 are handled as documents and can be stored in the image recording area called the memory box in the HDD 2004. Then, on the basis of the operator's instruction from the operation unit 2012 or the like, one or the plural documents desired by the operator are extracted from the memory box. Then, for example, the extracted document can be printed and transmitted to the remote external apparatus. Images and attribute data in the memory box are stored in the HDD 2004.

An operation unit I/F (interface) 2006 which interfaces with the operation unit (or an UI (user interface)) 2012 outputs image data on an operation screen to be displayed to the operation unit 2012. Thus, the various operation screens shown in later-described FIGS. 12 to 15 are displayed on a display unit. Further, the operation unit I/F 2006 functions to transfer to the CPU 2001 the information which is input from the operation unit 2012 by the user of this system. The network 2010 which is connected to the LAN 1000 inputs and outputs various information. A modem 2050 which is connected to the public line (WAN) 2051 inputs and outputs various information. Such devices as above are disposed on a system bus 2007. An image bus I/F (interface) 2005 which is the bus bridge connects the system bus 2007 to an image bus 2008 which transfers image data at high speed, whereby the data structure is converted. The image bus 2008 is structured by a high-speed bus such as a PCI (peripheral component interconnect) bus or the like. On the image bus 2008, an RIP (raster image processor 2060, a device I/F (interface) unit 2020, a scanner image processing unit 2080, a printer image processing unit 2090, an image rotation processing unit 2030, and an image compression processing unit 2040 are disposed. The RIP 2060 expands a PDL (page description language) code to a bit map image. The device I/F unit 2020 connects the scanner 100 (image input apparatus) and the printer 300 (image output apparatus) to the image controller 2000, and performs synchronous/asynchronous conversion to image data. The scanner image processing unit 2080 corrects, processes and edits input image data. The printer image processing unit 2090 performs printer correction, resolution conversion and the like to print and output image data. The image rotation processing unit 2030 performs rotation of image data. The image compression processing unit 2040 performs compression and decompression processes of JPEG (joint photographic experts group) method to multivalue image data, and performs compression and decompression processes of JBIG (joint bi-level image experts group) method, MMR (modified modified READ coding) method and MH (modified Huffman coding) method to binary image data.

In the HDD 2004, information which concerns image output speed, setting positions and the like of nodes connected on the network (LAN 1000) has been stored for each address in the HDD 2004. The sheet processing apparatus (finisher) 350 which performs a stapling process, a punching process and the like is connected to the printer 300, whereby the image controller 2000 and the control unit of the finisher 350 can exchange the data through the signal line 2096. Then, for example, according to the operator's setting from the operation unit, the data concerning an execution instruction of the stapling process can be transmitted from the image controller 2000 to the control unit of the finisher 350 through the signal line 2096, and also the data concerning an execution instruction of the two-faced printing process can be transmitted from the image controller 2000 to the printer 300 through the signal line 2096. Thus, each unit performs the instructed process.

Figure 3:
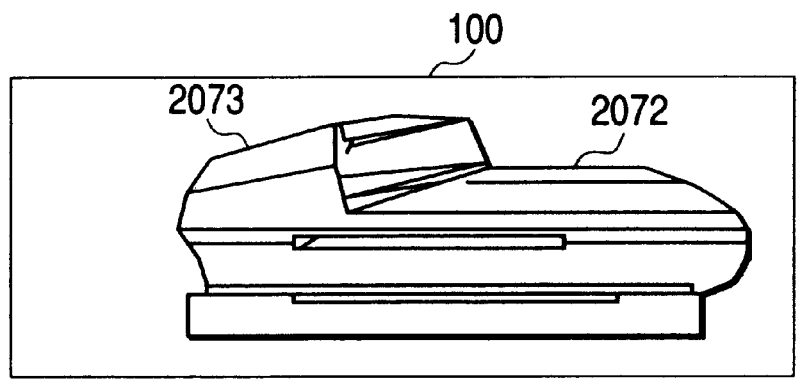
FIG. 3 is a diagram showing the appearance of an image input apparatus.

FIG. 3 is a block diagram showing the structure of the scanner 100. The scanner 100, as the example of the image input unit, which performs an original image reading process illuminates an image on a sheet being an original, relatively moves a CCD line sensor (not shown) to the original to scan it, and then converts the scanned and read image into an electrical signal as raster image data. Then, the scanner 100 outputs the original image data to the image controller 2000 through the signal line 2071 (FIG. 2). When the original is set to an original tray 2073 of an original feeder 2072 and an instruction to start the reading is input by the user from the operation unit 2012, the CPU 2001 issues an instruction to the scanner 100 through the signal line 2071. Thus, the scanner 100 feeds the originals of the sheaf one by one on the original tray 2073 from its first page for the original image reading, and outputs the read image data to the image controller 2000 through the signal line 2071.

Figure 4:
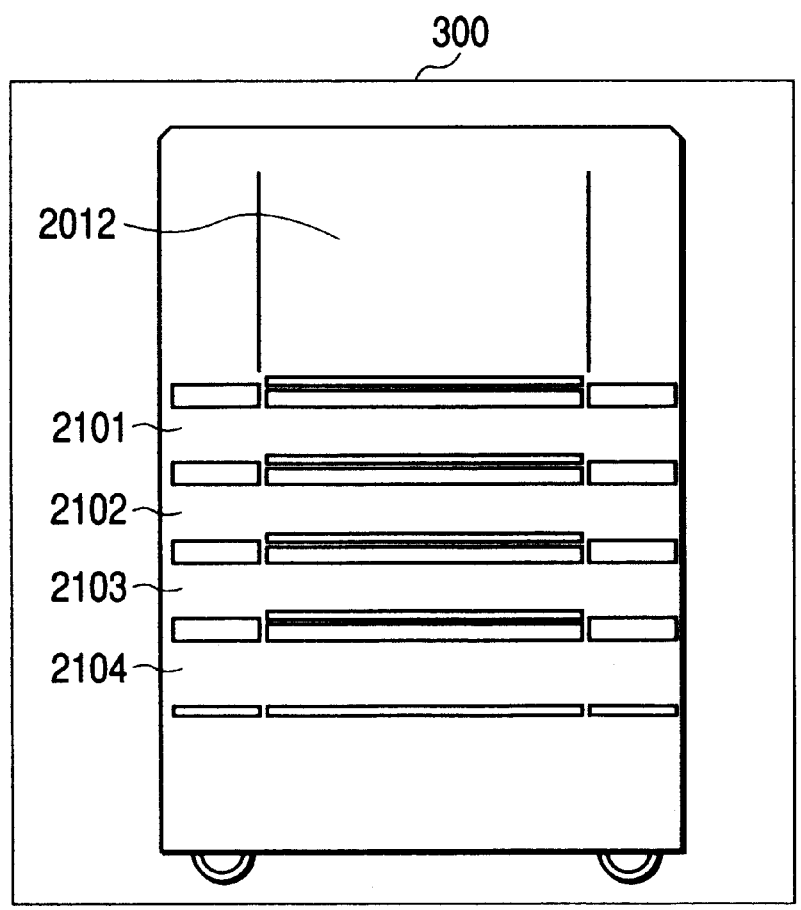
FIG. 4 is a diagram showing the appearance of an image output apparatus.

FIG. 4 is a block diagram showing the structure of the printer 300. The printer 300, as the image output apparatus, which can execute a one-faced printing mode and a two-faced printing mode forms on the sheet the image based on the raster image data input from the image controller 2000 through the signal line 2096. As a printing method, it is possible to apply any of an electrophotographic method which uses a photosensitive drum or a photosensitive belt, an inkjet method which emits ink from a micronozzle array to directly print an image on a sheet, and the like. The printing operation is started based on an instruction from the CPU 2001 through the signal line 2096. The printer 300 provides plural stages to be able to select different sheet sizes and directions, and thus includes sheet cassettes 2101, 2102, 2103 and 2104 corresponding to the respective stages.

Since the finisher 350 is connected to the printer 300, for example, the sheet image-formed by the printer 300 is further subjected to the sheet process such as the stapling process or the like by the finisher 350 according to the operator's instruction from the operation unit 2012.

When the two-faced printing is performed, the sheet is inverted by the sheet transportation path in the printer 300 after the one-faced printing, the inverted sheet is again transported to the image forming unit, and the printing is performed on the face to which the printing is not yet performed, again according to the instruction from the CPU 2001. Then the sheet is transported to a sheet discharge port with its back faceup, and discharged on a sheet discharge tray. On the other hand, when the one-faced printing is performed, the image-formed sheet is inverted by the internal transportation path, the sheet is discharged from the body of the printer 300 with its image-formed face facedown, and the discharged sheet is stacked on the sheet discharge tray (facedown sheet discharge).

Next, the scanner image processing unit 2080 of the image controller 2000 shown in FIG. 2 will be explained with reference to FIG. 5. FIG. 5 is a block diagram showing the structure of the scanner image processing unit 2080. An image bus I/F (interface) controller 2081 which is connected to the image bus 2008 has a function to control its bus access sequence, control each device in the scanner image processing unit 2080, and generate timing of each device. A filtering processing unit 2082 performs a convolution operation by using a spatial filter. An editing unit 2083 recognizes a closed area surrounded by a marker pen in input image data, and performs an image process such as shadow, shading, negative/positive reversal or the like to the image data in the closed area. When a resolution of a read image is changed, a magnification change processing unit 2084 performs an interpolation operation to the main scan direction of the raster image and performs size enlargement/reduction. The magnification in the sub scan direction is changed by changing movement speed of an image reading line sensor (not shown). A table 2085 is used to table conversion for converting read image data (luminance data) into density data. A binarization unit 2086 binarizes multivalue gray scale image data in an error diffusion process and a screening process. The image data which was processed by the scanner image processing unit 2080 is again transferred to the image bus 2008 through the image bus I/F controller 2081.

Next, the printer image processing unit 2090 of the image controller 2000 shown in FIG. 2 will be explained with reference to FIG. 6. FIG. 6 is a block diagram showing the structure of the printer image processing unit 2090. An image bus I/F (interface) controller 2091 which is connected to the image bus 2008 has a function to control its bus access sequence, control each device in the printer image processing unit 2090, and generate timing of each device. A resolution conversion unit 2092 performs resolution conversion to image data sent from the network 1000 or the public line (WAN) 2051 to obtain the resolution of the printer 300. A smoothing processing unit 2093 performs a process to smooth a jaggy of the image data (image roughness appearing at, e.g., an oblique B/W boundary) after the resolution conversion.

Figure 7:
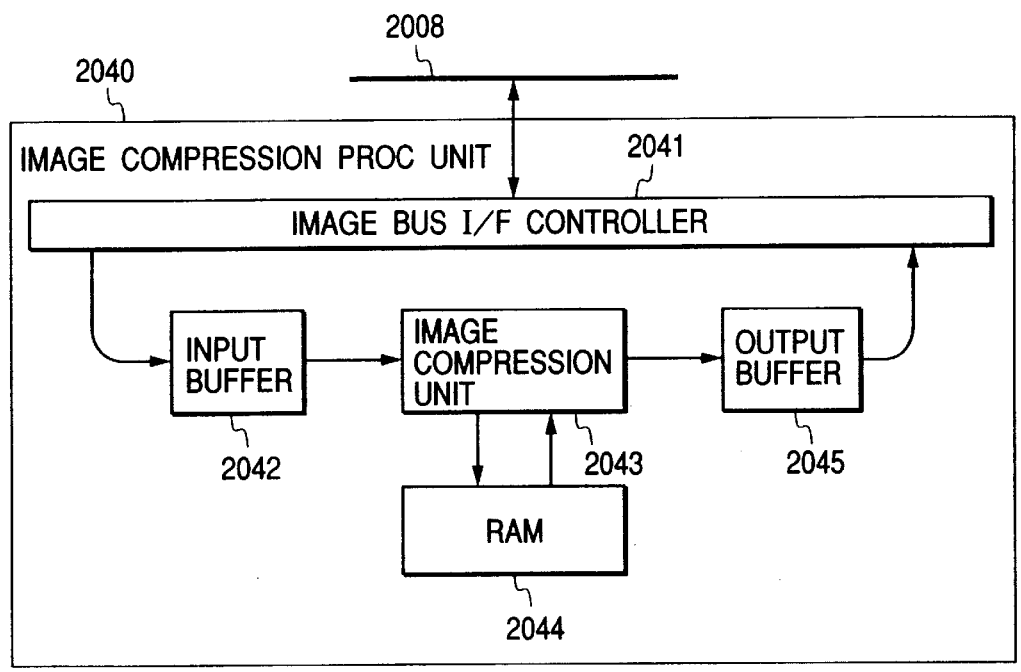
FIG. 7 is a block diagram showing an image compression processing unit.

Next, the image compression processing unit 2040 of the image controller 2000 shown in FIG. 2 will be explained with reference to FIG. 7. FIG. 7 is a block diagram showing the structure of the image compression processing unit 2040. An image bus I/F (interface) controller 2041 which is connected to the image bus 2008 has a function to control its bus access sequence, control timing to exchange data between an input buffer 2042 and an output buffer 2045, and control mode setting to a image compression unit 2043. Hereinafter, a processing procedure of the image compression processing unit 2040 will be explained.

The CPU 2001 performs setting for image compression control to the image bus I/F controller 2041, through the image bus 2008. By this setting, the image bus I/F controller 2041 performs setting of, e.g., MMR compression, JBIG decompression and the like necessary for the image compression to the image compression unit 2043. After then, the CPU 2001 again permits the image bus I/F controller 2041 to transfer the image data. In accordance with such transfer permission, the image bus I/F controller 2041 starts the image data transfer from the RAM 2002 or each device on the image bus 2008. The received image data is temporarily stored in the input buffer 2042 and then transferred at certain speed according to an image data request of the image compression unit 2043. At this time, it is judged at the input buffer 2042 whether or not the image data can be transferred between the image bus I/F controller 2041 and the image compression unit 2043. Then, if judged that the image data reading from the image bus 2008 and the image writing to the image compression unit 2043 can not be performed, it is controlled not to perform the data transfer (such control is called "handshaking" hereinafter). The image compression unit 2043 once stores the received image data in a RAM 2044. This is because data of plural lines are necessary according to a kind of image compression process to be performed, and the image compression for first one line can not be performed if the image data of the plural lines are not prepared. The image data subjected to the image compression is immediately transferred to the output buffer 2045. In the output buffer 2045, the handshaking between the image bus I/F controller 2041 and the image compression unit 2043 is performed, and the image data is then transferred to the image bus I/F controller 2041. In the image bus I/F controller 2041, the compressed (or decompressed) image data transferred is further transferred to the RAM 2002 or each device on the image bus 2008. Such a series of the processes in the image compression processing unit 2040 is repeated until a processing request from the CPU 2001 ends (i.e., the processes of necessary pages end) or a stop request is issued from the image compression unit 2043 (i.e., an error in the compression or decompression occurs).

Figure 8:
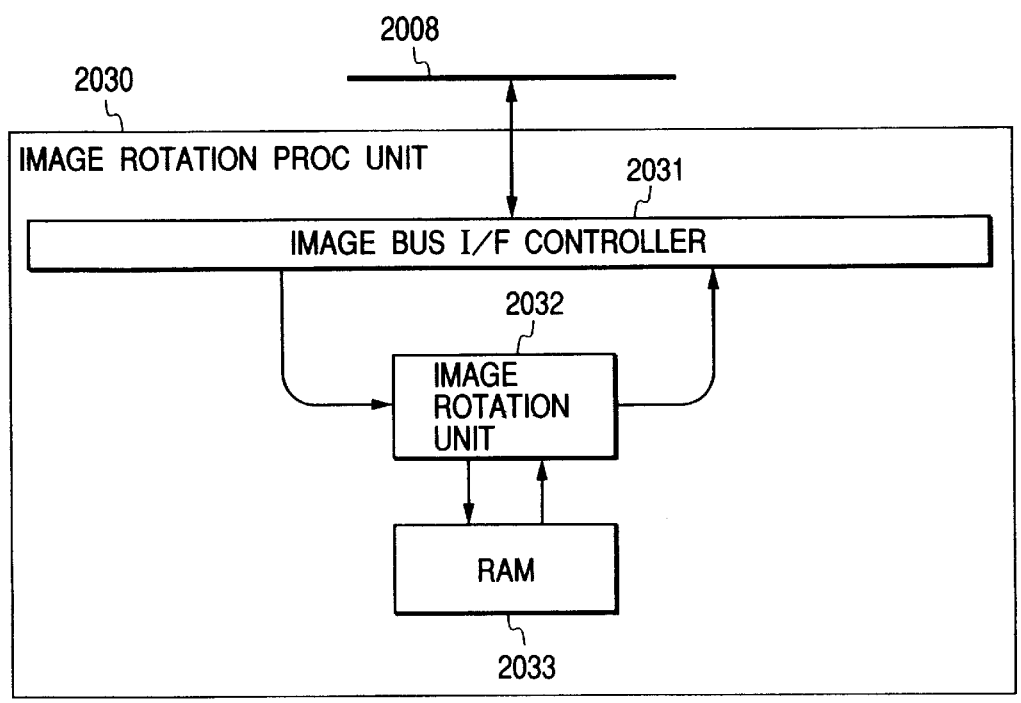
FIG. 8 is a block diagram showing an image rotation processing unit.

Next, the image rotation processing unit 2030 of the image controller 2000 shown in FIG. 2 will be explained with reference to FIG. 8. FIG. 8 is a block diagram showing the structure of the image rotation processing unit 2030. An image bus I/F (interface) controller 2031 which is connected to the image bus 2008 has a function to control its bus access sequence, control mode setting or the like to a image rotation unit 2032, and control timing to transfer image data to the image rotation unit 2032. Hereinafter, a processing procedure of the image rotation processing unit 2030 will be explained.

The setting to control the image rotation is performed by the CPU 2001 to the image bus I/F controller 2031 through the image bus 2008. By this setting, the image bus I/F controller 2041 performs the setting of, e.g., an image size, a rotation direction, an angle and the like necessary for the image rotation to the image rotation unit 2032. After then, the CPU 2001 again permits the image bus I/F controller 2041 to transfer the image data. In accordance with such transfer permission, the image bus I/F controller 2031 starts the image data transfer from the RAM 2002 or each device on the image bus 2008. Here, it is assumed that the size of the data to be transferred is 32 bits, the image size for the rotation is 32×32 (bits), the image data is transferred on the image bus 2008 in the unit of 32 bits, and the image to be handled here is represented by binary data.

Figure 9:
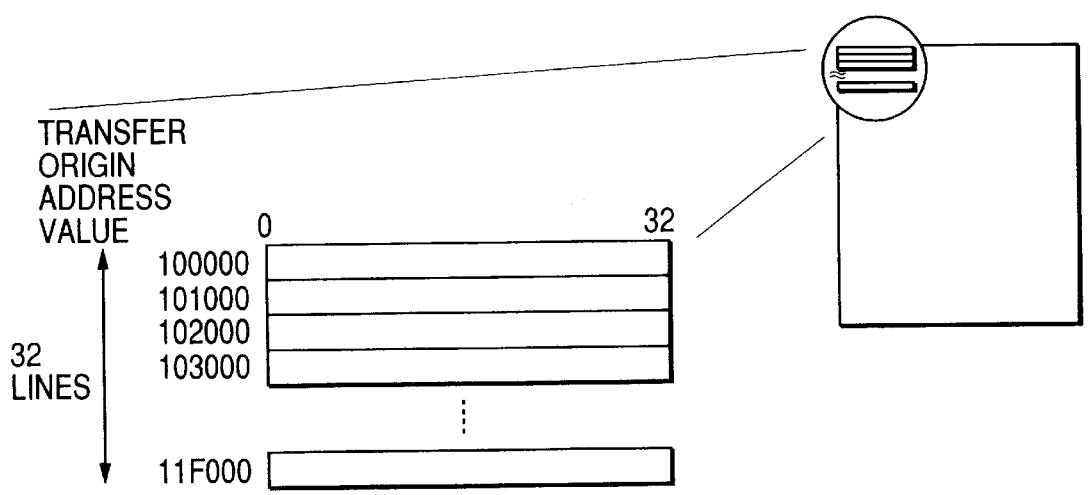
FIG. 9 is a diagram for explaining image rotation.
Figure 10:
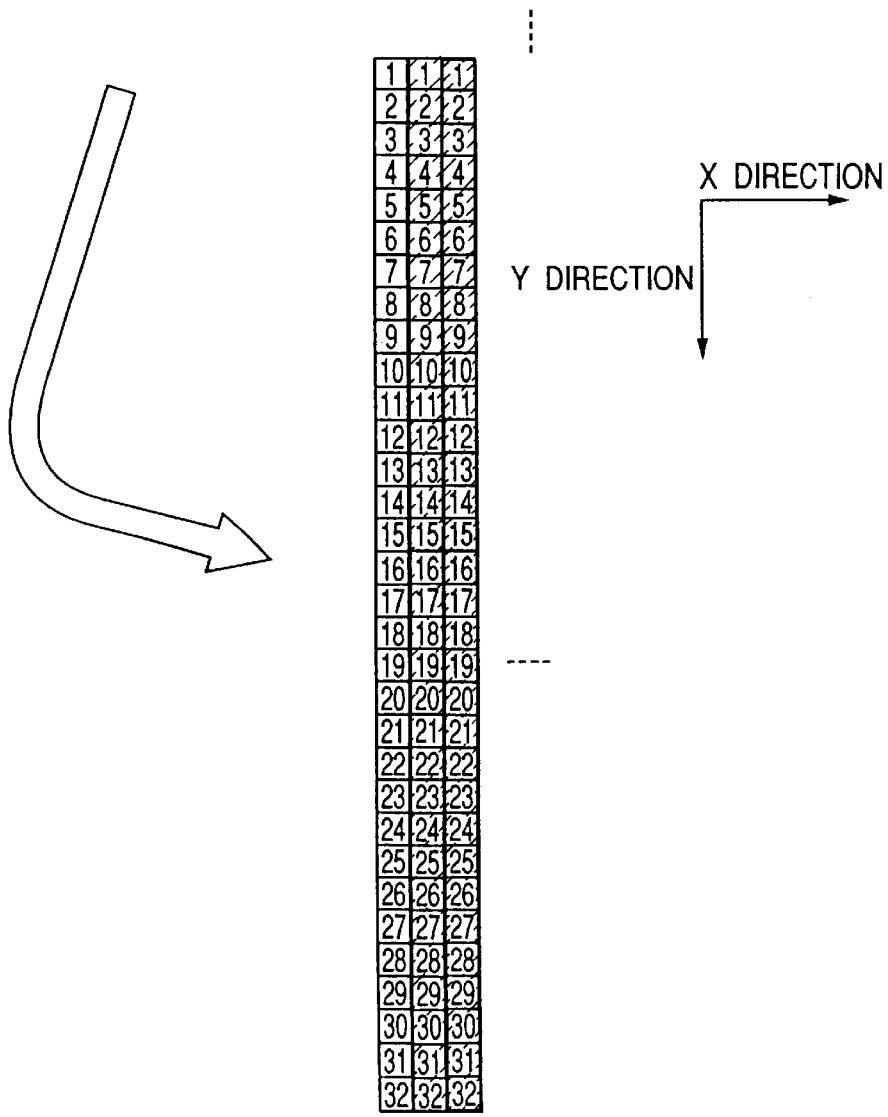
FIG. 10 is a diagram for explaining the image rotation.

As above, in order to obtain the image of 32×32 (bits), it is necessary to perform the unitary data transfer 32 times, and transfer the image data from discontinuous addresses (see FIG. 9). The image data which was transferred by the discontinuous addressing is written in a RAM 2033 such that the image is rotated by a desired angle when the image data is read. For example, when the image is rotated counter-clockwise by 90°, 32-bit image data first transferred is written in the Y direction as shown in FIG. 10 and then read in the X direction, whereby the image is rotated. After the rotation (i.e., the writing in the RAM 2033) of the image data of 32×32 (bits) ended, the image rotation unit 2032 reads the image data from the RAM 2033 in the above-described reading manner and transfers the read image data to the image bus I/F controller 2031. The image bus I/F controller 2031 which received the rotation-processed image data transfers the data to the RAM 2002 or each device on the image bus 2008 by continuous addressing. Such a series of the processes is repeated until a processing request from the CPU 2001 ends (i.e., the processes of necessary pages end).

Figure 11:
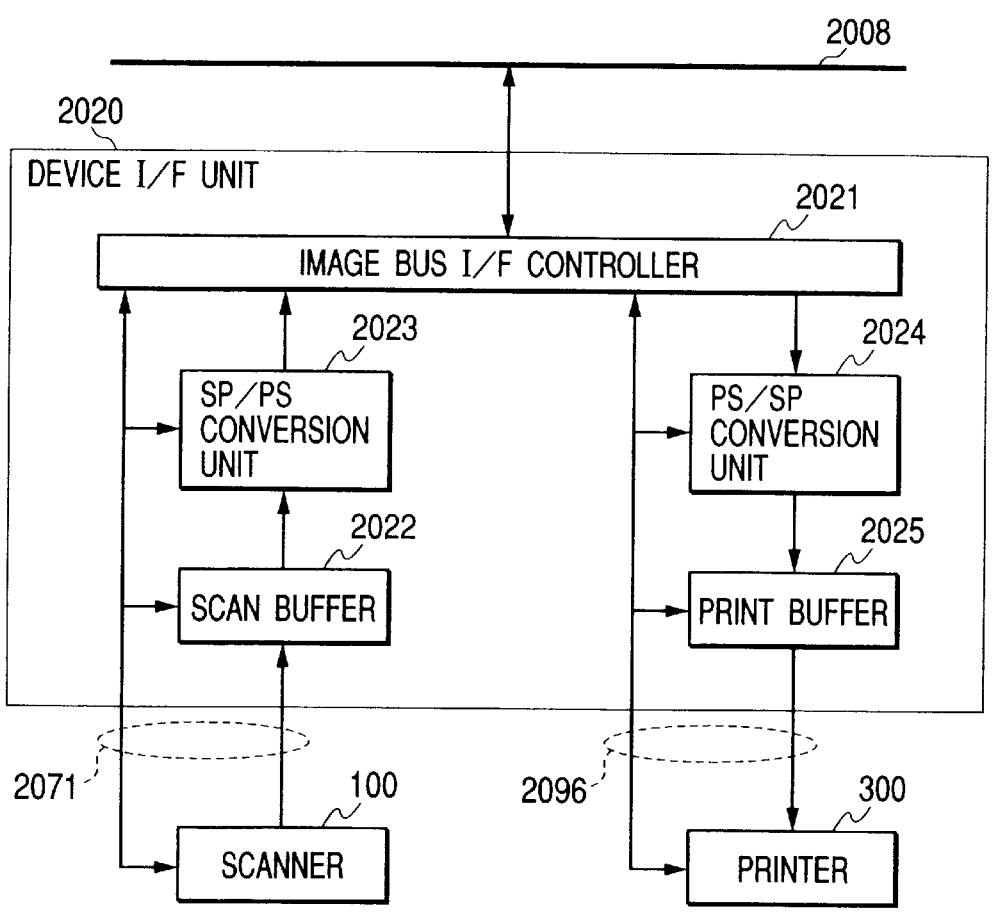
FIG. 11 is a block diagram showing a device I/F (interface) unit.

Next, the device I/F unit 2020 of the image controller 2000 shown in FIG. 2 will be explained with reference to FIG. 11. FIG. 11 is a block diagram showing the structure of the device I/F unit 2020. An image bus I/F (interface) controller 2021 which is connected to the image bus 2008 has a function to control its bus access sequence, control each device in the device I/F unit 2020, and generate timing of each device. Further, the image bus I/F controller 2021 generates a control signal to the scanner 100 and the printer 300. A scan buffer 2022 temporarily stores the image data transferred from the scanner 100 through the signal line 2071, and outputs image data in synchronism with the image bus 2008. An SP/PS (serial-to-parallel/parallel-to-serial) conversion unit 2023 ranges in due order or decomposes the image data temporarily stored in the scan buffer 2022 to convert its data width into the data width capable of being transferred to the image bus 2008. A PS/SP (parallel-to-serial/serial-to-parallel) conversion unit 2024 decomposes or ranges in due order the image data transferred from the image bus 2008 to convert its data width into the data width capable of being stored in a print buffer 2025. The print buffer 2025 temporarily stores the image data transferred from the image bus 2008, and outputs the image data in synchronism with the printer 300 through the signal line 2096.

Hereinafter, a processing procedure at the image scan will be explained. The image data transferred from the scanner 100 is temporarily stored in the scan buffer 2022 in synchronism with a timing signal from the scanner 100. Then, in the case where the image bus 2008 is the PCI bus, when the image data equal to or more than 32 bits is stored in the scan buffer 2022, the image data of 32 bits is read from the scan buffer 2022 and transferred to the SP/PS conversion unit 2023 in FIFO (first-in first-out) manner. Then, the transferred data is converted into the 32-bit image data and further transferred to the image bus 2008 through the image bus I/F controller 2021. In a case where the image bus 2008 is an IEEE1394 (Institute of Electrical and Electronics Engineers standard 1394) bus, the image data in the scan buffer 2022 is read and transferred to the SP/PS conversion unit 2023 in the FIFO manner. Then, the transferred image data is converted into serial image data and further transferred to the image bus 2008 through the image bus I/F controller 2021.

Hereinafter, a processing procedure at the image printing will be explained. In the case where the image bus 2008 is the PCI bus, the image data of 32 bits transferred from the image bus 2008 is received by the image bus I/F controller 2021, transferred to the PS/SP conversion unit 2024, decomposed into the image data of input data bit number of the printer 300, and temporarily stored in the print buffer 2025. In the case where the image bus 2008 is the IEEE1394 bus, the serial image data transferred from the image bus 2008 is received by the image bus I/F controller 2021, transferred to the PS/SP conversion unit 2024, decomposed into the image data of input data bit number of the printer 300, and stored in the print buffer 2025. Then, in synchronism with a timing signal from the printer 300, the image data in the print buffer 2025 is transferred to the printer 300 in FIFO manner.

Next, the characteristic control of the present embodiment will be explained with reference to FIGS. 12 to 18. Such the control is performed by the CPU 2001, and a program for such the control has been stored in the ROM 2003. As described above, in the present embodiment, one or the plural images input from the scanner 100 or the network 2010 can be handled as the documents and stored in the image recording area called the memory box in the HDD 2004. The image and attribute data in the memory box are stored in the HDD 2004 and controlled by the CPU 2001 of the image controller 2000.

Figure 12:
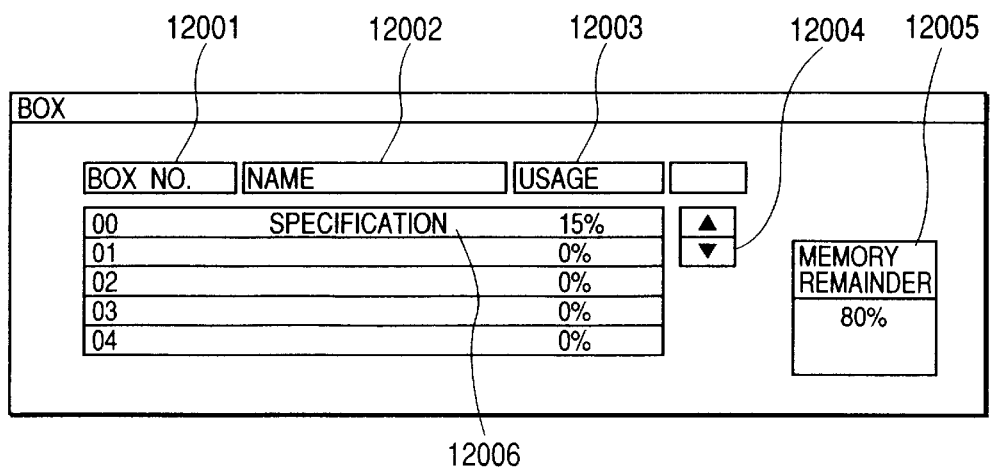
FIG. 12 is a diagram showing a memory box selection screen displayed on an operation unit.

FIG. 12 shows a memory box selection screen displayed on the operation unit 2012. In this screen, numeral 12001 denotes columns of memory box numbers, i.e., there are 100 boxes ("00" to "99"). Numeral 12002 denotes columns of names. These names can be set by the user if necessary to be added to the respective memory boxes.

As described above, in the present embodiment, the 100 memory boxes are provided in the HDD 2004, and one or plural image data can be stored together with the attribute data in each memory box (i.e., each user).

Figure 13:
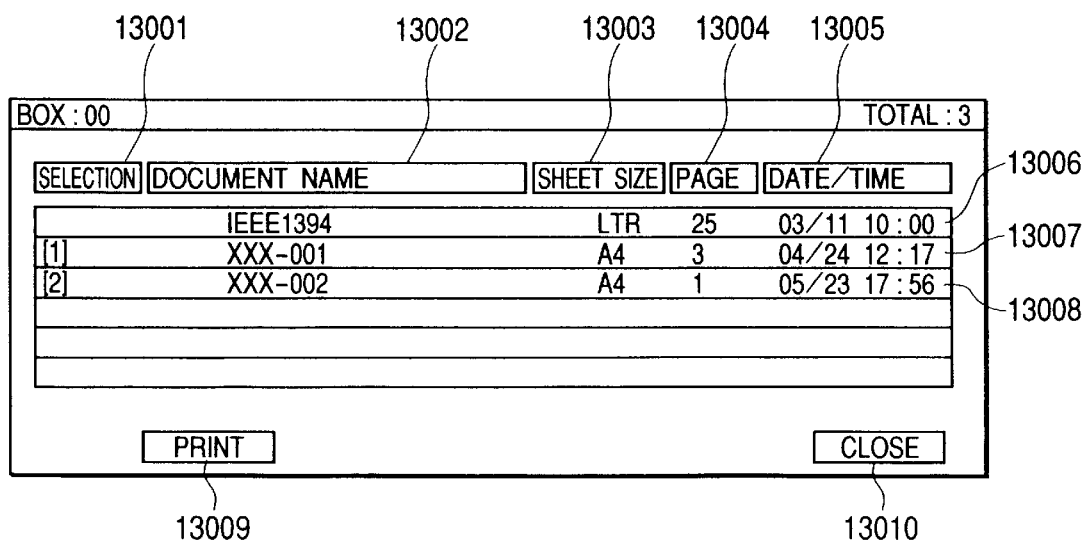
FIG. 13 is a diagram showing a document selection screen displayed on the operation unit.

Numeral 12003 denotes columns of hard disk usage for the image data of the respective memory boxes. Namely, how much the hard disk is occupied is displayed for each box. Numeral 12004 denotes arrow buttons which are used to display the memory boxes not yet displayed on the screen. Numeral 12005 denotes a memory residual quantity display on which a total hard disk residual quantity including the quantity of unused memory boxes, the quantity temporarily used for other printing processes and image processes, and the like is displayed. Numeral 12006 denotes a column for displaying a state of each memory box. By touching this column 12006, the corresponding memory box is selected, and a document selection screen next explained in FIG. 13 is displayed on the operation unit 2012. In FIG. 12, the memory box named "SPECIFICATION" is stored at the memory box number "00", and this box is used by 15%.

FIG. 13 shows the document selection screen displayed on the operation unit 2012. In this example shown in FIG. 13, three documents are stored in one memory box at the memory box number "00", i.e., the document (a series of image data) named "IEEE1394" of LTR (letter) size and 25 pages, the document (a series of image data) named "XXX-001" of A4 size and three pages, and the document (a series of image data) named "XXX-002" of A4 size and one page.

Numeral 13001 denotes columns of document selection and selection order. The selected document is added with the number according to the selection order. When the selected document is again selected, the selection of this document is released, and thus the selection order of the other selected document is updated. Namely, the document output (print) order can be set by using this screen. Since the operation unit 2012 is the touch panel, when the column of one document is touched by the user, the document corresponding to the touched column is selected. Numeral 13002 denotes columns of document names which can be arbitrarily set by the user if necessary. Numeral 13003 denotes columns of size information of the images in the respective documents, numeral 13004 denotes columns of the number of pages of the respective documents, and numeral 13005 denotes columns of storage date and time of the respective documents.

Numerals 13006, 13007 and 13008 denote columns of the states of the respective documents. As explained above, when the column is touched, the document corresponding to the touched column is selected, and the selected document is added with the number according to the selection order. When the identical document is again touched, the selection of this document is released. Numeral 1309 denotes a printing button for printing the selected document. When the printing button 1309 is touched, the screen is changed to an output setting screen shown in FIG. 14.

In the example of FIG. 13, the document "XXX-001" of three pages and the document "XXX-002" of one page are selected from among the three documents, and the image forming order is set to print first the document "XXX-001" and second the document "XXX-002"

In the present embodiment, on this document selection screen, when one document (corresponding to the series of image data such as the document of three pages) is selected and the printing button 13009 is touched by the operator, only one document selected is output by the printer. On the other hand, as shown in the example of FIG. 13, when the plural documents are selected and the printing button 13009 is touched, these plural documents selected can be continuously printed in the order set by the operator on the document selection screen or the like. Namely, these plural documents selected can be continuously output at all once in the order of designation, in response to the batch instruction.

Numeral 13010 denotes a button for closing the document selection screen and returning to the memory box selection screen of FIG. 12.

FIG. 14 shows the output setting screen which is displayed on the operation unit 2012 when the printing button 13009 on the screen of FIG. 13 is touched by the operator. In FIG. 14, numeral 14001 denotes a check box for confirming whether document combination should be performed. When the check box 14001 is not checked or selected, even if the plural documents are selected and their printing is instructed by the operator on the document selection screen of FIG. 13, a mode to handle these documents respectively as different jobs is executed.

When the check box 14001 is checked or selected, a mode to handle as one job the plural documents selected by the operator on the document selection screen of FIG. 13 is executed. In this case, since these plural documents are handled as one job, interruption, restart and cancel designation for the job is valid for all the documents in this job.

For example, while the certain three documents are being continuously subjected to the image forming, it is assumed that, in response to an operator's interruption request instructed from the operation unit, the image forming operation is interrupted at the time when the printing of the second document ended (i.e., at the time when the image forming of the first and second documents ended, and the image forming of the third document is not performed), and then an image forming restart request is instructed by the operator. In such a case, when the check box 14001 has been previously checked on the output setting screen of FIG. 14 (i.e., document combination instruction has been set), since it has been previously instructed by the operator to handle these three documents as one job, the image forming is restarted from the first document and then performed continuously for these three documents. On the other hand, when the check box 14001 is not checked on the output setting screen of FIG. 14, since it has been previously instructed by the operator to handle these three documents respectively as separate jobs, the image forming is restarted from the third document to which the image forming is not yet performed. Thus, the image forming is performed only for the third document.

Another example will be explained. For example, when the certain three documents are continuously subjected to the image forming, it is assumed that, while the second document is being printed, an operator's interruption request is instructed from the operation unit. In such a case, when the check box 14001 is not checked on the output setting screen of FIG. 14 (i.e., the document combination instruction is not set), since it has been previously instructed by the operator to handle these three documents respectively as separate jobs, only the image forming for the second document is forcedly stopped irrespective of whether or not the printing of the final page ended. Then, the image forming for the third document is started.

On the other hand, when the check box 14001 has been checked on the output setting screen of FIG. 14 (i.e., the document combination instruction has been set), since it has been previously instructed by the operator to handle these three documents as one job, the image forming for both the second and third documents is not performed. Namely, when cancellation is instructed, the image forming is completely stopped.

As described above, when the plural documents are subjected to the image forming, it is possible by the operator to select whether the plural documents should be handled as one job or separate jobs.

Numeral 14002 denotes a check box for designating stapling. When the check box 14002 is checked or selected, the internal CPU controls the finisher 350 to perform the stapling by a stapler unit of the finisher 350 connected to the printer at the time when the last sheet of one joe is output.

For example, on the screens of FIGS. 12 and 13 displayed on the operation unit prior to the output setting screen of FIG. 14, it is assumed that, by the operator, a document named A of three pages and a document named B of two pages are selected as the documents to be subjected to the image forming, and the output order to output the document A after outputting the document B is set. In this setting state, when the printing button 13009 is touched, the screen is changed to the output setting screen of FIG. 14. Then, when the document combination is not instructed in the check box 14001 and the stapling is instructed in the check box 14002, the printer 300 first starts the image forming for the document B. After the image forming for all the pages (two pages) of the document B ended, the stapler unit of the finisher 350 performs the stapling for the sheaf of sheets (two sheets) on which the images of the document B were formed. After then, the printer 300 starts the image forming for the document A. After the image forming for all the pages (three pages) of the document A ended, the stapler unit of the finisher 350 performs the stapling for the sheaf of sheets (three sheets) on which the images of the document A were formed.

As described above, when the plural documents to be subjected to the image forming are selected and these documents selected are printed at all once, it is permitted to perform the stapling for each document according as the document combination is not instructed and the stapling is instructed.

On the other hand, on the output setting screen of FIG. 14, when the document combination is instructed in the check box 14001 and the stapling is instructed in the check box 14002, the printer 300 first starts the image forming for the document B. After the image forming for all the pages (two pages) of the document B ended, it is inhibited at this time to perform the stapling, and the image forming for the document A is successively performed. After the image forming for all the pages (three pages) of the document A ended, it is permitted at this time to perform the stapling. Namely, the five sheets which consist of the two sheets on which the images of the document B were formed and the three sheets on which the images of the document A were formed are subjected to the stapling as one sheaf.

As described above, when the plural documents to be subjected to the image forming are selected and these documents are printed at all once, the CPU 2001 controls the finisher 350 to permit to perform the stapling for each document according as the document combination is not instructed and the stapling is instructed. On the other hand, the CPU 2001 controls the finisher 350 to inhibit from performing the stapling for each document and perform the stapling at the time when the image forming for the selected documents completely ended, according as the document combination is instructed and also the stapling is instructed.

Besides, for example, when the finisher 350 having plural storage trays to hold and store the image-formed sheets, the sorter or the like is connected, the CPU 2001 can control the connected finisher 350 or the like to discharge the sheets of all the selected documents to one tray to handle them as one job according as sort mode execution is instructed and also the document combination is instructed. On the other hand, the CPU 2001 can control the connected finisher 350 or the like to change the tray for each document and discharge one document to one tray to handle the plural documents respectively as separate jobs according as only the sort mode execution is instructed. Namely, the CPU 2001 can perform the control such that the tray is selected according to whether or not the document combination is instructed.

Further, even if the finisher 350 does not have plural trays, when a shift mode to shift or displace the image-formed sheets for each copy can be executed in order to be able to discriminate the boundary of each copy, the CPU 2001 can control the finisher 350 to shift the sheets for each of the selected documents and stack the shifted sheets on the tray according as the document combination is not instructed. On the other hand, the CPU 2001 can control the finisher 350 to stack as one sheaf the sheets of the selected documents to the tray without shifting them to handle them as one job according as the document combination is instructed. Namely, the CPU 2001 can perform the control such that the sheet shifting is selectively changed according to whether or not the document combination is instructed.

Further, in a case where a sheaf discharge mode to once stack the sheaves of the sheets on a processing tray in the sheet processing apparatus such as the finisher 350 or the like, perform the adjusting, the stapling and the like for the sheets on the tray, and then discharge the sheaves of the processed sheets to a stacking tray or the like can be executed, when the document combination is not instructed, the CPU 2001 can control the finisher 350 to perform the sheaf discharge to the stacking tray every time the sheets of one document in the plural selected documents are stacked on the processing tray. On the other hand, when the document combination is instructed, the CPU 2001 can control the finisher 350 to perform the sheaf discharge to the stacking tray according as the sheets of all the selected documents are stacked on the processing tray. Namely, the CPU 2001 can perform the control such that the sheaf discharge is selectively changed according to whether or not the document combination is instructed.

Numeral 14003 denotes a two-faced output (print) setting button. Since one-faced output has been set in the default, the button 14003 is touched if it is intended to perform two-faced output. When the button 14003 is touched, the output setting screen is changed to a two-faced output setting screen of FIG. 15, whereby the two-faced output setting is performed. Numeral 14004 denotes the part where the number of copies is set, and "1" has been set in the default. If it is intended to output plural copies, the numeral in the part 14004 is changed.

Numeral 14005 denotes a button for closing the output setting screen. When the button 14005 is touched, the printing output is not performed, the output setting screen is closed, and the screen is returned to the document selection screen.

Figure 16:
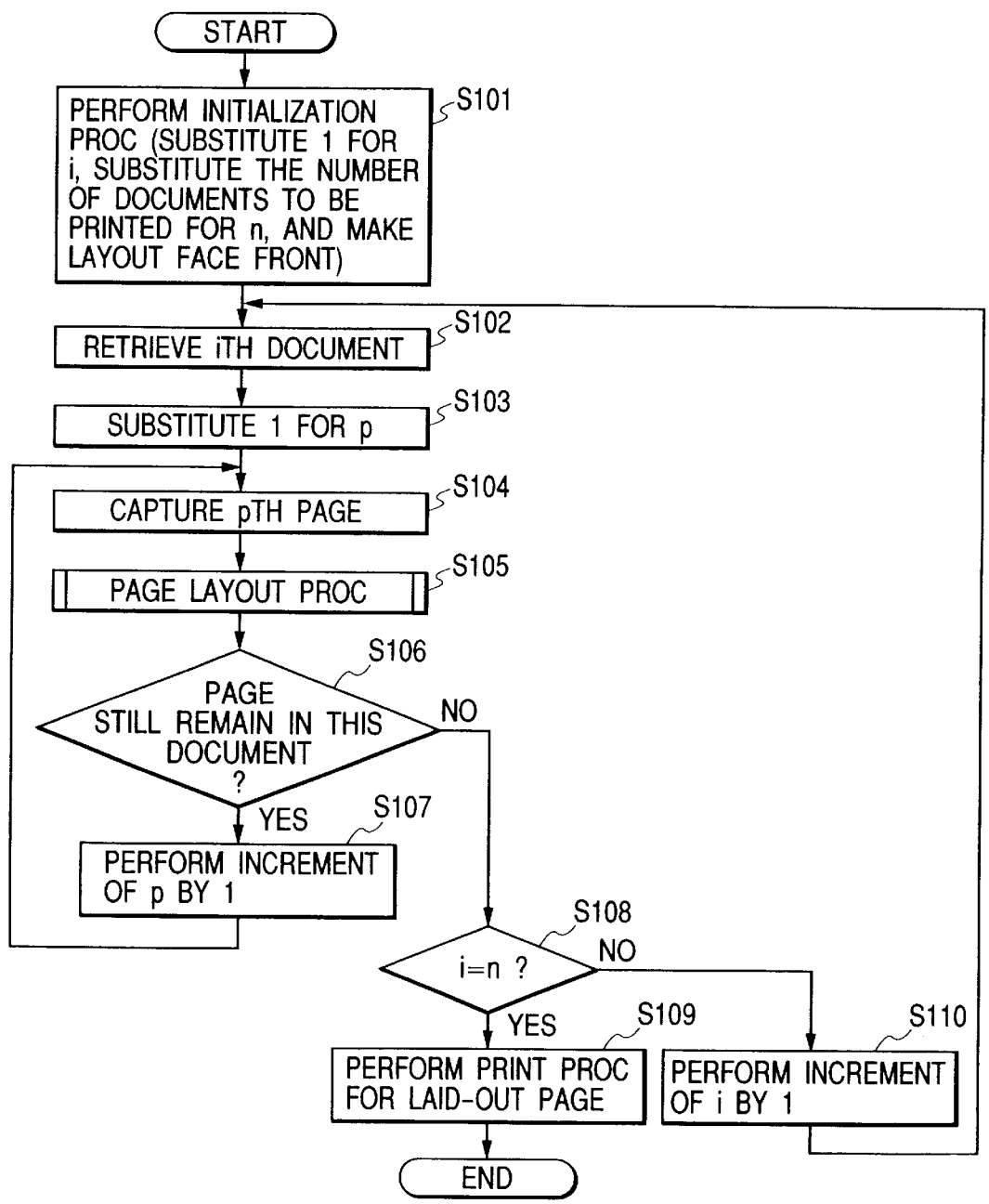
FIG. 16 is a flow chart showing a document combination (combining) process.
Figure 17:
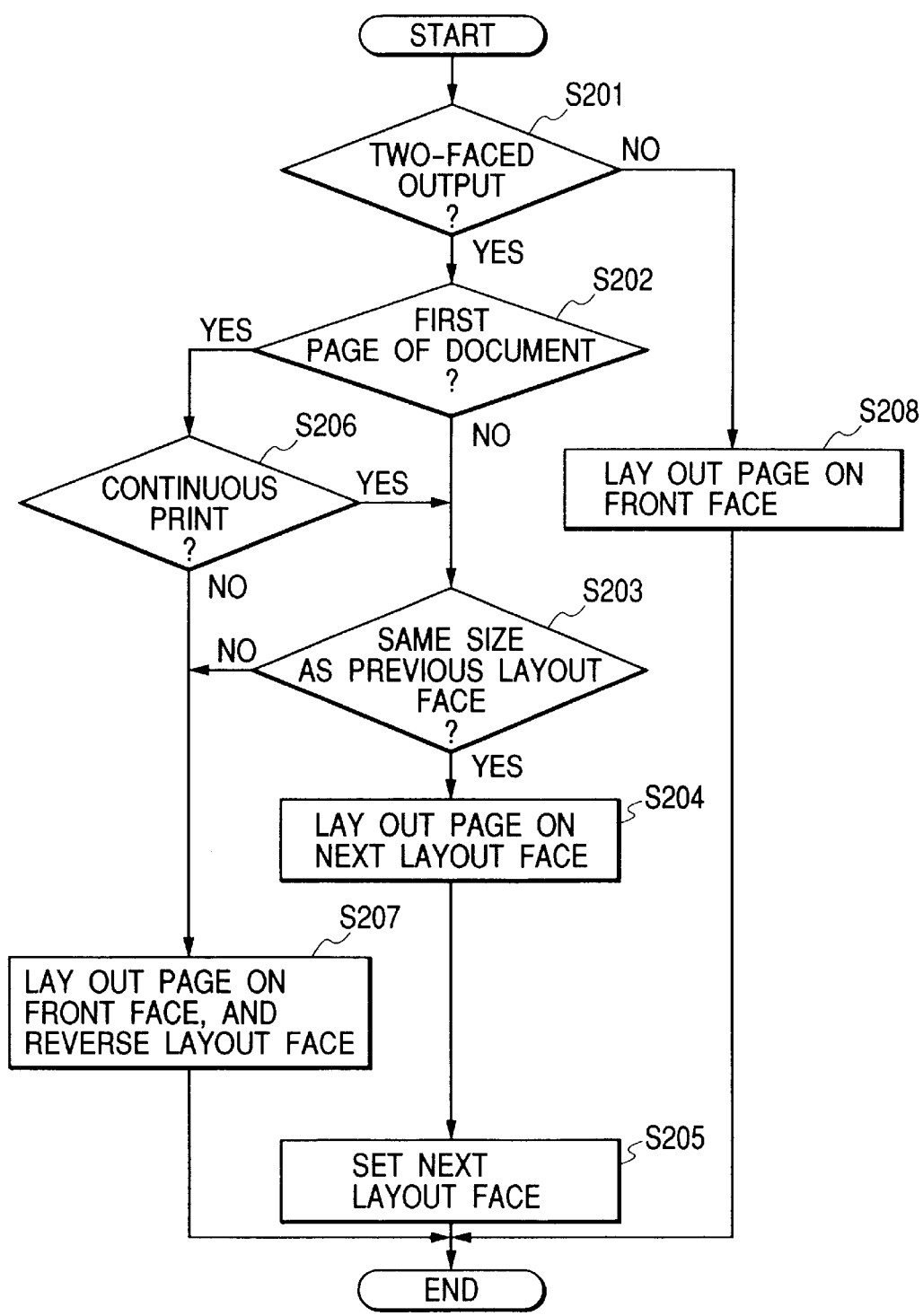
FIG. 17 is a flow chart showing a page layout process.
Figure 18:
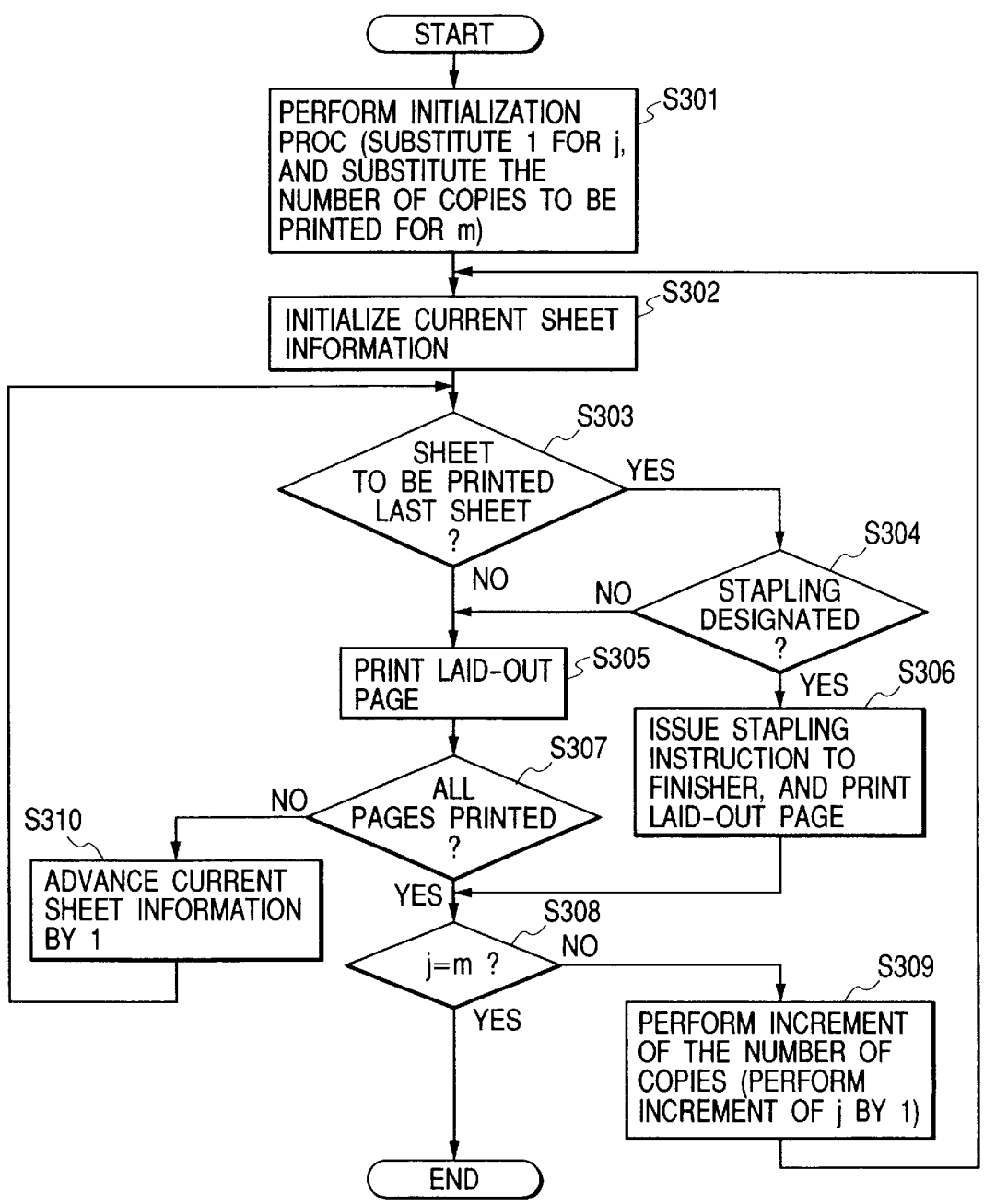
FIG. 18 is a flow chart showing a printing process.

Numeral 14006 denotes an output start button. When the output start button 14006 is touched, processes which will be later described with flow charts shown in FIGS. 16 to 18 are performed, whereby the documents are printed and output in the order of selection. When the documents are printed and output without any document combination, as described above, the processes in FIGS. 16 to 18 are performed for each document as one job (one document) in the order of selection.

FIG. 15 shows the two-faced output setting screen which is displayed when the two-faced output setting button 14003 of FIG. 14 is touched by the operator.

In FIG. 15, numeral 15001 denotes a button for selecting double spread print, and numeral 15002 denotes a button for selecting vertical spread print. In the default, double spread printing has been selected, and thus the button 15001 is displayed with the color representing the selected state. Since the buttons 15001 and 15002 interlock, both the buttons can not be selected at the same time. Namely, when both the buttons 15001 and 15002 are touched, only the spread state corresponding to the later-touched button becomes available.

Numeral 15003 denotes a selection button for selecting continuity of the two-faced output between the documents when the document combination check box 14001 is checked, and numeral 15004 denotes a selection button for selecting noncontinuity of the two-faced output between the documents when the document combination check box 14001 is checked. In the default, noncontinuity has been selected, and thus the button 15004 is displayed with the color representing the selected state. Since the buttons 15003 and 15004 interlock, both the buttons can not be selected at the same time. Namely, when both the buttons 15003 and 15004 are touched, only the state corresponding to the later-touched button becomes available. When the button 15003 is selected, the two-faced output is continuously performed between the documents. Namely, when the output of one document ends at the front face of an output sheet, the first front page of the next document is laid out on the back face of this output sheet, whereby the first page of each document does not necessarily starts from the front face of the output sheet without fail. When the button 15004 is selected, the two-faced output is not continuously performed between the documents. Namely, the first page of each document starts from the front face of the output sheet without fail. Thus, when the output of one document ends at the front page, the back face of its output sheet is blank.

For example, on the screens of FIGS. 12 and 13, it is assumed that, by the operator, a document named C of two pages and a document named D of three pages are selected as the documents to be subjected to the image forming, and the output order to output the document D and then output the document C is set. In such a case, it is further assumed that the document combination is not instructed in the check box 14001 of FIG. 14 (or the button 15003 of FIG. 15) and the two-faced printing mode is instructed by using the two-faced output setting button 14003 or the like. In this case, the printer 300 first starts the image forming for the document D to form the images of the first and second pages of the document D respectively on the front and back faces of the first recording sheet. Then, the printer 300 forms the image of the third page of the document D on the front face of the second recording sheet, and inhibits from forming any image on the back face of the second recording sheet. Further, the printer 300 forms the images of the first and second pages of the document C respectively on the front and back faces of the third recording sheet.

On the other hand, on the screens of FIGS. 14 and 15, it is assumed that, by the operator, the document combination is instructed by using the check box 14001 (or the button 15003 in FIG. 15) and also the two-faced printing mode is instructed by using the button 14003 or the like. In this case, the printer 300 first starts the image forming for the document D to form the images of the first and second pages of the document D respectively on the front and back faces of the first recording sheet. Then, the printer 300 forms the image of the third page of the document D on the front face of the second recording sheet, and permits to form an image on the back face of the second recording sheet. Thus, the image of the first page of the document C is formed on the back face of the second recording sheet. Further, the printer 300 forms the remaining image, i.e., the image of the second page of the document C, on the front face of the third recording sheet.

As described above, when the plural documents to be subjected to the image forming are selected and these documents are printed at all once, the CPU 2001 controls the printer 300 to inhibit from forming, on the back face of the sheet on which (i.e., the front face thereof) the image of the last page of one document was formed, the image of the first page of another document according as the document combination is not instructed and the two-faced printing is instructed. On the other hand, the CPU 2001 controls the printer 300 to permit to form, on the back face of the sheet on which (i.e., the front face thereof) the image of the last page of one document was formed, the image of the first page of another document according as the document combination is instructed and the two-faced printing is instructed.

Numeral 15005 denotes a setting cancellation button. When the button 15005 is depressed, the two-faced setting is cancelled and returned to the one-faced setting, and the two-faced setting screen is closed and returned to the output setting screen.

Numeral 15006 denotes a button for closing the two-faced setting screen. When the button 15006 is depressed, the two-faced setting established on this screen becomes effectual, the two-faced setting screen is closed, and the screen is returned to the output setting screen.

FIG. 16 is a flow chart showing a document combination (combining) process. When the output start button 14006 is touched by the operator on the operation screen of FIG. 14 displayed on the operation unit 2012, the process of this flow chart is performed. It should be noted that the programs to execute the various processes including the processes of the flow charts in FIGS. 16 to 18 have been stored in the ROM 2003, and these stored programs are read and executed by the CPU 2001. Further, it should be noted that each process is performed based on the instruction data and the setting information input on the operation screens of FIGS. 12 to 15 on the operation unit, the image forming condition, and the like.

First, in a step S101, an initialization process is performed. Namely, "1" is substituted for a variable "i" representing the document currently processed, and the number of documents to be printed as one job is substituted for a variable "n" representing the number of documents to be processed. Then, a next layout face of the variable representing the layout face used in the flow chart of FIG. 17 is set to be the front face, and the flow advances to a step S102.

In the step S102, the document of which selection order is "i" is retrieved, and this document is set to be the current document. It should be noted that the following processes are performed to this current document. Then, the flow advances to a step S103 to substitute "1" for a variable "p" representing the page number in the current document, the flow further advances to a step S104 to capture the p-th page from the current document, and the flow further advances to a step S105.

In the step S105, a page layout process to lay out the pages on the sheet is performed. The page layout process will be later explained in detail with reference to FIG. 17. After the page layout process ended, the flow advances to a step S106 to check whether or not a page not yet laid out still exists in the current document. If judged that such the page exists, the flow advances to a step S107, while if judged that such the page does not exist, the flow advances to a step S108. In the step S107, increment of the page number (variable) "p" is performed by one, and the flow returns to the step S104.

In the step S108, the variables "i" and "n" are compared with each other. If these variables are the same, the flow advances to a step S109, while if these variables are not the same, the flow advances to a step S110. In the step S109, since the page layout process for all the pages has ended, a printing process for these pages is performed. The printing process will be later explained in detail with reference to FIG. 18. In the step S110, increment of the variable "i" is performed by one, and the flow returns to the step S102.

FIG. 17 is a flow chart showing the page layout process in the step S105 of FIG. 16.

In FIG. 17, on the basis of the operator's instruction set on the operation screens shown in FIGS. 14 and 15, it is first judged in a step S201 whether or not the two-faced output is set. If judged that the two-faced output is set, the flow advances to a step S202, while if judged that the one-faced output is set, the flow advances to a step S208. In the step S202, it is further judged whether or not the page to be laid out is the first page of the document. If judged that such the page is the first page, the flow advances to a step S206, while if judged that such the page is the page other than the first page, the flow advances to a step S203. In the step S203, it is further judged whether or not the size of the page one-previously laid out is the same as the size of the page laid out this time. If judged that these sizes are the same, the flow advances to a step S204, while if judged that these sizes are not the same, the flow advances to a step S207.

In the step S204, the page is laid out on the next layout face, and the flow advances to a step S205 to set the next layout face to the next face. Concretely, the back face is set when the next layout face is the front face, while the front face is set when the next layout face is the back face. Then, the process of this flow chart ends.

In the step S206, the operator's setting situations (the setting of the buttons 15003 and 15004) on the operation screens shown in FIGS. 14 and 15 are checked to judge whether or not continuous printing is set. If judged that the continuous printing is set, the flow advances to the step S203, while if judged that uncontinuous printing is set, the flow advances to the step S207. In the step S207, the page is laid out on the front face, the next layout face is set to the back face by reversing the sheet, and the process of this flow chart ends. In the step S208, since the one-faced job is set, the page is laid out on the front face, and the process of this flow chart ends.

In the present embodiment, according as the document combination instruction and the two-faced printing instruction are input by the operator, the image of the certain document (called the first document) is formed on the front face of the sheet, and then it is permitted to form the image of another document (called the second document) on the back face of this sheet. As apparent from the above step S203, when the image size of the first document is different from the image size of the second document (e.g., the image size of the first document is "A4", while the image size of the second document is "B5"), the CPU 2001 performs the control to inhibit from forming the image of the second document on the back face of the sheet (the image of the first document was formed on its front face), and instead form the image of the second document on the front face of another recording sheet, irrespective of whether or not the document combination instruction is input by the operator. Also, in a case where the size designation of the recording sheet used for the document forming by the user has been previously set, when the recording sheet size for the first document is different from the recording sheet size for the second document, it is inhibited from forming the image of the second document on the back face of the sheet (the image of the first document was formed on its front face), irrespective of whether or not the document combination instruction is input by the operator.

FIG. 18 is a flow chart showing the printing process which is performed after the process in the flow chart of FIG. 16 was performed.

First, in a step S301, an initialization process is performed. Namely, "1" is substituted for a variable "j" representing the number of copies currently processed, and the set value of the number of copies in the part 14004 is substituted for a variable "m" representing the number of copies to be printed, and the flow advances to a step S302 to initialize current sheet information representing the sheet to be printed as a first process of one copy such that the current sheet information indicates the first page of one copy. Then, the flow advances to a step S303.

In the step S303, it is judged whether or not the current sheet information represents the last sheet. If judged that the current sheet information represents the last sheet, the flow advances to a step S304, while if judged that the current sheet information does not represent the last sheet, the flow advances to a step S305. In the step S304, it is judged whether or not the stapling is designated. If the stapling is designated in the check box 14002 on the operation screen of FIG. 14 displayed on the operation unit (i.e., the stapling designation is set in the case where the check box 14002 is checked), the flow advances to a step S306. Conversely, if the stapling is not designated, the flow advances to a step S305.

In the step S305, the sheet of the current sheet information is printed, and the flow advances to a step S307.

In the step S306, a stapling order is issued to the finisher 350, the sheet of the current sheet information is printed. Thus, the stapling is performed when the sheets are discharged. Then, the flow advances to a step S308.

In the step S307, it is judged whether or not the current sheet information represents the last sheet. If judged that the current sheet information represents the last sheet, since the pages of this copy were all output, the flow advances to the step S308 to output a next copy. Conversely, if judged that the current sheet information does not represent the last sheet, the flow advances to a step S310.

In the step S308, the variables "j" and "m" are compared with each other. If these variables are the same, since the copies were all printed, the process of this flow chart ends. Conversely, if these variables are not the same, the flow advances to a step S309 to output a next copy. In the step S309, increment of the variable "j" is performed by one, and the flow returns to the step S302. In the step S310, the current sheet information is advanced by one, and the flow returns to the step S303.

By the above process, when the plural documents to be subjected to the image forming are selected and these documents are printed at all once, the CPU 2001 controls the finisher 350 to permit to perform the stapling for each document according as the document combination is not instructed and the stapling is instructed. On the other hand, the CPU 2001 controls the finisher 350 to inhibit from performing the stapling for each document and perform the stapling at the time when the image forming for the selected documents completely ended, according as the document combination is instructed and also the stapling is instructed.

According to the present embodiment, the plural documents can be collected in the order of designation and output as one job, and the finishing operation such as the stapling and the like can be integrated. Further, when the same-sized sheets are used in the two-faced output, a blank part (face) of the output sheet can be filled with the image of the next document. Further, the usual designation to lay out the first page of the document on the front face of the two-faced output sheet can be performed. Namely, the user can perform the detailed output designation. Further, since the plural documents are collectively handled as one job, interruption, restart and cancel processes of this job are performed to these plural documents, a series of such operations is simplified.

It should be noted that the present embodiment is applicable to the image forming apparatus such as the digital copying machine or the like in which the scanner 100, the printer 300, the operation unit 2012, the image controller 2000 and the like are incorporated with others, and also applicable to a system composed of an external device such as a host computer or the like and a network printer. For example, the screens as shown in FIGS. 12 to 15 are displayed on the host computer, instruction data set on the displayed screen is correlated with the document (image data) created on the host computer, and the instruction data and the plural documents are output to the side of the image forming apparatus. Thus, these plural documents can be handled as one job on the side of the image forming apparatus. Further, the case where the predetermined memory in the apparatus is used as the memory box and the image data from the scanner 100 or the external computer is stored in this memory box was explained. However, the present embodiment is not limited to this. For example, a memory in an external device such as a management computer or the like can be used as the memory box, and image data can be appropriately extracted from the external device through a network when the data is output.

The program for realizing the process (function) of the present embodiment has been stored as program codes in the ROM of the image forming apparatus, and the CPU of this apparatus reads these codes and thus executes the above function. However, it is needless to say that the above function can be realized in a case where a storage medium storing the program codes of software for realizing the function of the present embodiment is supplied to a system or an apparatus and then a computer (or CPU or MPU) in the system or the apparatus reads and executes the program codes stored in the memory medium.

In this case, the program codes themselves read from the storage medium realize the function of the present embodiment, and the storage medium storing these program codes constitutes the present invention.

As the storage medium storing the program codes, for example, a floppy disk, a hard disk, an optical disk, a magnetooptical disk, a CD-ROM, a CD-R, a magnetic tape, a nonvolatile memory card, a ROM, or the like can be used.

Further, it is needless to say that the present invention includes not only the case where the function of the present embodiment is realized by executing the program codes read by the computer, but also a case where an OS (operating system) or the like operating on the computer performs all or part of the process according to the instructions of the program codes, whereby the function of the present embodiment is realized.

Further, it is needless to say that the present invention includes a case where the program codes read from the storage medium are once stored in a memory provided in a function expansion board inserted in the computer or a function expansion unit connected to the computer, and a CPU or the like provided in the function expansion board or the function expansion unit performs all or part of the process according to the instructions of the program codes, whereby the function of the present embodiment is realized.

As described above, for example, the plural documents can be collected in the order of designation and output as one job, and the finishing operation such as the stapling and the like can be integrated. Further, when the same-sized sheets are used in the two-faced output, the blank part (face) of the output sheet can be filled with the image of the next document. Further, the usual designation to lay out the first page of the document on the front face of the two-faced output sheet can be performed. Thus, the user can perform the detailed output designation. Further, since the plural documents are collectively handled as one job, the interruption, the restart and the cancel processes of this job are performed to these plural documents, the series of such operations is simplified.

Second Embodiment

Figure 19:
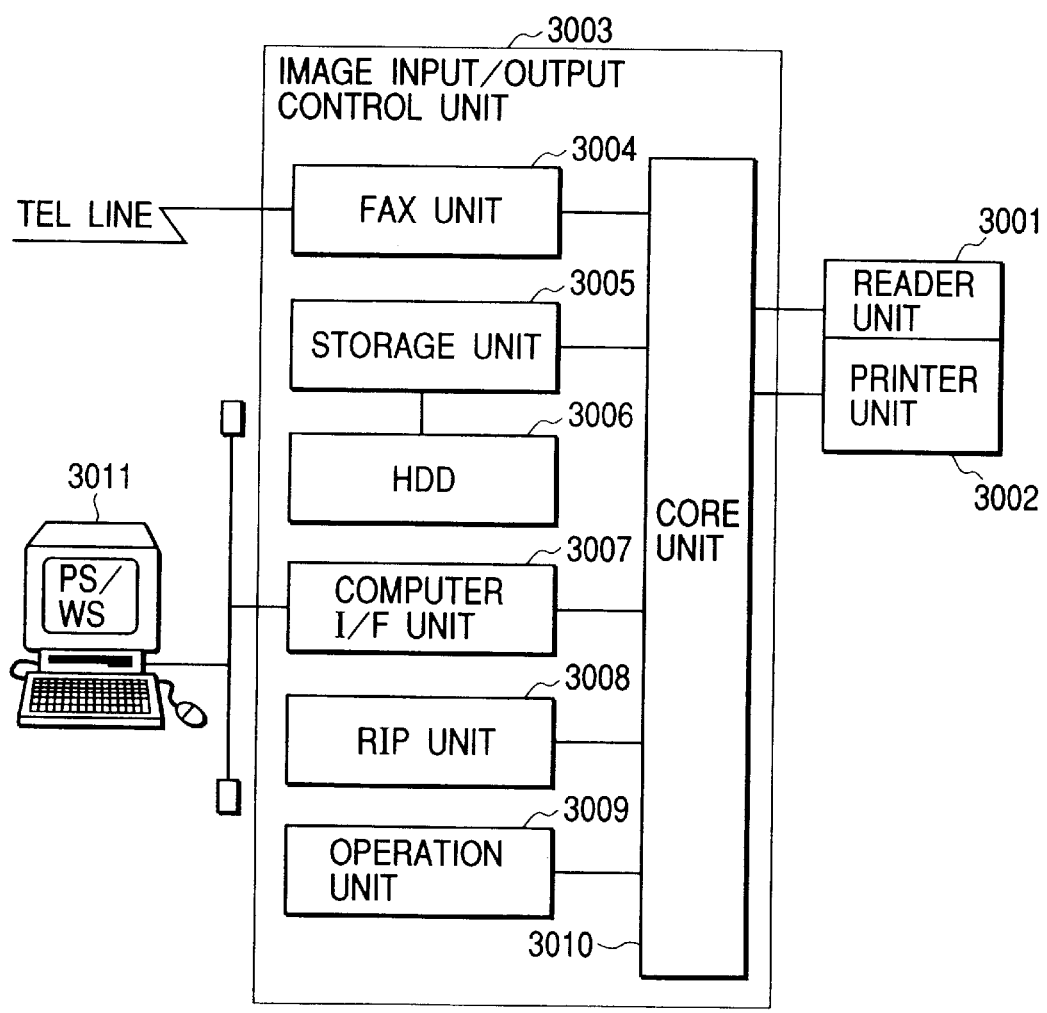
FIG. 19 is a block diagram showing the structure of an image input/output apparatus according to the second embodiment of the present invention.

FIG. 19 is a block diagram showing the structure of an image input/output apparatus to which the second embodiment of the present invention is applied.

In FIG. 19, a reader unit 3001 reads an image on an original and outputs image data corresponding to the original image to an image input/output control unit 3003. A printer unit 3002 records an image corresponding to image data transferred from the image input/output control unit 3003, on a recording sheet.

The image input/output control unit 3003 which is connected to the reader unit 3001 and the printer unit 3002 consists of a fax unit 3004, a storage unit 3005, a computer I/F (interface) unit 3007, an RIP (raster image processor) unit 3008, an operation unit 3009, a core unit 3010 and the like.

The fax unit 3004 receives compressed image data through a telephone line, decompresses the received data, and transfers the decompressed image data to the core unit 3010. Conversely, the fax unit 3004 compresses the image data transferred from the core unit 3010, and transmits the compressed data through the telephone line. The image data received and transmitted at the fax unit 30004 can be temporarily stored in an HDD (hard disk drive) 3006 connected to the storage unit 3005.

Since the storage unit 3005 is connected with the HDD 3006, the storage unit 3005 compresses the image data transferred from the core unit 3010 and then stores the compressed data into the HDD 3006 together with an ID (identification) number used to search or retrieve the stored data. The stored image data is managed as a document.

Further, the storage unit 3005 searches the compressed image data stored in the HDD 3006, on the basis of code data transferred through the core unit 3010. Then the storage unit 3005 reads the searched image data, decompresses the read data, and transfers the decompressed data to the core unit 3010.

The computer I/F unit 3007 interfaces the core unit 3010 with a PC/WS (personal computer/work station) 3011. The computer I/F unit 3007 may be connected to the PC/WS 3011 by a one-to-one local interface or by a network.

The RIP unit 3008 expands or decompresses code data (PDL (page description language) data) representing an image transferred from the PC/WS 3011 into the image data recordable by the printer unit 3002.

The operation unit 3009 includes a touch panel display and hard keys. The operation unit 3009 is used to instruct and/or set various operations of the image input/output apparatus through a user interface.

Although the details of the core unit 3010 will be described later, this core unit 3010 controls data flows among the reader unit 3001, the printer unit 3002, the fax unit 3004, the storage unit 3005, the computer I/F unit 3007, the RIP unit 3008 and the operation unit 3009.

Figure 20:
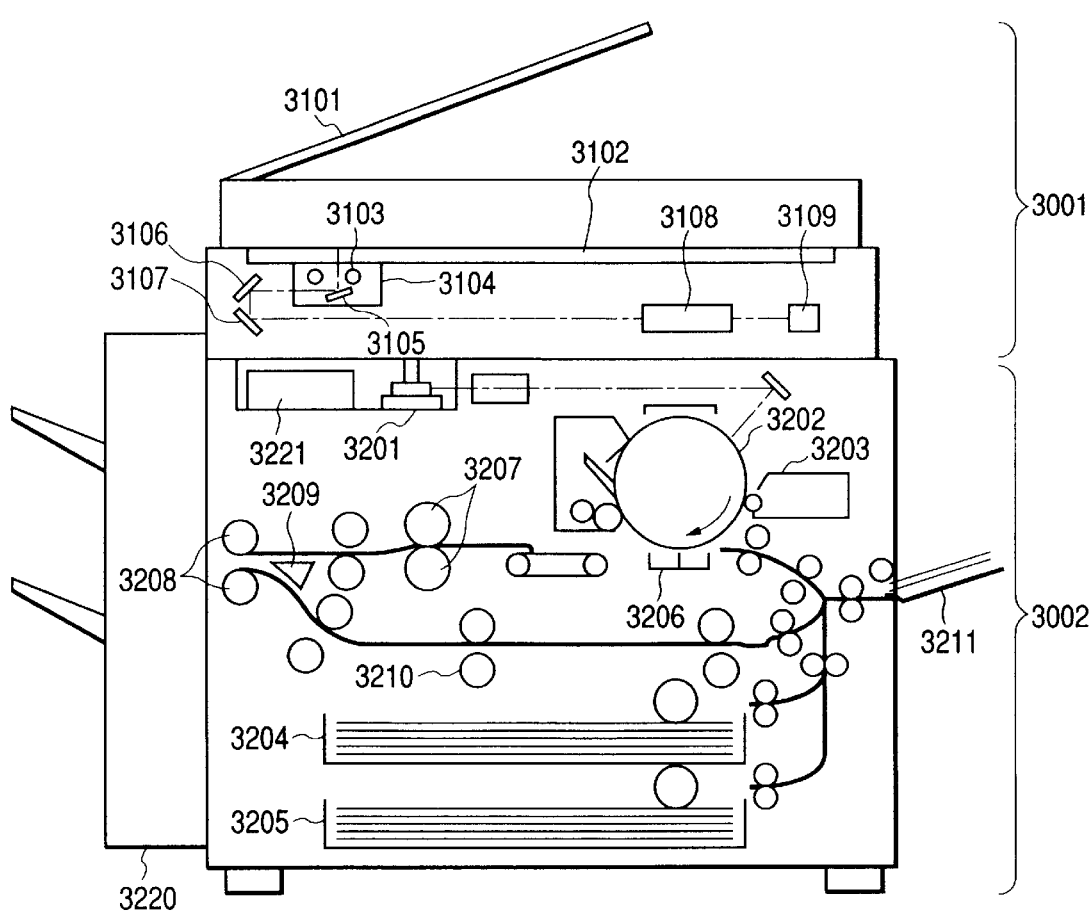
FIG. 20 is a sectional diagram for explaining the structures of a reader unit and a printer unit in FIG. 19.

FIG. 20 is a sectional view showing the reader unit 3001 and the printer unit 3002 of FIG. 19. In FIG. 20, the parts same as those shown in FIG. 19 are added with the same numerals, respectively.

In the reader unit 3001, an original feed unit 3101 feeds originals one by one from their first page in due order, to a platen glass 3102. After an original reading operation ended, the original feed unit 3101 discharges the original on the platen glass 3102.

When the original is fed onto the platen glass 3102, a lamp 3103 is lit, and movement of a scanner unit 3104 is started, whereby the original is exposed and scanned. Reflection light from the original at this time is guided into a CCD image sensor (simply referred as CCD hereinafter) 3109 through mirrors 3105, 3106 and 3107 and a lens 3108.

Thus, the image of the scanned original is read by the CCD 3109. Image data output from the CCD 3109 is subjected to predetermined processes and then transferred to the core unit 3010 of the image input/output control unit 3003.

In the printer unit 3002, a laser driver 3221 drives a laser beam generation unit 3201 to generate a laser beam according to the image data output from the core unit 3010 of the image input/output control unit 3003.

The generated laser beam is irradiated onto a photosensitive drum 3202, and a latent image according to the laser beam is formed on this photosensitive drum 3202. A developer is adhered by a development unit 3203 to the latent image portion on the photosensitive drum 3202. Then, a recording sheet is fed from any of sheet feed cassettes 3204 and 3205 and a manual feed tray 3211, and transported to a transfer unit 3206 at timing which is synchronous with start of the laser beam irradiation. Thus, the developer adhered on the photosensitive drum 3202 is transferred onto the recording sheet.

The recording sheet onto which the developer was transferred is transported to a fixing unit 3207, and the developer is heated and pressed by the fixing unit 3207, whereby the developer is fixed to the recording sheet. The recording sheet passed the fixing unit 3207 is discharged to a finisher 3220 by discharge rollers 3208. The finisher 3220 staples and/or punches the plural discharged recording sheets, and discharges them to respective sheet discharge trays.

When two-face recording has been set, after the recording sheet was transported up to the discharge rollers 3208, a rotational direction of each roller 3208 is reversed, and thus the sheet is guided to a sheet refeed transportation path 3210 by a flapper 3209. The recording sheet guided to the sheet refeed transportation path 3210 is again fed to the transfer unit 3206 at the above timing.

Figure 21:
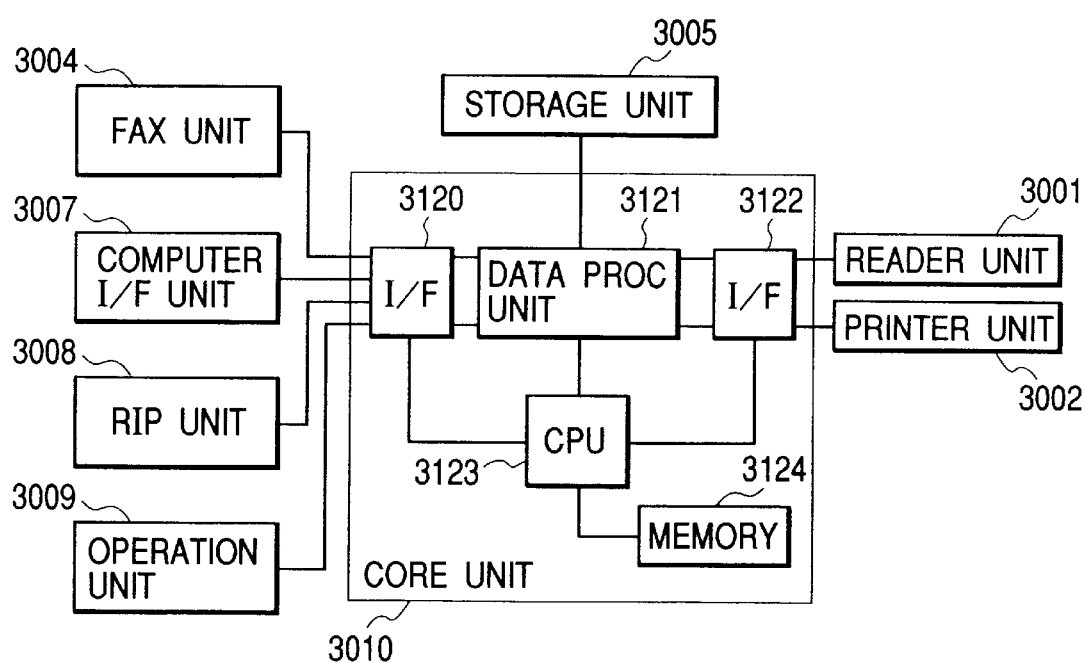
FIG. 21 is a block diagram for explaining the structure of a core unit in FIG. 19.

FIG. 21 is a block diagram showing the core unit 3010 of FIG. 19.

In FIG. 21, the image data from the reader unit 3001 is transferred to a data processing unit 3121 through an I/F (interface) 3122. The data processing unit 3121 which performs image processes (e.g., an image rotation process, a magnification change process, and the like) and compression/decompression of the image data contains a page memory storing the image data.

The image data transferred from the reader unit 3001 to the data processing unit 3121 is temporarily stored in the page memory, and then compressed and transferred to the storage unit 3005.

The code data (PDL data) representing the image input through the computer I/F unit 3007 is transferred to the data processing unit 3121 through an I/F 3120, and further transferred to the RIP unit 3008 to be expanded into the image data. The obtained image data is transferred to the data processing unit 3121, and then transferred to the storage unit 3005. The image data from the fax unit 3004 is transferred to the data processing unit 3121, and then transferred to the storage unit 3005.

After the image data from the storage unit 3005 was transferred to the data processing unit 3121, this data is further transferred to the printer unit 3002, the fax unit 3004 and/or the computer I/F unit 3007.

A CPU 3123 entirely and unitarily controls the image input/output apparatus in accordance with control programs stored in a memory 3124 or not-shown another storage medium and control commands transferred from the operation unit 3009. Also, the memory 3124 is used as an working area of the CPU 3123.

Thus, around the core unit 3010, it is possible through the storage unit 3005 to perform the process in which various functions as to original image reading, image printing, image transmission, image reception, image storage, data input/output from/to a computer and the like are combined with others.

Next, job control in the image input/output control apparatus according to the present embodiment will be explained with reference to FIG. 22.

Figure 22:
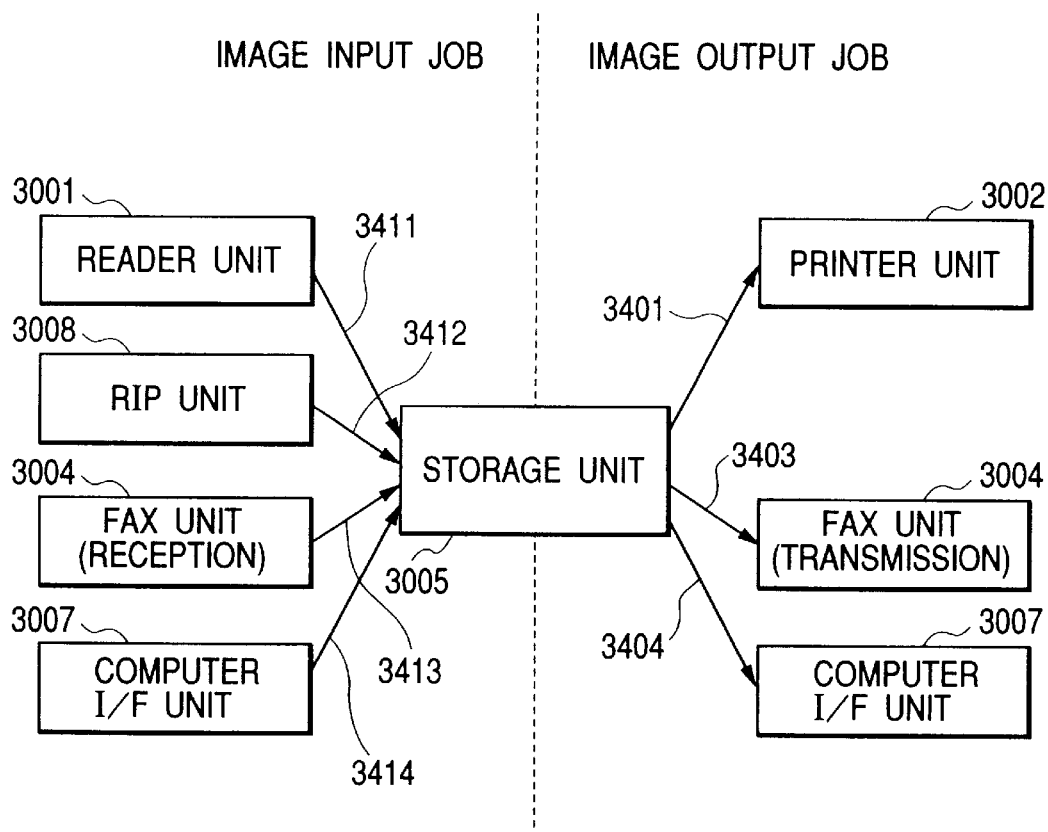
FIG. 22 is a diagram logically showing the unit of job control in the image input/output apparatus according to the second embodiment.

FIG. 22 is a diagram logically showing the unit of the job control in the image input/output apparatus according to the present embodiment. In FIG. 22, the parts same as those shown in FIG. 19 are added with the same numerals, respectively.

The unit of the job control corresponds to a series of input and output processes for a group of the image data including the plural pages. Roughly, an image input job and an image output job are the jobs to be controlled by the job control of one unit.

The image input job includes an image input job 3411 to sequentially record the image data read by the reader unit 3001 into the storage unit 3005, an image input job 3412 to sequentially record the image data expanded or decompressed by the RIP unit 3008 into the storage unit 3005, an image input job 3413 to sequentially record the image data received by the fax unit 3004 into the storage unit 3005, and an image input job 3414 to sequentially record the image data input from the computer I/F unit 3007 into the storage unit 3005.

The image output job includes an image output job 3401 to sequentially output the image data read from the storage unit 3005 to the printer unit 3002, an image output job 3403 to sequentially output the image data read from the storage unit 3005 to the fax unit 3004, and an image output job 3404 to sequentially output the image data read from the storage unit 3005 to the computer I/F unit 3007.

Figure 23:
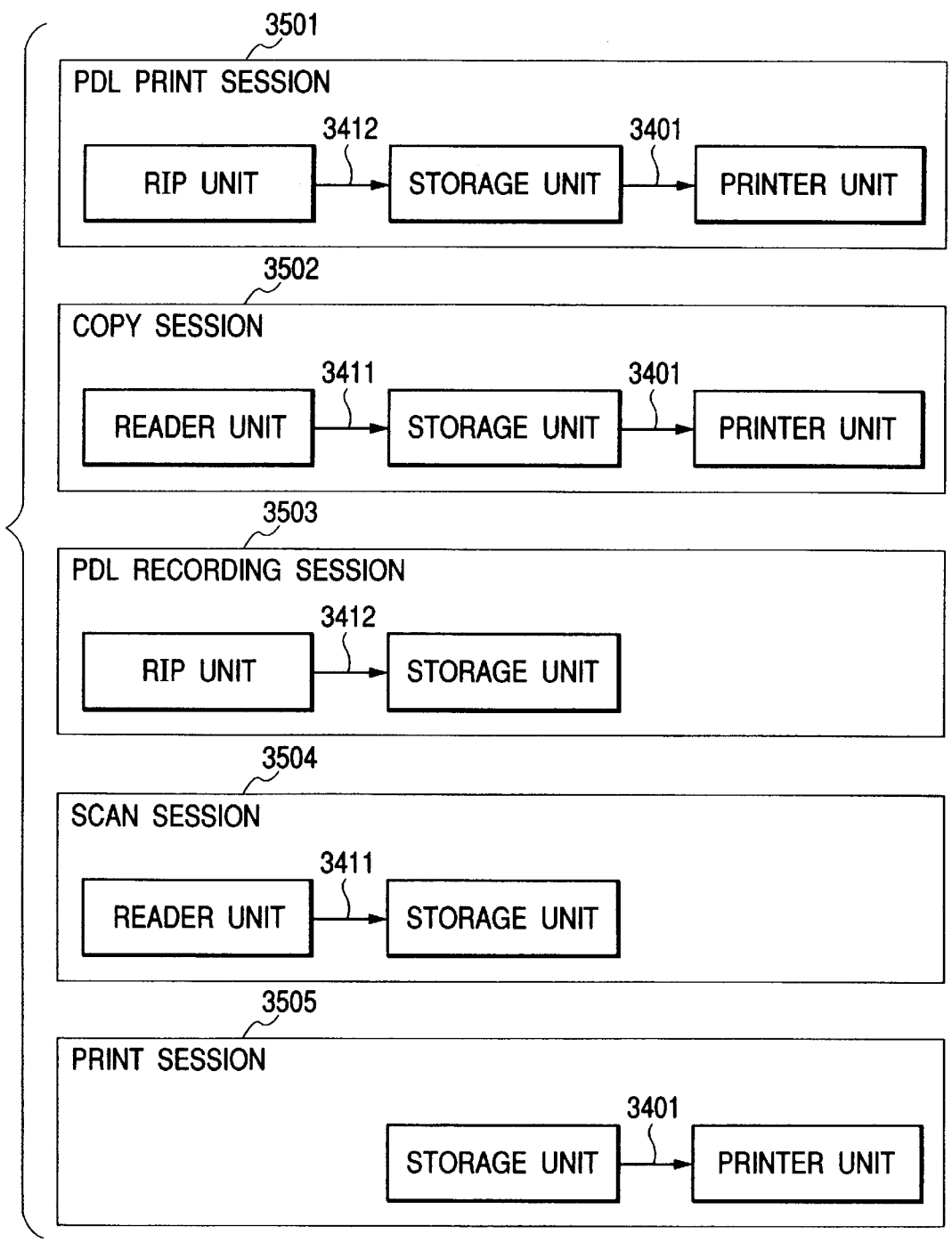
FIG. 23 is a diagram showing an example of the unit in which plural jobs (an image input job and an image output job) in FIG. 22 are combined.

FIG. 23 shows an example of the unit (called a session hereinafter) which is given by combining the plural jobs (the image input jobs 3411 to 3414 and the image output jobs 3401, 3403 and 3404) shown in FIG. 22.

In FIG. 23, numeral 3501 denotes a PDL print session in which the image input job 3412 and the image output job 3401 are combined and controlled as the session. Numeral 3502 denotes a copy session in which the image input job 3411 and the image output job 3401 are combined and controlled as the session.

Numeral 3503 denotes a PDL recording session in which only the image input job 3412 is controlled as the session. Numeral 3504 denotes a scan session in which only the image input job 3411 is controlled as the session. Numeral 3505 denotes a print session in which only the image output job 3401 is controlled as the session.

The session represents the control unit which includes one or more job. Therefore, the plural image output jobs (or the image input jobs) such as the image input job 3412, the image output job 3401 and the image output job 3403 can be combined and handled as one session.

Figure 24:
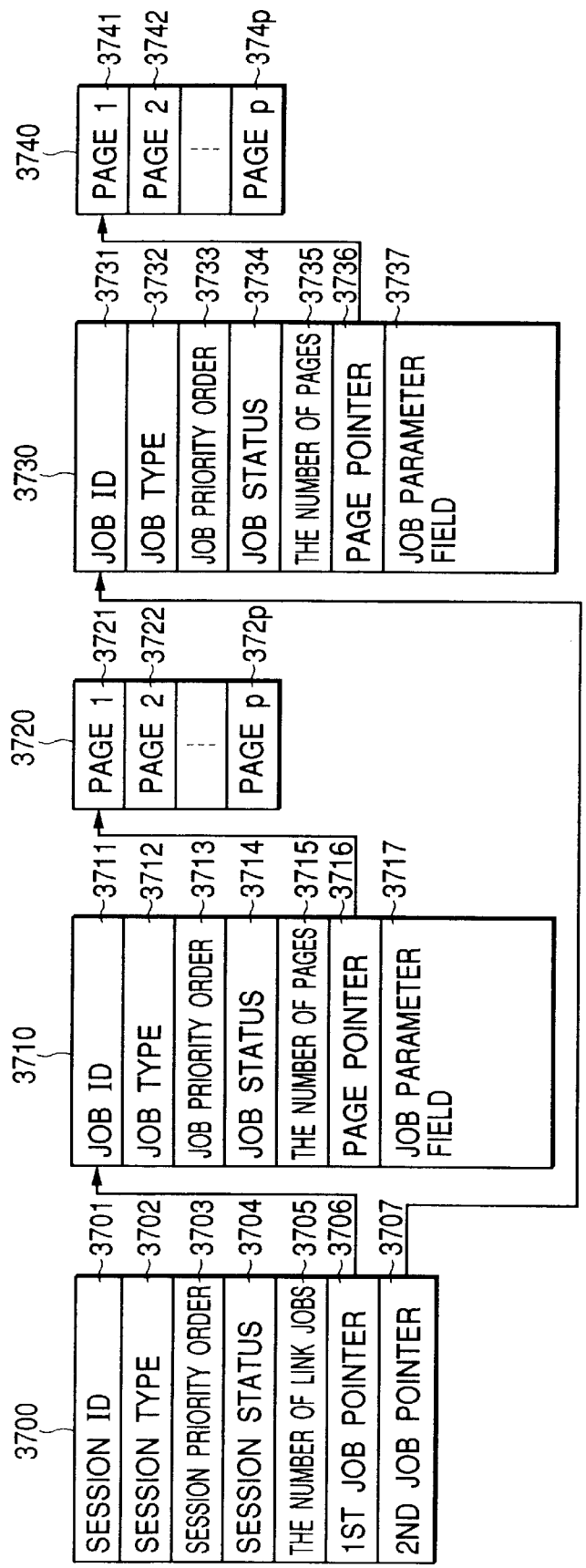
FIG. 24 is a schematic diagram showing a session management table for managing various sessions in FIG. 23.

FIG. 24 is a schematic diagram showing a session management table by which the various sessions shown in FIG. 23 are managed.

In FIG. 24, numeral 3700 denotes a session management table which is used to manage the various sessions of FIG. 23. The session management table 3700 is created by the CPU 3123 of FIG. 21, stored in the memory 3124, and maintained until the session ends.

A session ID field 3701 is to generate a unique session ID in the image input/output control apparatus and hold it. A session type field 3702 is to specify a type of the generated session (PDL print session, copy session, PDL recording session, scan session, print session, or the like). In the present embodiment, the field 3702 specifies and records the PDL print session.

A session priority order field 3703 is to hold session (executable state, execution state, interruption state, end state, error state, or the like) according to the state. A link job number field 3705 is to hold the number of the image input jobs and the image output jobs which together constitute the session. In the present embodiment, the number "2", i.e., the image input job 3412 and the image output job 3401, is set to the link job number field 3705.

A first job pointer field 3706 is the pointer for a job management table 3710 of the image input job 3412. A second job pointer field 3707 is the pointer for a job management table 3730 of the image output job 3401.

Each of job ID fields 3711 and 3731 is to generate a unique job ID in the image input/output control apparatus and hold it. Each of job type fields 3712 and 3732 is to specify a type of the generated job (above image input and output jobs). In the present embodiment, each of the job type fields 3712 and 3732 specifies and records the image input job 3412 which is to sequentially record the image data expanded or decompressed by the RIP unit into the storage unit.

Each of job priority order fields 3713 and 3733 is to hold priority of job processing order. Each of job status fields 3714 and 3734 is to hold an execution state of the job (executable state, execution state, interruption state, end state, error state, or the like) according to the state. Each of page number fields 3715 and 3735 is to hold the number of pages of the job. Page pointer fields 3716 and 3736 are the pointers respectively for page management fields 3720 and 3740 in which detailed information of each page managed by the job is written. The page management fields 3720 and 3740 are recorded on the HDD 3006.

Each of job parameter fields 3717 and 3737 are to hold various setting parameters of the job. In the present embodiment, the printing setting (the number of pages, the number of prints, a sheet size, a magnification/reduction rate, one-faced/two-faced printing, page output order, sort output, stapling stop, etc.) set by the user on the PC/WS 3011 is stored and held.

Hereinafter, an example of the session control and job control in the image input/output control apparatus of the present invention will be explained with reference to FIG. 25.

Figure 25:
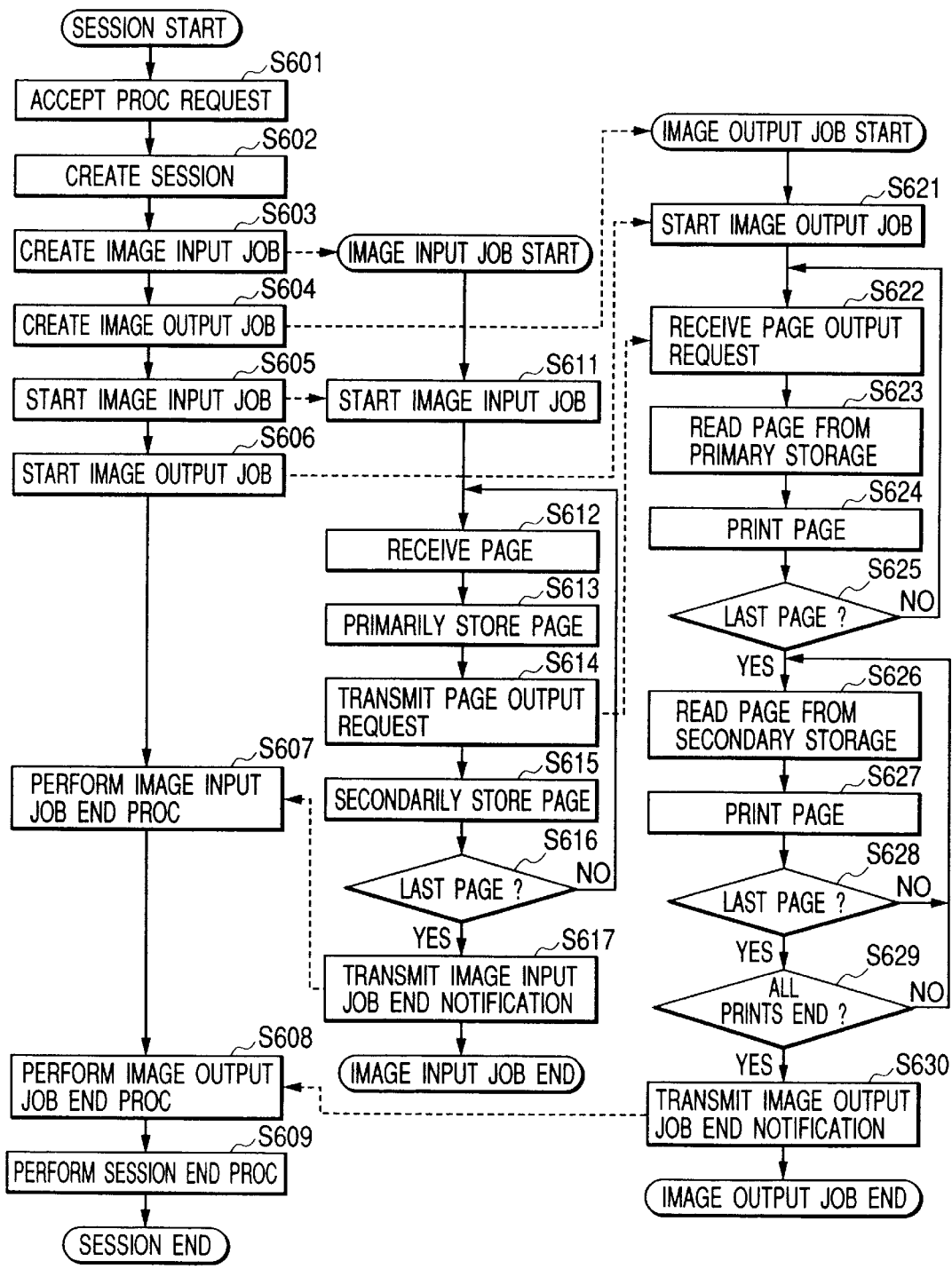
FIG. 25 is a flow chart for explaining a control processing procedure of the image input/output apparatus according to the present invention.

FIG. 25 is a flow chart for explaining a first control processing procedure of the image input/output apparatus according to the present invention. In this case, as the example of the session control and job control in the image input/output apparatus, this control processing procedure corresponds to the control procedures of the PDL print session 3501, the image input job 3412 to sequentially store the image data expanded in the RIP unit 3008 in the storage unit 3005, and the image output job 3401 to sequentially send the image data stored in the storage unit 3005 to the printer unit 3002 for printout. It should be noted that the process in FIG. 25 is performed by the CPU 3123 of FIG. 21 on the basis of the program stored in the memory 3124 or not-shown another storage medium, and symbols S601 to S609, S611 to S617 and S621 to S630 denote respective steps.

Initially, the session control process in the steps S601 to S609 will be explained.

First, the user performs the printing setting on the PC/WS 3011. The contents to be set are the number of pages, the number of prints, an original size, a magnification/reduction rate, one-faced/two-faced printing, page output order, sort output, stapling stop, and the like. After the printing setting, the user issues a printing instruction on the PC/WS 3011. Simultaneously, target document data is converted into so-called PDL data by driver software installed in the PC/WS 3011. Then, the obtained PDL data, together with the printing setting parameter, is transferred to the computer I/F unit 3007 of the image input/output apparatus through a computer interface connected to the PC/WS 3011. After the PDL data representing the image input through the computer I/F unit 3007 was transferred to the data processing unit 3121, the PDL data is further transferred to the RIP unit 3008 and sequentially expanded (or rasterized) into the image data. When the RIP unit 3008 starts to receive the PDL data, this RIP unit 3008 issues a processing request to the core unit 3010.

In the step S601, the CPU 3123 of the core unit 3010 receives the issued processing request. Here, the printing setting parameters set by the user are also transferred to the CPU 3123.

Next, in the step S602, according to the processing request from the RIP unit 3008, the session internally is generated and managed. When the session is generated, the session management table 3700 of FIG. 24 is created on the memory 3124 to hold various information until the session ends. In the step S603, the job management table 3710 of the image input job 3412 is created on the memory 3124 to hold various information in this management table until the job ends. In the step S604, the job management table 3730 of the image output job 3401 is created on the memory 3124 to hold various information in this management table until the job ends.

Next, in the step S605, the process of the generated image input job 3412 starts. In the step S606, the process of the generated image output job 3401 starts.

Next, in the step S607, when an image input job end notification is received from the image input job control process, the job status (field) in the job management table 3710 created in the step S603 ends (i.e., an image input job end process is performed). In the step S608, when an image output job end notification is received from the image output job control process, the job status (field) in the job management table 3730 created in the step S604 ends (i.e., an image input job end process is performed).

Next, in the step S609, the job management table 3710 created in the step S603, the job management table 3730 created in the step S604, and the image data for each page are discarded, and thus resources are released. Also, the session management table 3700 created in the step S602 is discarded, and thus resources are released (i.e., a session end process is performed). Thus, a series of the session control processes ends.

Next, the image input job control process in the step S611 to S617 will be explained.

First, in the step S611, the image input job is started. In the step S612, the image data of one page expanded by the RIP unit 3008 is received. Namely, the image is transferred from the RIP unit 3008 to the data processing unit 3121 through the I/F 3120.

In the step S613, the image data transferred to the data processing unit 3121 is once primarily stored in the internal page memory In the step S614, a page output request is transmitted to the image output job control process. In the step S615, the image data primarily stored in the page memory in the data processing unit 3121 is compressed and transferred to the storage unit 3005 through the I/F 3120, and the transferred image data is secondarily stored in the HDD 3006. At this time, various image attribute information is stored at a page 1 field 3721 in the page management field 3720.

Next, in the step S616, it is judged whether or not all the pages expanded in the RIP unit 3008 and to be processed are recorded as the image data in the HDD 3006. If the page not recorded in the HDD 3006 as the image data remains, the flow returns to the step S612. Conversely, if all the pages expanded in the RIP unit 3008 and to be processed are recorded in the HDD 3006 as the image data, the flow advances to the step S617.

In the step S617, the image input job end notification is transmitted to the session control process, and the series of processes in the image input job control process ends.

Next, the image output job control process in the steps S621 to S630 will be explained.

When the image input job is started in the step S611, in the step S621 the process of the image output job 3401 is started.

In the step S622, the page output request is received from the image input job control process. Then, in the step S623, the image data for each page primarily stored in the page memory of the data processing unit 3121 is sequentially read, and in the step S624, the read image data is transferred to the printer unit through the I/F 3122. Thus, as described above, the printer unit 3002 performs image formation and prints out the formed image.

Next, in the step S625, it is judged whether or not all the pages to be printed out are actually printed out. If the page to be printed out remains, the flow returns to the step S622. Conversely, if all the pages to be printed out are actually printed out, the flow advances to the step S626.

In the step S626, the image data for each page which was stored in the HDD 3006 of the storage unit 3005 is sequentially read and transferred to the data processing unit 3121 through the I/F 3120. In the step S627, the image data transferred to the data processing unit 3121 is further transferred to the printer unit 3002 through the I/F 3122. Thus, as described above, the printer unit 3002 performs the image formation and prints out the formed image.

In the step S628, it is judged whether or not the image data of each page secondarily stored in the HDD 3006 are all printed out. If the page not yet printout processed remains in the HDD 3006, the flow returns to the step S626. Conversely, if all the pages secondarily stored in the HDD 3006 are all printed out, the flow advances to the step S629.

Next, in the step S629, it is judged whether or not all the prints of which number was set to the job parameter field 3737 are output (printout). If the printing not yet processed remains, the flow returns to the step S626. Conversely, if all the prints are processed, the flow advances to the step S630. In the step S630, an image output job end notification is transmitted to the session control process, and the series of processes in the image output job control process ends.

As described above, it was explained the case where, according to the printing setting by the PC/WS 3011, the image information is transferred as the PDL data from the PC/WS 3011, the PDL data is expanded into the image data by the image input/output apparatus, and the obtained image data is printed and output. However, the above process is also applicable to the case where the image information read by the reader unit 3001 is printed and output (i.e., the copy session 3502).

Further, the above process is similarly applicable to the PDL recording session 3502 and the scan session 3504. In this case, the control steps S604, S606 and S608 concerning the image output job are omitted in the above flow chart.

Further, the above process is similarly applicable to the print session 3505. In this case, the control steps S603, S605 and S607 concerning the image input job are omitted in the above flow chart.

As described above, the present embodiment is applicable to the case where an arbitrary session is structured by combining an arbitrary image input job and an arbitrary image output job.

Figure 26:
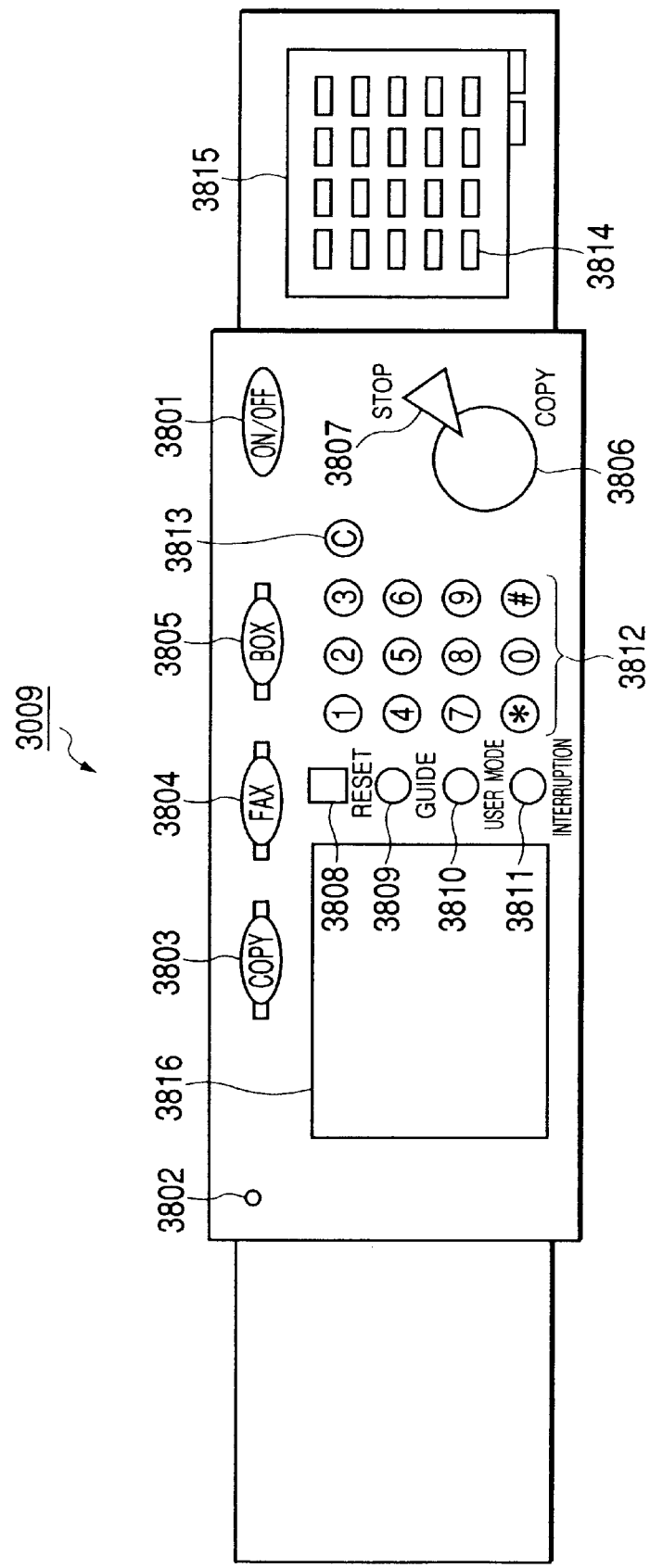
FIG. 26 is a plan view for explaining the configuration of the operation unit in FIG. 19.

FIG. 26 shows the appearance of the operation unit 3009 of FIG. 19.

In FIG. 26, numeral 3801 denotes a power supply key which is depressed to turn on and off a power supply, and numeral 3802 denotes a preheating key which is depressed to set and release a preheating state. Numeral 3806 denotes a start key which is depressed to start a copying operation and the like, and numeral 3807 denotes a stop key which is depressed to stop the copying operation and the like.

Numeral 3803 denotes a copy function selection key which is depressed to select a copy mode, and numeral 3804 denotes a fax function selection key which is depressed to select a fax mode for performing fax transmission.

Numeral 3805 denotes a memory box function selection key which is depressed to select a memory box mode. In this memory box mode, a memory box function to perform the printout only after a password is input from the PC/WS 3011 is used.

Numeral 3812 denotes numeric keys which are depressed to input the number of copies, a zooming magnification and the like, and numeral 3813 denotes a clear key which is depressed to clear the input by the numeric keys 3812.

Numeral 3808 denotes a reset key which is depressed to return the copy mode to the default, and numeral 3809 denotes an operation guide key which is depressed to set and release a guide mode in which an operation explanation screen is displayed.

Numeral 3810 denotes a user mode setting key which is depressed to set or release a user mode, and numeral 3811 denotes an interruption copy key which is depressed to perform interruption copying while a normal copying operation is being performed. Numeral 3814 denotes a facsimile one-touch key which is depressed to perform fax transmission to the registered fax destination, numeral 3815 denotes a one-touch key changeable template which is opened and closed to change fax one-touch keys, and numeral 3816 denotes a touch panel on which various messages and various soft keys are displayed. It should be noted that the user can perform the various operations by touching the soft keys displayed on the touch panel 3816.

Hereinafter, the operation screens displayed on the touch panel 3816 of the operation unit 3009 shown in FIG. 26 will be explained with reference to FIGS. 27 to 33.

Figure 27:
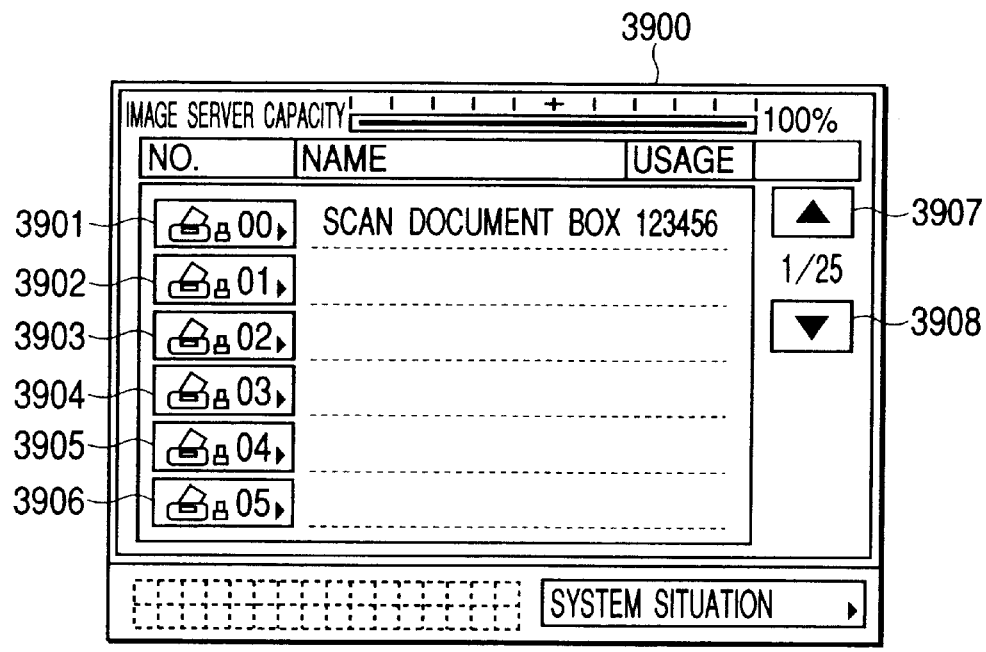
FIG. 27 is a schematic diagram showing an example of a memory box list display screen displayed on the touch panel of the operation unit in FIG. 26.

FIG. 27 is a schematic diagram showing an example of a memory box list display screen displayed on the touch panel 3816 of the operation unit 3009 in FIG. 26.

In FIG. 27, numeral 3900 denotes the memory box list display screen which is displayed when the memory box function selection key 3805 on the operation unit 3009 is touched.

There are the plural memory boxes in the HDD 3006, and a memory box name can be added to each box. Numeral 3901 denotes a selection key for a memory box "00", numeral 3902 denotes a selection key for a memory box "01", numeral 3903 denotes a selection key for a memory box "02", numeral 3904 denotes a selection key for a memory box "03", numeral 3905 denotes a selection key for a memory box "04", and numeral 3906 denotes a selection key for a memory box "05". When any of these keys is touched, a later-described document list display screen of FIG. 28 is displayed.

Numerals 3907 and 3908 respectively denote upward and downward scroll keys which are touched to upward and downward shift the display area of the memory box selection key displayed on the memory box list display screen 3900.

Figure 28:
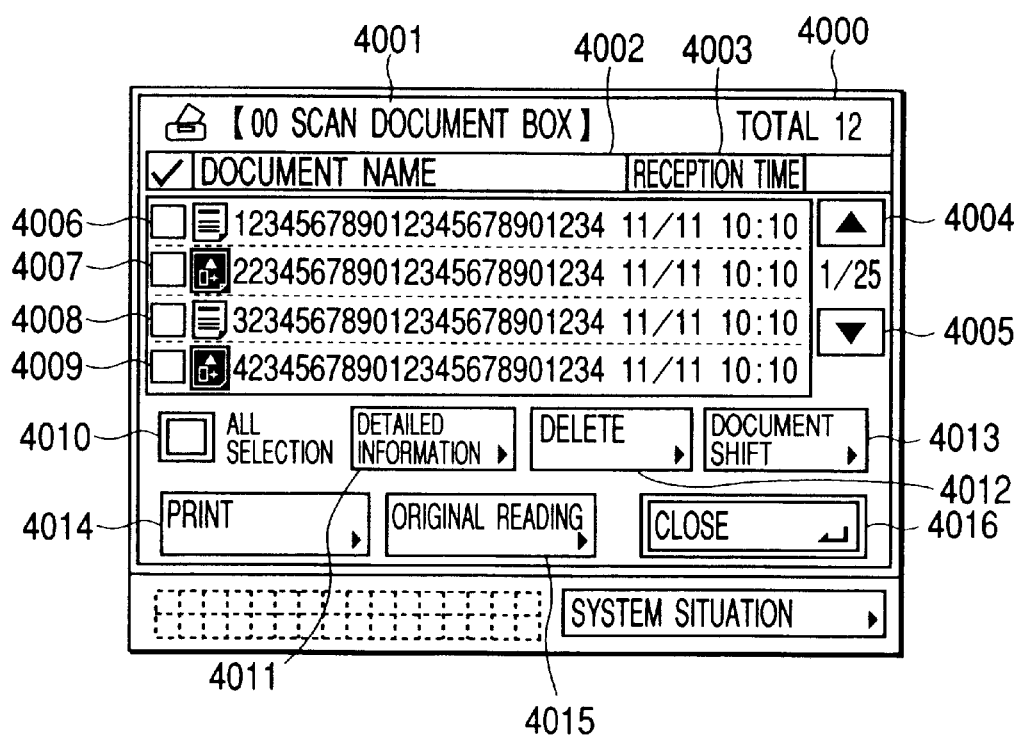
FIG. 28 is a schematic diagram showing an example of a document list display screen displayed on the touch panel of the operation unit in FIG. 26.
Figure 29:
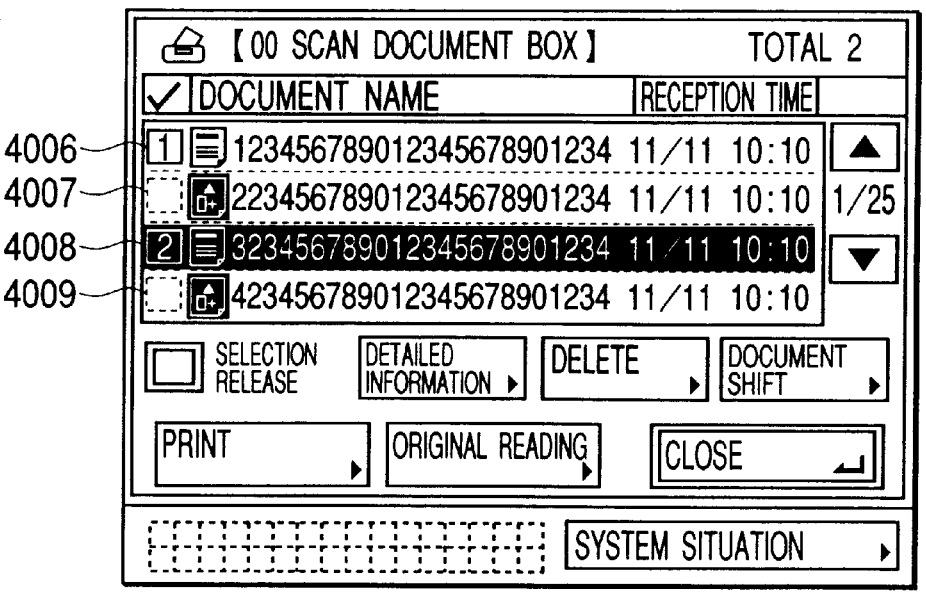
FIG. 29 is a schematic diagram showing the example of the document list display screen displayed on the touch panel of the operation unit in FIG. 26.

FIGS. 28 and 29 are schematic diagrams showing examples of the document list display screens displayed on the touch panel 3816 of the operation unit 3009 in FIG. 26.

In FIGS. 28 and 29, numeral 4000 denotes the document list display screen which is displayed by touching any of the selection keys 3901 to 3906 respectively corresponding to the memory boxes "00" to "05" on the memory box list display screen 3900.

Numeral 4001 denotes a memory box name display field in which the name of the memory box selected on the memory box list display screen 3900 is displayed. Numeral 4002 denotes a document name display field in which the names of documents stored in the memory box of which name is displayed in the memory box name display field 4001.

Numeral 4003 denotes a reception time display field in which a reception time of the document data of which name is displayed in the document name display field 4002 is displayed.

Numerals 4006, 4007, 4008 and 4009 denote document selection buttons. Each button is touched to select the document stored in the memory box of which name is displayed in the memory box name display field 4001. Numeral 4010 denotes an all-document selection button which is touched to select all the documents stored in the memory boxes of which names are displayed in the memory box name display field 4001.

In the example of FIG. 29, the plural documents are selected in the order of the document "12345 . . . " and the document "22345 . . . " by sequentially touching the document selection buttons 4006 and 4008. It is assumed that, in the document printing, the selected document are sequentially printed in the selection order.

Numeral 4011 denotes a detailed information display key which is touched to display the detailed information of the selected document, and numeral 4012 denotes a document delete key which is touched to delete the selected document from the memory box (i.e., the HDD 3006).

Figure 30:
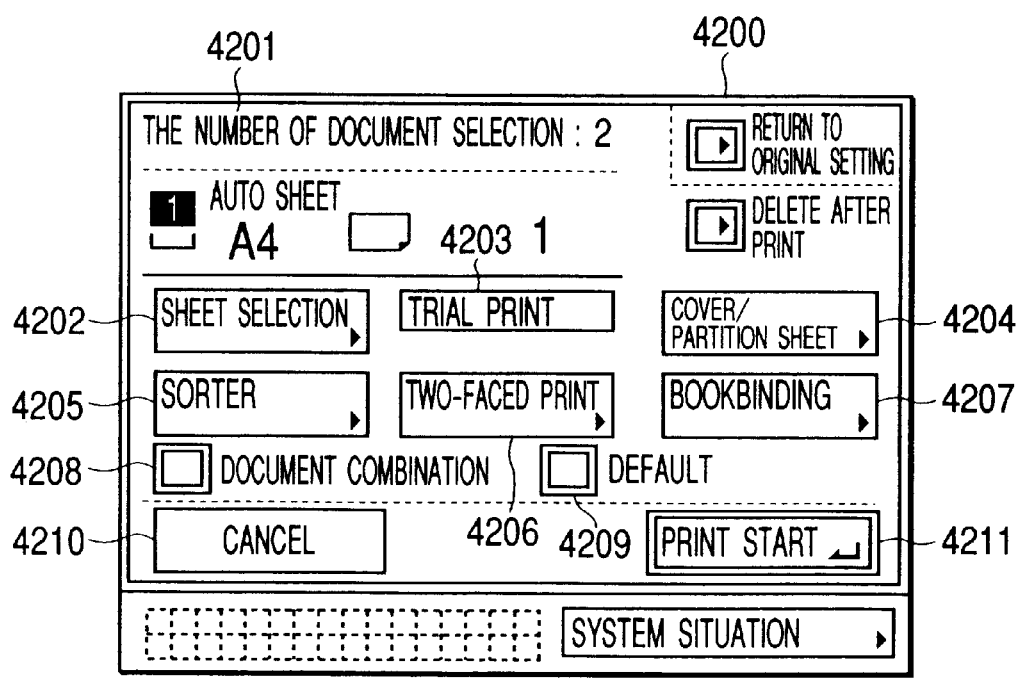
FIG. 30 is a schematic diagram showing an example of a printing setting screen displayed on the touch panel of the operation unit in FIG. 26.

Numeral 4013 denotes a document shift key which is touched to shift the selected document to another memory box or the like, and numeral 4014 denotes a print key which is touched to print out the selected document. When the print key 4014 is touched after the document selection button 4006, 4007, 4008 or 4009 or the all-document selection button 4010, a later-described printing setting screen of FIG. 30 is displayed. Numeral 4015 denotes an original reading key which is touched to read an original which should be combined with the selected document, and numeral 4016 denotes a close key which is touched to close the document list display screen 4000.

Numerals 4004 and 4005 respectively denote upward and downward scroll keys which are touched to upward and downward shift the display area of the document selection buttons displayed on the document list display screen 4000.

FIG. 30 is a schematic diagram showing an example of the printing setting screen displayed on the touch panel 3816 of the operation unit 3009 of FIG. 26.

In FIG. 30, numeral 4200 denotes the printing setting screen which is displayed by touching the print key 4014 after the document was selected.

Numeral 4201 denotes a number of document selection display field in which the number of documents selected in the document list display screen 4000 is displayed, numeral 4202 denotes a sheet selection key which is touched to select the recording sheet, and numeral 4203 denotes a trial print key which is touched to perform trial printing for a first one page.

Numeral 4204 denotes a cover/partition sheet key which is touched to add a cover and/or a partition sheet, numeral 4205 denotes a sorter key which is touched to perform sorting output, and numeral 4206 denotes a two-faced print key which is touched to perform two-faced printing. When the two-faced print key 4206 is touched, a later-described two-faced printing detailed setting screen of FIG. 31 is displayed.

Numeral 4207 denotes a bookbinding key which is touched to perform bookbinding printing. Numeral 4208 denotes a document combination button which is touched to combine the plural selected documents (i.e., select a first reduction image arrangement mode) and release such combination (i.e., select a second reduction image arrangement mode). Namely, in the first reduction image arrangement mode to be set when the document combination button 4208 is touched in the default, respective original images of the plural selected documents are subjected to image forming such that these original images are continuously arranged on the recording medium. Then, when the document combination button 4208 is again touched in this state, the second reduction image arrangement mode is set. In this mode, respective original images of the plural selected documents are subjected to image forming such that the first original image of each document is surely arranged at the head of the recording medium.

Figure 32:
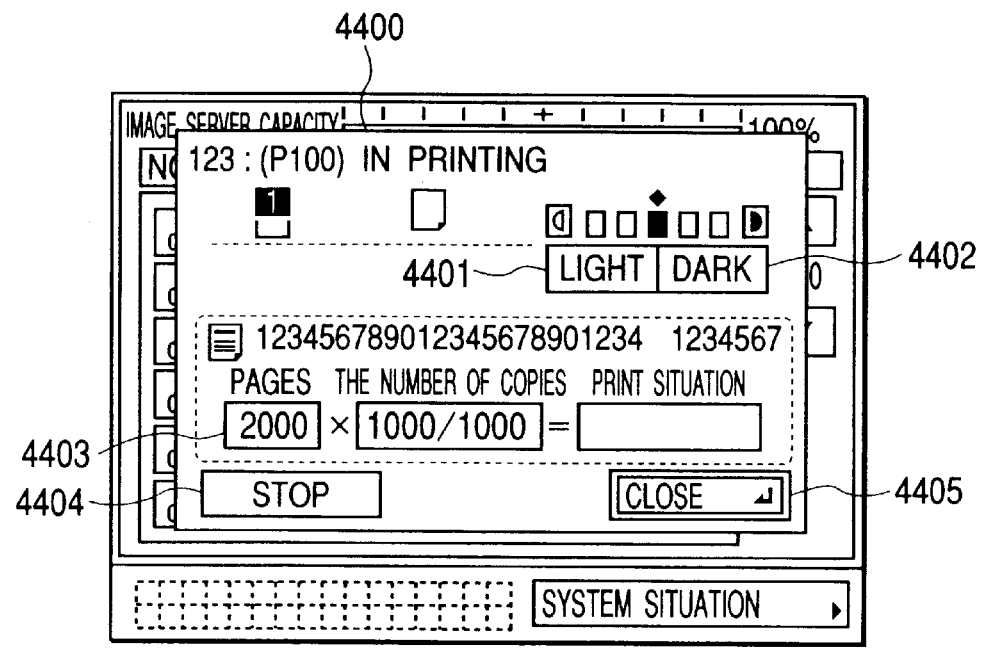
FIG. 32 is a schematic diagram showing an example of a printing situation display screen displayed on the touch panel of the operation unit in FIG. 26.

Numeral 4209 denotes a reset key which is touched to return the current printing setting to the default. Numeral 4210 denotes a cancel key which is touched to cancel the current printing setting, whereby the current screen is returned to the document list display screen 4000. Numeral 4211 denotes a printing start key which is touched to start the printing in the printing setting on the printing setting screen 4200. When the printing start key 4211 is touched, a later-described printing situation display screen of FIG. 32 is displayed.

Figure 31:
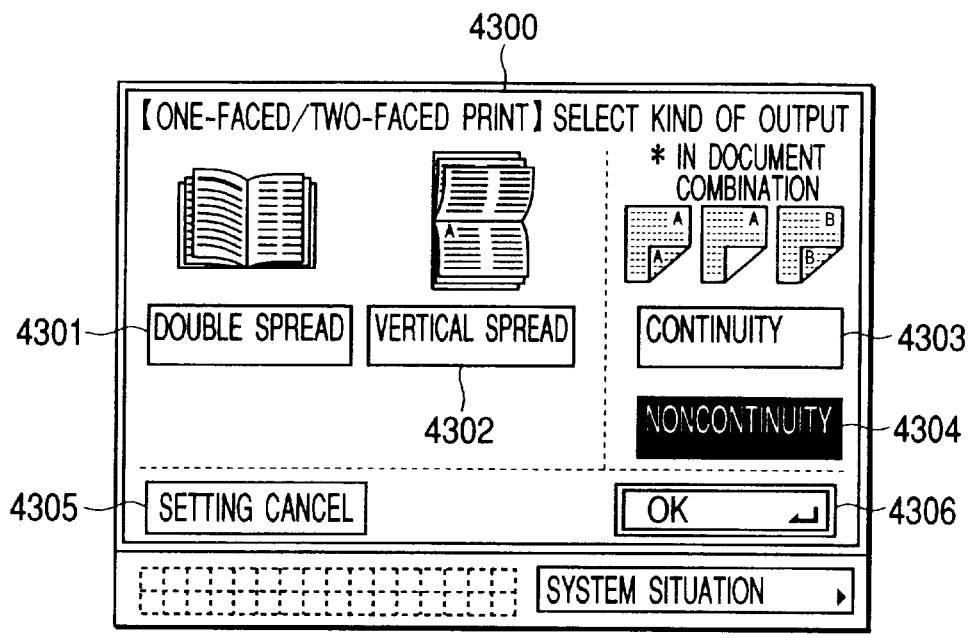
FIG. 31 is a schematic diagram showing an example of a two-faced printing detailed setting screen displayed on the touch panel of the operation unit in FIG. 26.

FIG. 31 is a schematic diagram showing an example of the two-faced printing detailed setting screen displayed on the touch panel 3816 of the operation unit 3009 in FIG. 26.

In FIG. 31, numeral 4300 denotes the two-faced printing detailed setting screen which is displayed by touching the two-faced print key 4206 of FIG. 30.

Numeral 4301 denotes a double spread selection key which is touched to select the two-faced printing in which the longer edge of the sheet is set vertically and the directions of the documents printed on the front and back faces of the sheet are set to be the same. Numeral 4302 denotes a vertical spread selection key which is touched to select the two-faced printing in which the shorter edge of the sheet is set vertically and the directions of the documents printed on the front and back faces of the sheet are set to be different by 180°.

Numeral 4303 denotes a continuity two-faced print key in case of combining the documents. The continuity two-faced print key 4303 is touched to select the two-faced printing (in a first two-faced output mode) in which the printing is performed such that the pages of the successive two of the plural selected documents are set to be continuous between the front and back faces of the recording sheet. By touching the continuity two-faced print key 4303, for example, when the document (document 1) first subjected to the printing process consists of the image data of odd number pages, the last page of the document 1 is subjected to the image forming on the front face of the recording sheet, and the first page of the next-processed document (document 2) is surely subjected to the image forming on the back face of the last page of the document 1.

Numeral 4304 denotes a noncontinuity two-faced print key in case of combining the documents. The noncontinuity two-faced print key 4304 is touched to select the two-faced printing (in a second two-faced output mode) in which the first page of each of the plural documents selected by the document selection means is surely subjected to the image forming on the front face of the recording sheet. For example, when the document (document 1) first subjected to the printing process consists of the image data of odd number pages, the last page of the document 1 is subjected to the image forming on the front face of the recording sheet, and the first page of the next-processed document (document 2) is surely subjected to the image forming on the front face of another recording sheet.

Numeral 4305 denotes a setting cancel key which is touched to cancel the two-faced printing detailed setting, whereby the current screen is returned to the printing setting screen 4200.

Numeral 4306 denotes an OK key which is touched to set the two-faced printing detailed setting available, whereby the current screen is returned to the printing setting screen 4200.

FIG. 32 is a schematic diagram showing an example of the printing situation display screen displayed on the touch panel 3816 of the operation unit 3009 in FIG. 26.

In FIG. 32, numeral 4400 denotes the printing situation display screen which is displayed by touching the printing start key 4211 of FIG. 30.

Numerals 4401 and 4402 respectively denote light and dark density setting keys which are touched to change a printing density. Numeral 4403 denotes a printing situation display area in which the number of pages, the number of prints, and the number of print end up to now for the document combination currently in printing are displayed.

Numeral 4404 denotes a stop key which is touched to stop the printing process which is being performed, and numeral 4405 denotes a close key which is touched to close the printing situation display screen 4400. Hereinafter, the two-faced output method for the plural documents in the image input/output apparatus according to the present embodiment will be explained with reference to FIG. 33.

Figure 33:
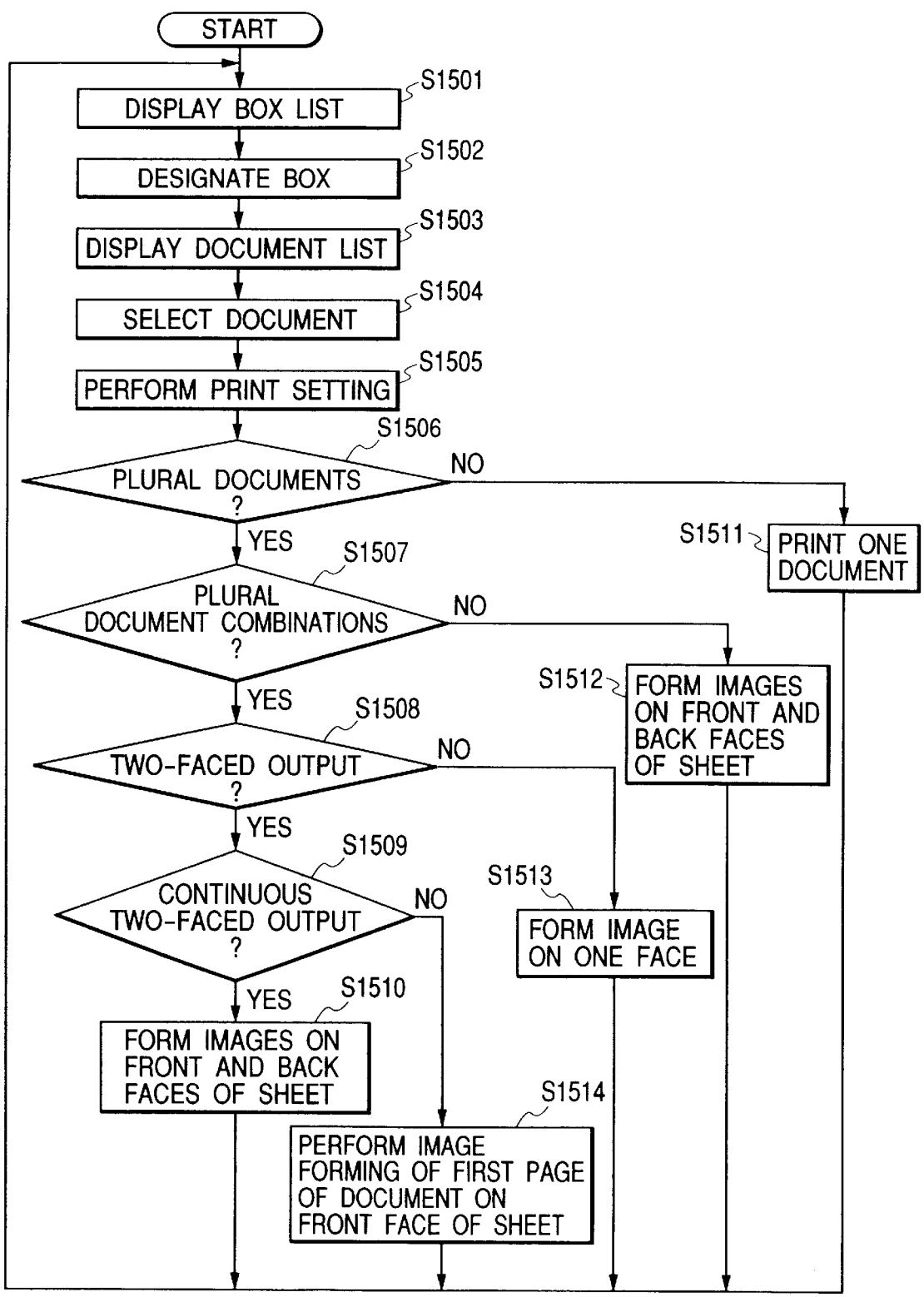
FIG. 33 is a flow chart showing a control processing procedure of the image input/output apparatus according to the present invention.

FIG. 33 is a flow chart showing a second control processing procedure of the image input/output apparatus according to the present invention. This is an example of the control procedure of the two-faced output method for the plural documents. It should be noted that the process in FIG. 33 is performed by the CPU 3123 of FIG. 21 on the basis of the program stored in the memory 3124 or not-shown another storage medium, and symbols S1501 to S1514 denote respective steps.

First, in the step S1501, when the memory box function selection key 3805 on the operation unit 3009 is touched, the memory box list display screen 3900 of FIG. 27 is displayed. Next, in the step S1502, the selection key 3901 corresponding to the memory box "00" is touched, and the flow advances to the step S1503 to display the document list display screen 4000 of FIG. 28.

Next, in the step S1504, the document shown in FIG. 28 is selected, and the result of such the selection is shown in FIG. 29. In this example, FIG. 29 shows the case where the plural documents are simultaneously selected by touching the document selection keys 4006 and 4008.

When the print key 4014 is touched on the document list display screen 4000, the flow advances to the step S1505 to display the printing setting screen 4200 of FIG. 30. Then, the various printing settings are performed on the two-faced printing detailed setting screen 4300 of FIG. 31 which is displayed by touching the two-faced print key 4206 on the printing setting screen 4200, and the printing start key 4211 is touched after the settings ended, whereby the printing operation is started.

In the step S1506, it is judged whether or not the plural documents are selected. If judged that only one document is selected, the flow advances to the step S1511.

In the step S1511, the selected and designated document is read from the HDD 3006 and subjected to the printing operation. In the printing operation, the print session 3505 is created, and the image output job 3401 is created. After the printing operation ended, the flow returns to the step S1501.

Conversely, if judged in the step S1506 that the plural documents are selected, the flow advances to the step S1507 to judge whether or not the document combination for the plural selected documents is designated (i.e., the document combination button 4208 of FIG. 30 is touched). If judged that the document combination is not designated, the flow advances to the step S1512.

In the step S1512, the plural selected and designated documents are sequentially read from the HDD 3006 in the designation order and subjected to the printing operation. Namely, according to the designation order, the print session 3505 is created, the image output job 3401 is created, and the printing operation is performed. After the printing operation ended, the flow returns to the step S1501.

Conversely, if judged in the step S1507 that the document combination for the plural selected documents is designated (i.e., the document combination button 4208 of FIG. 30 is touched), the flow advances to the step S1508 to judge whether or not the two-faced printing is designated (i.e., the two-faced print key 4206 is touched). If judged that the two-faced printing is not designated (i.e., the one-faced printing is designated), the flow advances to the step S1513.

In the step S1513, each page of the plural selected documents is sequentially subjected to the one-faced printing. Namely, the print session 3505 is created, the image output job 3401 is created, and the printing operation is performed. In this case, the sum of the page numbers included in the plural selected documents are processed as one image output job. After the printing operation ended, the flow returns to the step S1501.

Conversely, if judged in the step S1508 that the two-faced printing is designated (i.e., the two-faced print key 4206 is touched). It is further judged in the step S1509 whether or not the continuity two-faced printing is designated in the two-faced output. Namely, it is judged whether the continuity two-faced print key 4303 is touched to select the first two-faced output mode, or the noncontinuity two-faced print key 4304 is touched to select the second two-faced output mode. If judged that the continuity two-faced printing is not designated, the flow advances to the step S1514.

In the step S1514, the two-faced image forming is performed in the second two-faced output mode, by using the sheet refeed transportation path 3210. Namely, the print session 3505 is created, the image output job 3401 is created, and the printing operation is performed. In this case, the sum of the page numbers included in the plural selected documents are processed as one image output job. At this time, the image forming is performed such that the first page of the document is surely set on the front face of the output sheet. If it is assumed that the selected documents consist of the document 1 (including five pages) and the document 2 (including seven pages), these five pages of the document 1 are respectively printed on the two (front/back) faces of the sheets, i.e., page 1/page 2, page 3/page 4, and page 5/blank. Namely, when the number of pages included in the document is an odd number, the back face of the last-discharged recording sheet is blank. Further, the seven pages of the document 2 are respectively printed on the two (front/back) faces of the sheets, i.e., page 1/page 2, page 3/page 4, page 5/page 6, and page 7/blank. The output examples are shown in later-described FIG. 34. After the printing operation ended, the flow returns to the step S1501.

As described above, when the second two-faced output mode is selected and the document the number of pages of which is an odd number is included in the plural selected documents, the CPU 3123 performs the control to output with blank the back face of the recording medium to which the last page of the document the number of pages of which is the odd number is formed.

Conversely, if judged in the step S1509 that the continuity two-faced printing is designated in the two-faced output, i.e., the continuity two-faced print key 4303 is touched to select the first two-faced output mode, or the noncontinuity two-faced print key 4304 is touched, the flow advances to the step S1510 to perform the two-faced image forming in the first two-faced output mode by using the sheet refeed transportation path 3210. Namely, the print session 3505 is created, the image output job 3401 is created, and the printing operation is performed. In this case, the sum of the page numbers included in the plural selected documents are processed as one image output job. At this time, in order not to surely set any blank sheet between the last page of the document 1 and the first page of the document 2, the image forming is performed such that the front and back faces of the output sheet are set to be continuous. If it is assumed that the selected documents consist of the document 1 (including five pages) and the document 2 (including seven pages), these pages of the documents 1 and 2 are respectively printed on the two (front/back) faces of the sheets, i.e., page 1 of document 1/page 2 of document 1, page 3 of document 1/page 4 of document 1, page 5 of document 1/page 1 of document 2, page 2 of document 2/page 3 of document 2, page 4 of document 2/page 5 of document 2, and page 6 of document 2/page 7 of document 2. The output examples are shown in later-described FIG. 35.

In the case the plural selected documents are subjected to the image forming on the two faces of the recording medium, when the last image forming ends on the one face of the recording medium, the CPU 3123 performs the control to discharge the back face of this recording medium with blank.

Further, the CPU 3123 performs the control to perform the image forming of the selected documents in the order of selection.

Figure 34:
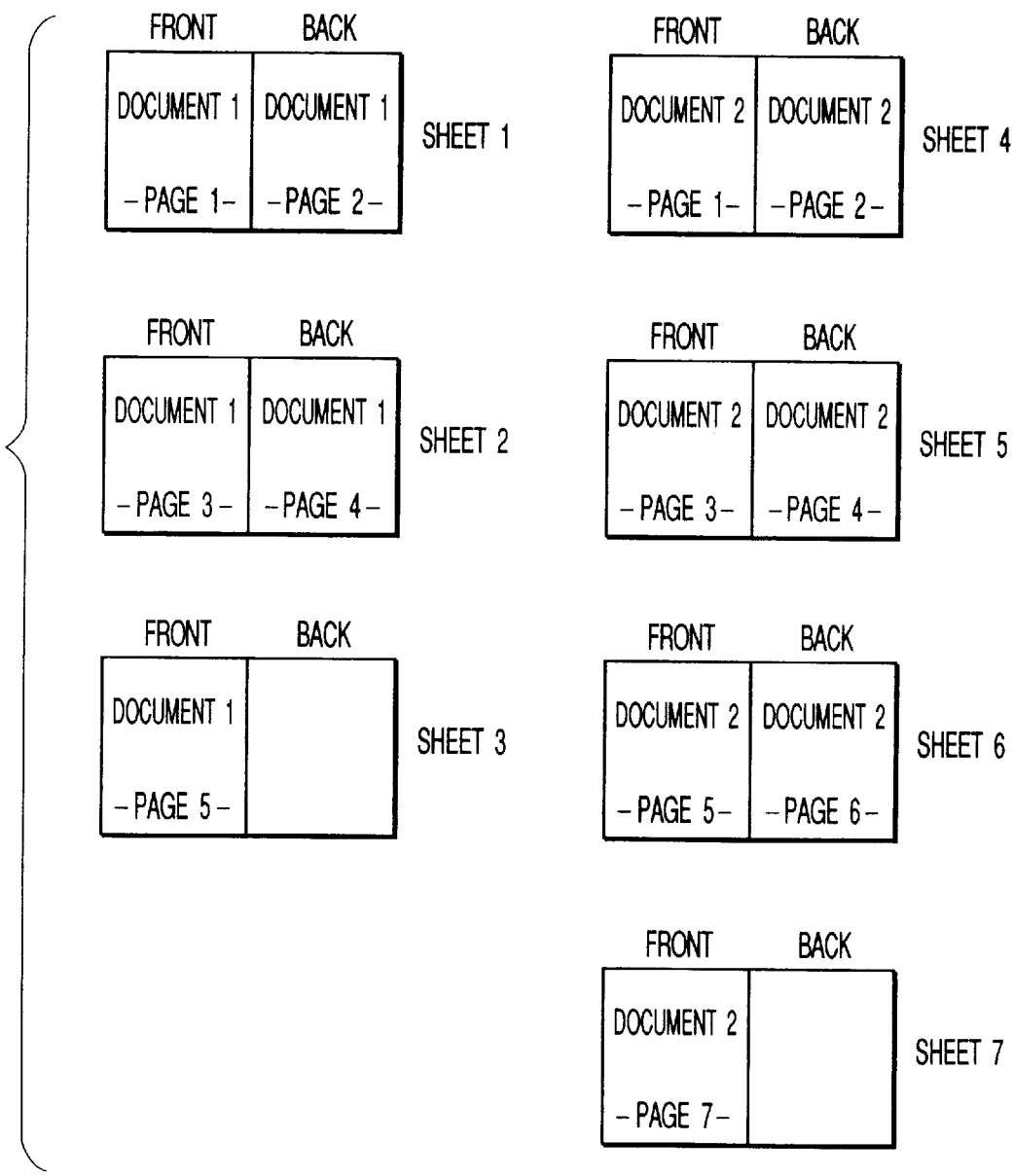
FIG. 34 is a schematic diagram showing a two-faced printing result in case of noncontinuity two-faced output (i.e., a noncontinuity output key is touched on the two-faced printing detailed setting screen of FIG. 31 and thus a second two-faced output mode is selected)

FIG. 34 is a schematic diagram showing the two-faced printing result in case of the noncontinuity two-faced output (i.e., the noncontinuity two-faced print key 4304 on the two-faced printing detailed setting screen 4300 of FIG. 31 and thus the second two-faced output mode is selected). In this case, it is assumed that the selected documents consist of the document 1 (including five pages) and the document 2 (including seven pages).

When the noncontinuity printing is performed in the two-faced output, as shown in FIG. 34, the five pages of the document 1 are respectively printed on the two (front/back) faces of the sheets, i.e., page 1/page 2, page 3/page 4, and page 5/blank. Namely, when the number of pages included in the document is the odd number, the back face of the last-discharged recording sheet is blank. Further, the seven pages of the document 2 are respectively printed on the two (front/back) faces of the sheets, i.e., page 1/page 2, page 3/page 4, page 5/page 6, and page 7/blank.

Figure 35:
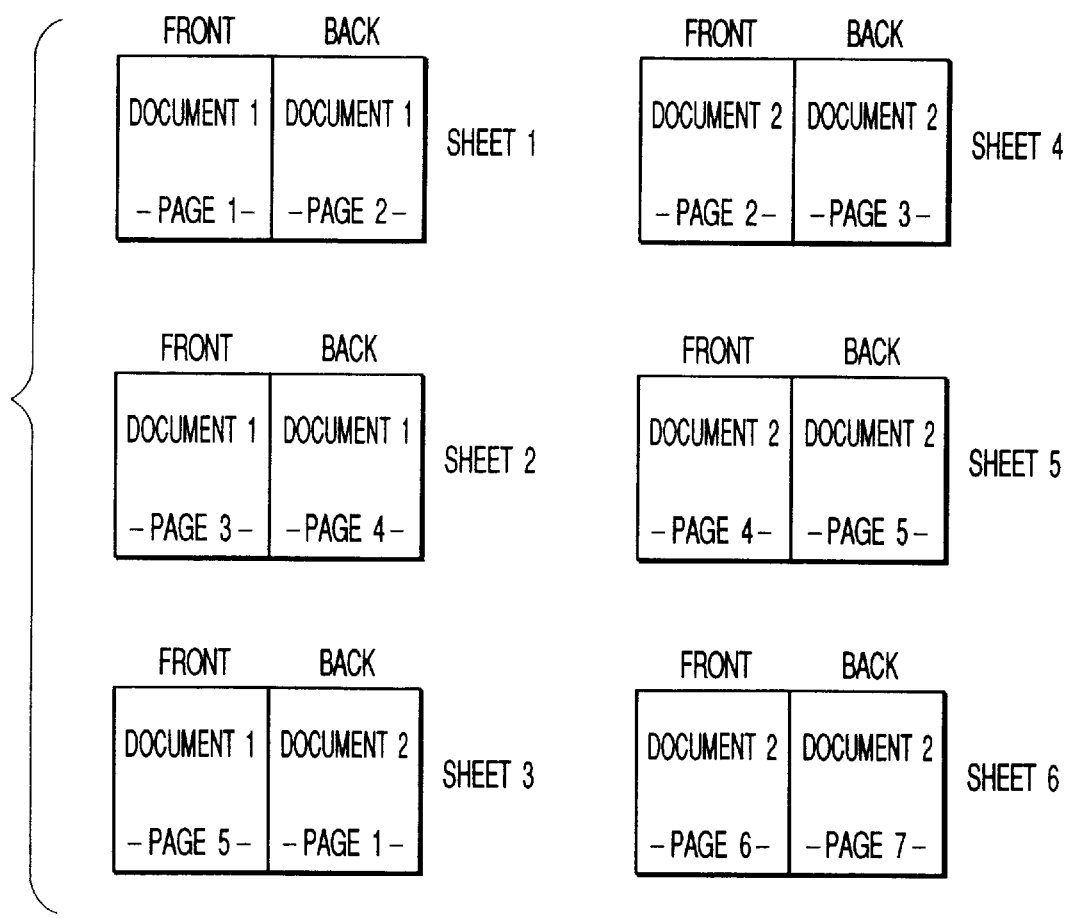
FIG. 35 is a schematic diagram showing a two-faced printing result in case of continuity two-faced output (i.e., a continuity output key is touched on the two-faced printing detailed setting screen of FIG. 31 and thus a first two-faced output mode is selected)

FIG. 35 is a schematic diagram showing the two-faced printing result in case of the continuity two-faced output (i.e., the continuity two-faced print key 4303 is touched on the two-faced printing detailed setting screen 4300 of FIG. 31 and thus the first two-faced output mode is selected). In this case, it is assumed that the selected documents consist of the document 1 (including five pages) and the document 2 (including seven pages).

When the continuity printing is performed in the two-faced output, as shown in FIG. 35, the pages of the documents 1 and 2 are respectively printed on the two (front/back) faces of the sheets, i.e., page 1 of document 1/page 2 of document 1, page 3 of document 1/page 4 of document 1, page 5 of document 1/page 1 of document 2, page 2 of document 2/page 3 of document 2, page 4 of document 2/page 5 of document 2, and page 6 of document 2/page 7 of document 2.

As described above, according to the present embodiment, when the plural documents stored in the image input/output apparatus are subjected to the two-faced output, the image forming can be performed continuously on the front and back faces of the sheet even if this image forming extends over the two documents.

Further, when the two-faced output is performed, the output mode can be changed to the mode that the documents are separated and the image forming is performed such that the first page of each document is surely set on the front face of the output sheet.

Third Embodiment

In the above embodiments, the case where, when the plural stored documents are subjected to the two-faced printing, the image forming can be performed continuously on the front and back faces of the recording medium even if this image forming extends over the two documents was explained. On the other hand, in the present embodiment, a case where, when the plural documents are subjected to reduction layout printing, the image forming is performed such that the original images of the plural documents are continuously laid out on the recording medium will be explained.

Hereinafter, a case where the original image is reduced will be explained.

The speed at which the reader unit 3001 reads the image signal by the CCD 3109 is constant. Thus, since the image information to be input to the CCD 3109 in the unit time can be increased by increasing the movement speed of the scanner unit 3104 irradiating the original, the image signal can be reduced in the original transportation direction (sub scan direction). This is controlled by a not-shown controller in the reader unit 3001 in response to an instruction from the CPU 3123.

The direction (main scan direction) perpendicular to the original transportation direction is controlled by the CPU 3123, by exchanging the image signals of the core unit 3010 of FIG. 21 through the data processing unit 3121.

Hereinafter, a case where the image is reduced in the main scan direction by "x/(x+y)"% will be explained with reference to FIG. 36.

Figure 36:
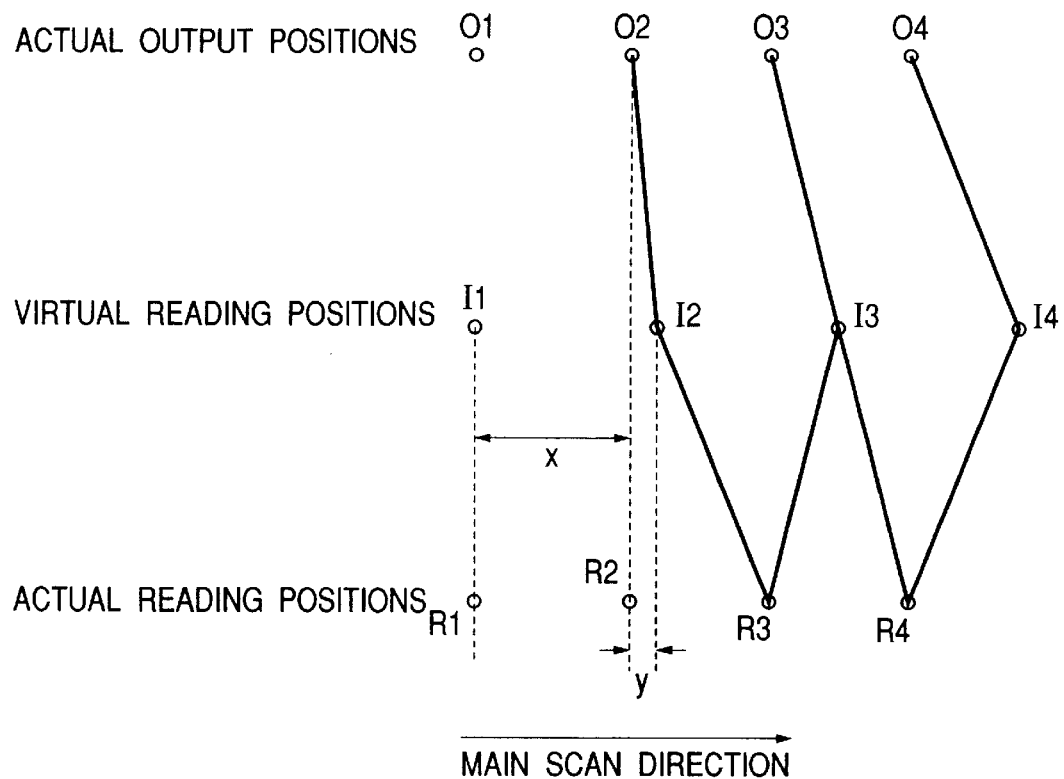
FIG. 36 is a diagram for explaining image reduction input with respect to the main scan direction of the image input/output apparatus according to the present invention.

FIG. 36 is a diagram for explaining the image reduction input in the main scan direction of the image input/output apparatus according to the present invention, and especially corresponds to the case where the image is reduced in the main scan direction by "x/(x+y)".

In case of same-sized printing, since the actual output position corresponds to the actual reading position (as indicated by the dotted line between points O2 and R2), any problem does not occur. However, in case of reduction printing, it is assumed that the image signal is input at virtual reading position (I1, I2, I3, I4) according to a reduction rate.

Then, when the image data at this virtual reading position (I1, I2, I3, I4) is output as the image data at the actual output position (O1, O2, O3, O4), the image is reduced by "x/(x+y)". Thus, the image density (I2=O2) at the virtual reading position is interpolated and predicted from the density value (R2, R3) of the image signal input at the actual reading position, on the basis of an equation (1) as follows.

$$O2=\{(R3)\times y+(R2)\times(x-y)\}/x \quad (1)$$

where "x" and "y" are the values determined by the reduction rate.

Thus, if it is assumed that "n" is a natural number, the image density (In=On (the image density at the actual output position)) at the virtual reading position is interpolated and predicted from the density value (Rn) of the image signal input at the actual reading position, on the basis of an equation (2) as follows.

$$On=\{(Rn+1)\times y+(Rn)\times(x-y)\}/x \quad (2)$$

Hereinafter, operation screens displayed on the touch panel 3816 of the operation unit 3009 in FIG. 26 will be explained with reference to FIGS. 37 to 42.

Figure 37:
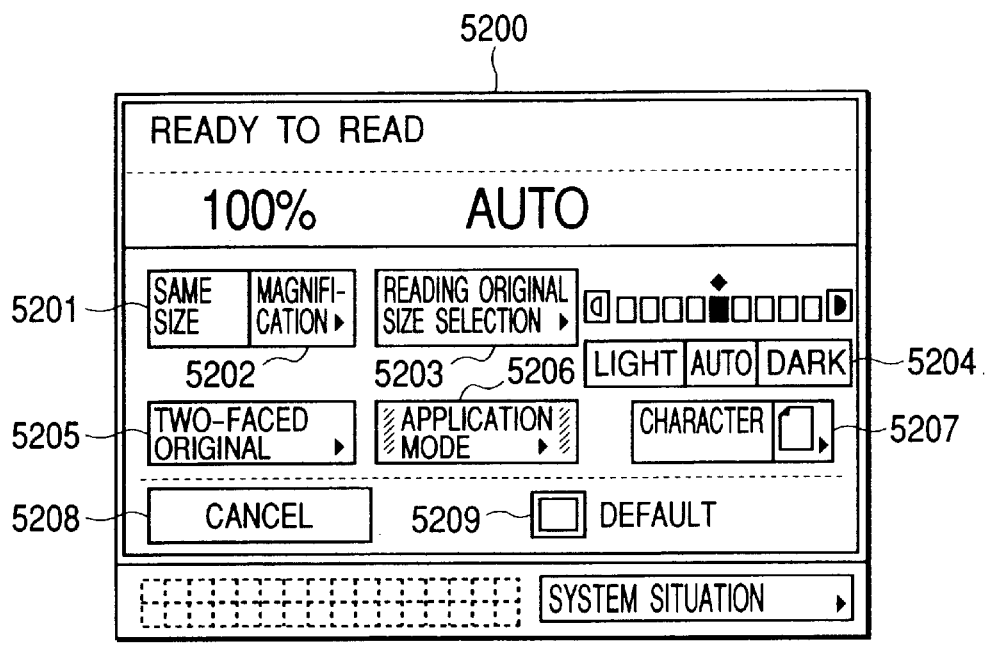
FIG. 37 is a schematic diagram showing an example of an original reading condition setting screen displayed on the touch panel of the operation unit in FIG. 26.

FIG. 37 is a schematic diagram showing an example of an original reading condition setting screen displayed on the touch panel 3816 of the operation unit 3009 in FIG. 26.

In FIG. 26, numeral 5200 denotes the original reading condition setting screen which is displayed by touching the original reading key 4015 after selecting the document on the document list display screen 4000 of FIG. 28.

Numeral 5201 denotes a same-sized printing setting key which is touched to set an original reading magnification to be "same size", numeral 5202 denotes a magnification setting key which is touched to set the original reading magnification, and numeral 5203 denotes a reading original size selection key which is touched to set the size of the original to be read.

Numeral 5204 denotes a density setting key which is touched to set original reading density, numeral 5205 denotes a two-faced original setting key which is touched to set two-faced original reading, and numeral 5206 denotes an application mode setting key which is touched to set an application mode. When the application mode setting key 5206 is touched, a later-described application mode setting screen 5300 of FIG. 38 is displayed.

Numeral 5207 denotes a reading image quality setting key which is touched to set original reading image quality, and numeral 5208 denotes a setting cancel key which is touched to cancel the various original reading settings on the original reading condition setting screen 5200, whereby the current screen is returned to the document list display screen 4000 of FIG. 28. Numeral 5209 denotes a default key which is touched to return the various original reading setting on the original reading condition setting screen 5200 to the default.

Figure 38:
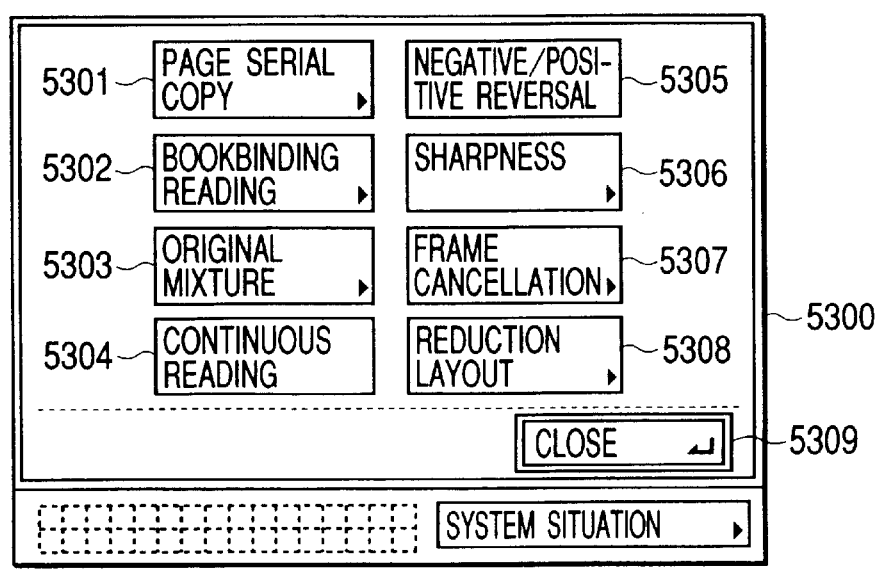
FIG. 38 is a schematic diagram showing an example of an application mode setting screen displayed on the touch panel of the operation unit in FIG. 26.

FIG. 38 is a schematic diagram showing an example of the application mode setting screen displayed on the touch panel 3816 of the operation unit 3009 in FIG. 26.

In FIG. 38, numeral 5300 denotes the application mode setting screen which is displayed by touching the application mode key 5206 on the original reading condition setting screen 5200 of FIG. 37.

Numeral 5301 denotes a page serial copy setting key which is touched to set a page serial copy mode, numeral 5302 denotes a bookbinding reading key which is touched to set a bookbinding reading mode, and numeral 5303 denotes an original mixture setting key which is touched to set an original mixture mode.

Numeral 5304 denotes a continuous reading key which is touched to set a continuous reading mode, numeral 5305 denotes a negative/positive reversal setting key which is touched to set a negative/positive reversal mode, and numeral 5306 denotes a sharpness setting key which is touched to set a sharpness mode.

Numeral 5307 denotes a frame cancellation setting key which is touched to set a frame cancellation mode, and numeral 5308 denotes a reduction layout setting key which is touched to set a reduction layout mode. When the reduction layout setting key 5308 is touched, a later-described original size setting screen 5400 of FIG. 39 is displayed.

Numeral 5309 denotes a close key which is touched to close the application mode setting screen 5300, whereby the current screen is returned to the original reading condition setting screen 5200 of FIG. 37.

Figure 39:
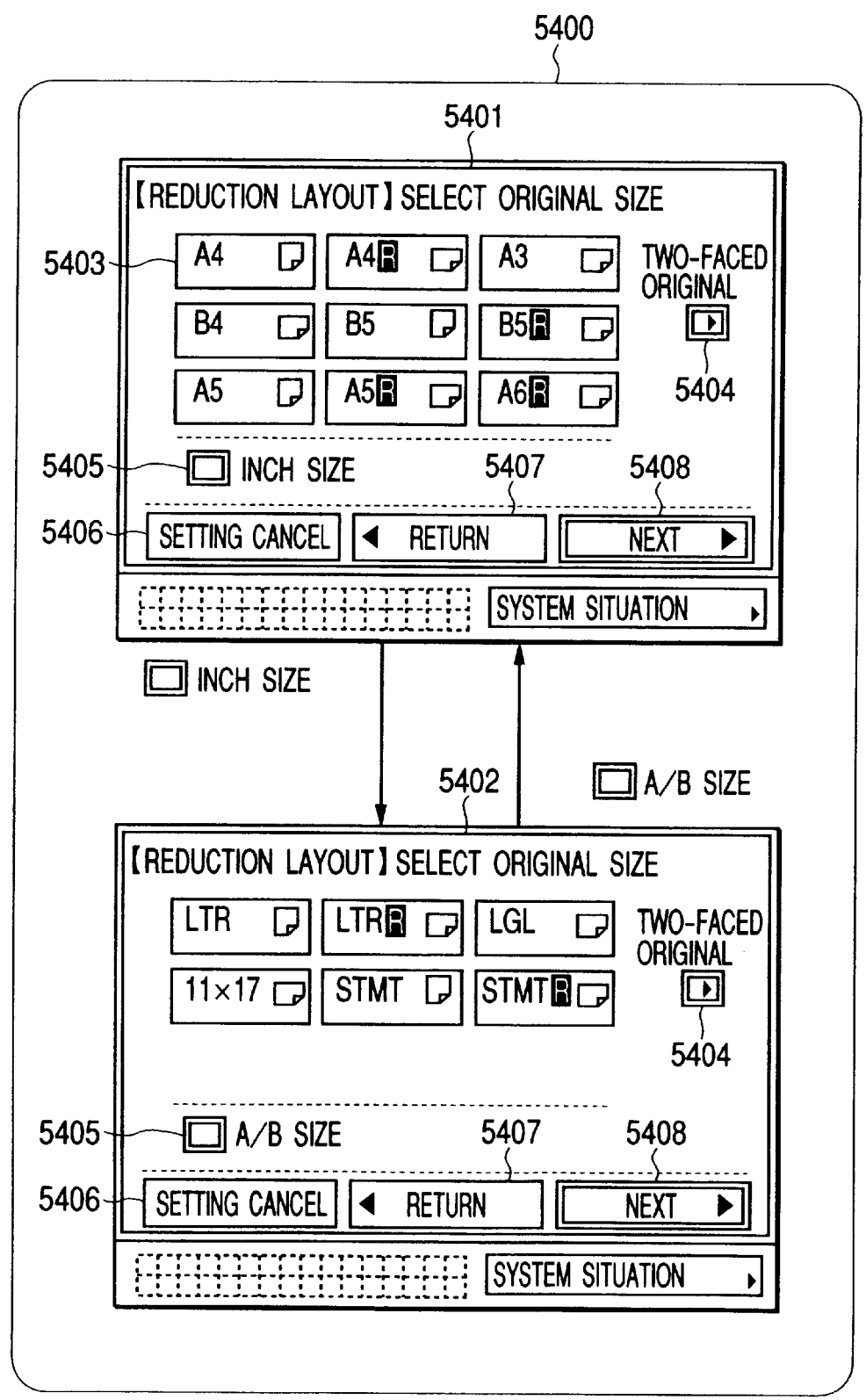
FIG. 39 is a schematic diagram showing an example of an original size setting screen displayed on the touch panel of the operation unit in FIG. 26.

FIG. 39 is a schematic diagram showing an example of the original size setting screen displayed on the touch panel 3816 of the operation unit 3009 in FIG. 26.

In FIG. 39, numeral 5400 denotes an original size setting screen which is displayed by touching the reduction layout setting key 5308 of FIG. 38.

Numeral 5401 denotes an A-type and B-type original size setting screen which is used to set an A-type or B-type original size, and numeral 5402 denotes an inch-type original size setting screen which is used to set an inch-type original size.

Numeral 5403 denotes an original size selection key which is touched to set the A-type or B-type original size, and numeral 5404 denotes a two-faced original setting key which is touched to set a two-faced original. Numeral 5405 denotes an inch-type size/AB-type (A-type or B-type) size change key which is touched to change the original size setting between the inch-type size and the AB-type size. Namely, this key 5405 is touched to change the screen between the A-type and B-type original size setting screen 5401 and the inch-type original size setting screen 5402.

Numeral 5406 denotes a setting cancel key which is touched to cancel the setting on the original size setting screen 5400, and numeral 5407 denotes a return key which is touched to return the current screen to the one-previous screen (i.e., the application mode setting screen 5300 in this case). Numeral 5408 denotes an advance key which is touched to advance the current screen to a next screen (a layout kind selection screen 5500 of FIG. 40 in this case). Namely, when the advance key 5408 is touched, the layout kind selection screen 5500 of FIG. 40 is displayed.

Figure 40:
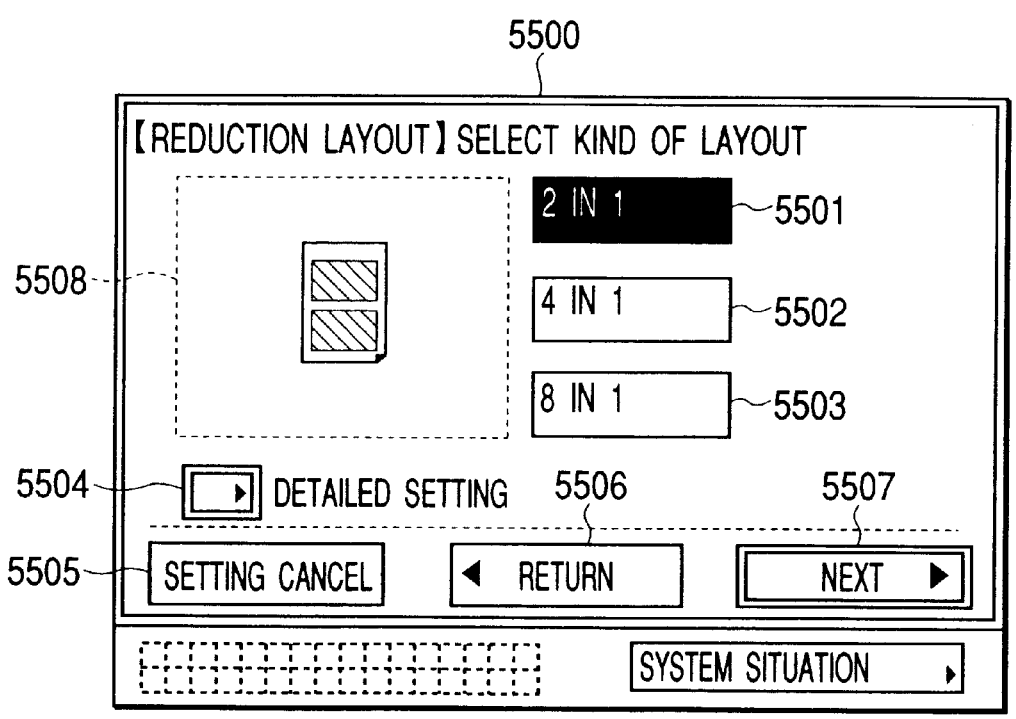
FIG. 40 is a schematic diagram showing an example of a layout kind selection screen displayed on the touch panel of the operation unit in FIG. 26.

FIG. 40 is a schematic diagram showing an example of the layout kind selection screen displayed on the touch panel 3816 of the operation unit 3009 in FIG. 26.

In FIG. 40, numeral 5500 denotes the layout kind selection screen which is displayed by touching the advance key 5408 of FIG. 39 is touched.

Numeral 5501 denotes a two-in-one selection key which is touched to set a two-in-one layout mode, numeral 5502 denotes a four-in-one selection key which is touched to set a four-in-one layout mode, and numeral 5503 denotes an eight-in-one selection key which is touched to set an eight-in-one layout mode. The reduction layout image selected by the selection key 5501, 5502 or 5503 is displayed in an area 5208. Numeral 5504 denotes a detailed setting key which is touched to set the details of layout kind.

Numeral 5505 denotes a setting cancel key which is touched to cancel the setting on the layout kind selection screen 5500, and numeral 5506 denotes a return key which is touched to return the current screen to the one-previous screen (i.e., the original size setting screen 5400 in this case). Numeral 5507 denotes an advance key which is touched to advance the current screen to a next screen (a recording size selection screen 5600 of FIG. 41 in this case). Namely, when the advance key 5507 is touched, the recording size selection screen 5600 of FIG. 41 is displayed.

Figure 41:
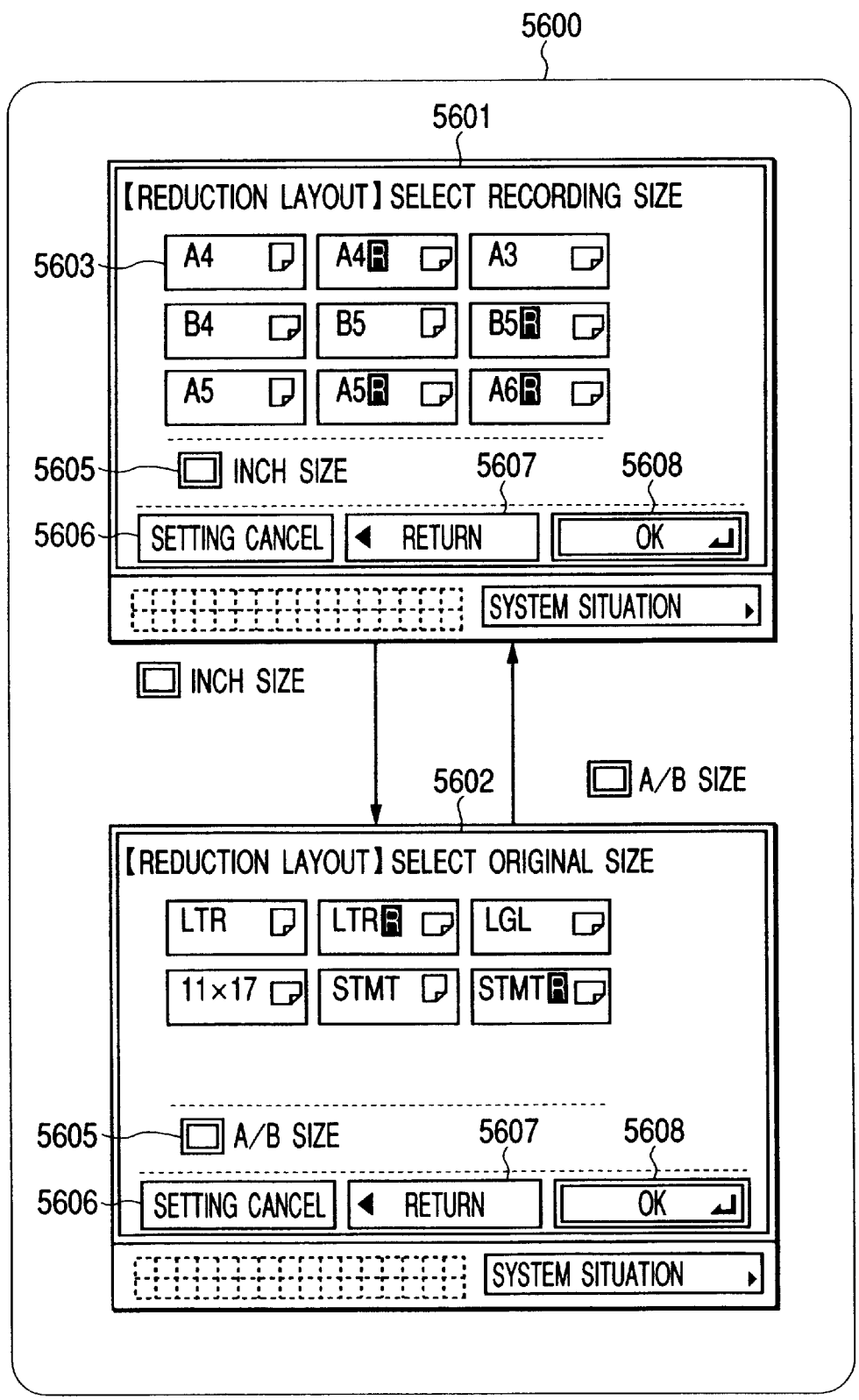
FIG. 41 is a schematic diagram showing an example of a recording size selection screen displayed on the touch panel of the operation unit in FIG. 26.

FIG. 41 is a schematic diagram showing an example of the recording size selection screen displayed on the touch panel 3816 of the operation unit 3009 in FIG. 26.

In FIG. 41, numeral 5600 denotes the recording size selection screen which is displayed by touching the advance key 5507 of FIG. 40 is touched.

Numeral 5601 denotes an A-type and B-type recording size setting screen which is used to set an A-type or B-type recording size, and numeral 5602 denotes an inch-type recording size setting screen which is used to set an inch-type recording size.

Numeral 5603 denotes a recording size selection key which is touched to set the A-type or B-type recording size. Numeral 5605 denotes an inch-type size/AB-type (A-type or B-type) size change key which is touched to change the recording size setting between the inch-type size and the AB-type size. Namely, this key 5605 is touched to change the screen between the A-type and B-type recording size setting screen 5601 and the inch-type recording size setting screen 5602.

Numeral 5606 denotes a setting cancel key which is touched to cancel the setting on the recording size setting screen 5600, and numeral 5607 denotes a return key which is touched to return the current screen to the one-previous screen (i.e., the layout kind selection screen 5500 in this case). Numeral 5608 denotes an OK key which is touched to establish the reading condition setting, whereby the current screen is returned to the previous setting screen (the original reading condition setting screen 5200 of FIG. 37 in this case). When the start key 3806 is touched on the original reading condition setting screen 5200, the original reading starts.

Figure 42:
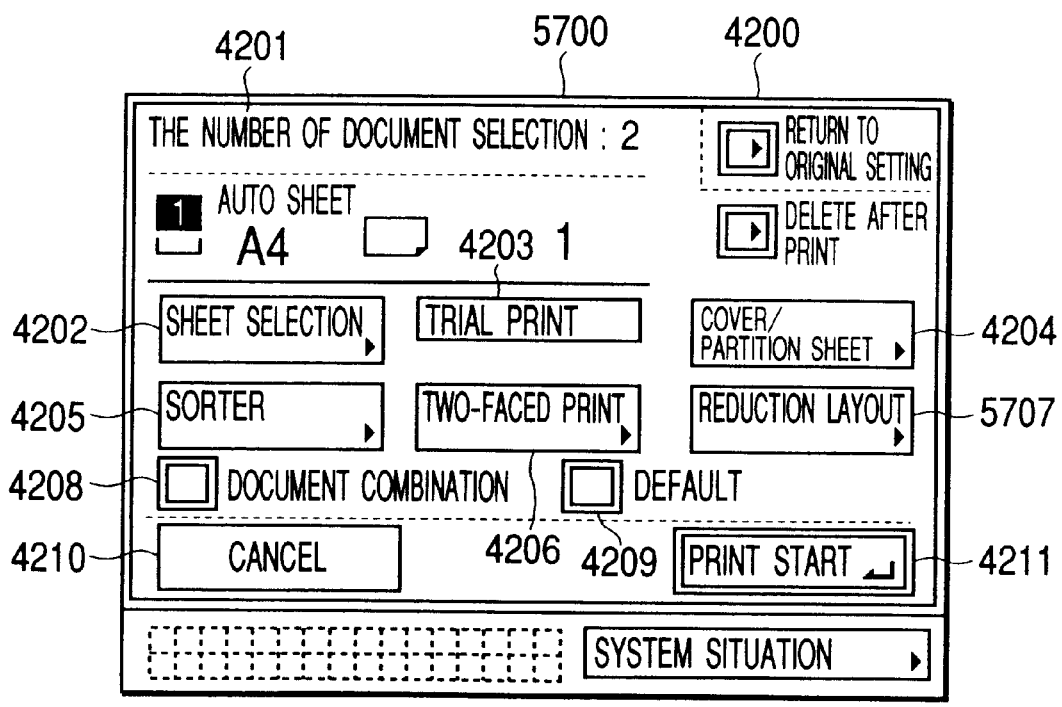
FIG. 42 is a schematic diagram showing an example of a printing setting screen of the second embodiment displayed on the touch panel of the operation unit in FIG. 26.

FIG. 42 is a schematic diagram showing an example of the printing setting screen of the present embodiment displayed on the touch panel 3816 of the operation unit 3009 of FIG. 26. In FIG. 42, the parts same as those shown in FIG. 30 are added with the same numerals, respectively.

In FIG. 42, numeral 5700 denotes a printing setting screen which is displayed by touching the print key 4014 after the document was selected on the document list display screen 4000 of the second embodiment.

Numeral 5707 denotes a reduction layout setting key which is touched to set a reduction layout mode. When the reduction layout setting key 5707 is touched, the layout kind selection screen 5500 is displayed. When the reduction layout mode is set in FIGS. 40 and 41, the current screen is returned to the printing setting screen 5700.

Hereinafter, a memory box function processing procedure in the image input/output apparatus according to the present embodiment will be explained with reference to FIG. 43.

Figure 43:
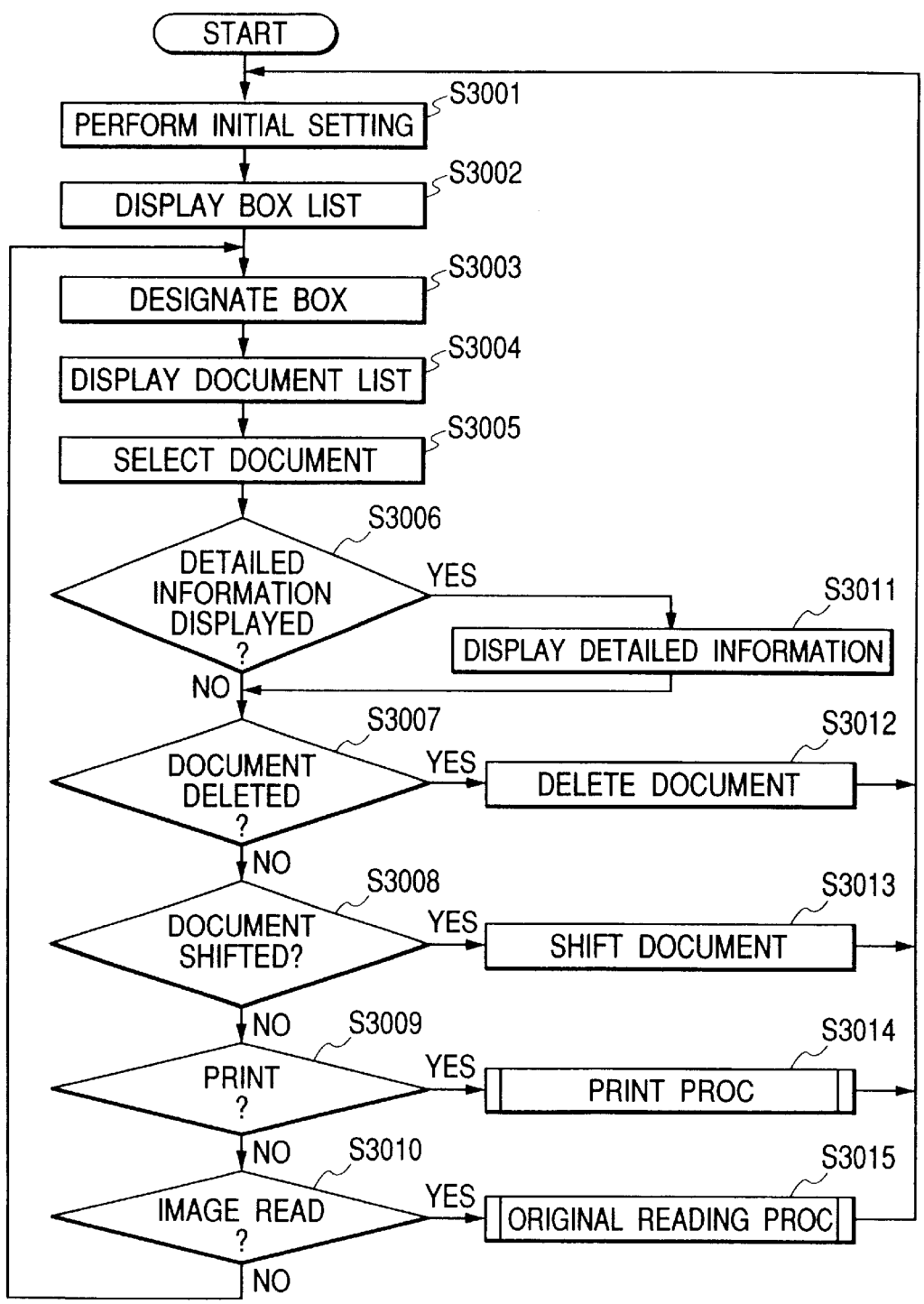
FIG. 43 is a flow chart showing a control processing procedure of the image input/output apparatus according to the present invention.

FIG. 43 is a flow chart showing a third control processing procedure of the image input/output apparatus according to the present invention. This corresponds to an example of the memory box function processing procedure. It should be noted that the process in FIG. 43 is performed by the CPU 3123 of FIG. 21 on the basis of the program stored in the memory 3124 or not-shown another storage medium, and symbols S3001 to S3015 denote respective steps.

First, in the step S3001, initial setting (default) is established. In the step S3002, when the memory box function selection key 3805 on the operation unit 3009 is touched, the memory box list display screen 3900 is displayed. Next, in the step S3003, the selection key 3901 corresponding to the memory box "00" is touched, and the flow advances to the step S3004 to display the document list display screen 4000 of FIG. 28.

Next, in the step S3005, the document shown in FIG. 28 is selected, and the result of such the selection is shown in FIG. 29. In this example, FIG. 29 shows the case where the plural documents are simultaneously selected by touching the document selection keys 4006 and 4008.

Then, the predetermined process is performed to the selected documents. In the step S3006, it is judged whether or not the detailed information display key 4011 is touched. If judged that the detailed information display key 4011 is touched, the flow advances to the step S3011 to display the detailed information of the selected documents, and the flow further advances to the step S3007. Conversely, if judged that the detailed information display key 4011 is not touched, the flow directly advances to the step S3007.

In the step S3007, it is judged whether or not the document delete key 4012 is touched. If judged that the document delete key 4012 is touched, the flow advances to the step S3012 to delete the selected document from the memory box, and then the flow returns to the step S3001.

Conversely, if judged in the step S3007 that the document delete key 4012 is not touched, the flow advances to the step S3008 to judge whether or not the document shift key 4013 is touched. If judged that the document shift key 4013 is touched, the flow advances to the step S3013 to shift the selected document, and then the flow returns to the step S3001.

Conversely, if judged in the step S3008 that the document shift key 4013 is not touched, the flow advances to the step S3009 to further judge whether or not the print key 4014 is touched. If judged that the print key 4014 is touched, the flow advances to the step S3014 to perform a later-described printing process of FIG. 45, and then the flow returns to the step S3001.

Conversely, if judged in the step S3009 that the print key 4014 is not touched, the flow advances to the step S3010 to further judge whether or not the original reading key 4015 is touched. If judged that the original reading key 4015 is touched, the flow advances to the step S3015 to perform a later-described original reading process of FIG. 44, and then the flow returns to the step S3001.

Conversely, if judged in the step S3010 that the original reading key 4015 is not touched, the flow returns to the step S3003.

It is assumed that, when the original reading key 4015 is touched, the information selected in the step S3005 is ignored.

Hereinafter, a reduction layout reading operation of the image input/output apparatus according to the present invention will be explained with reference to FIG. 44.

Figure 44:
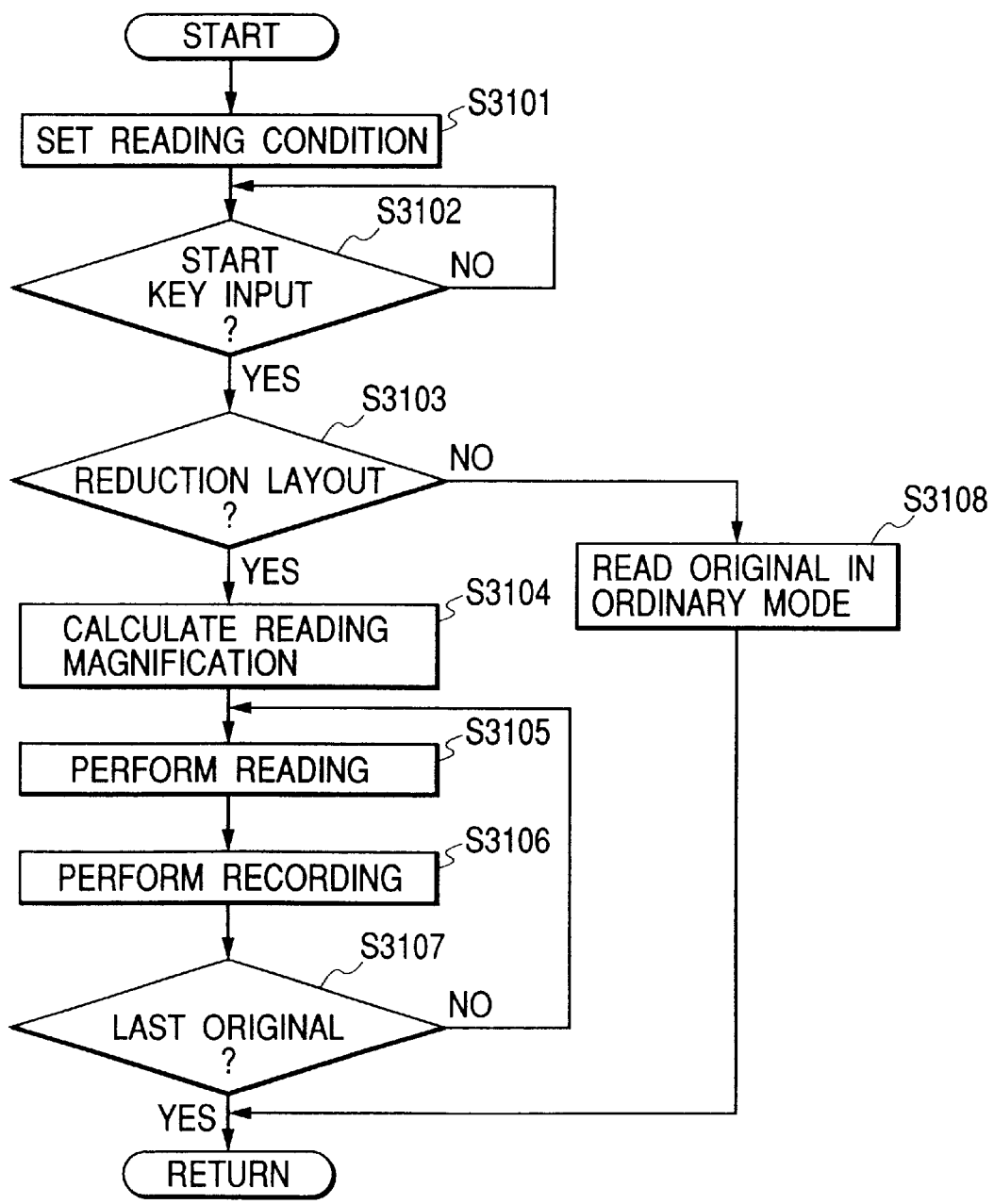
FIG. 44 is a flow chart showing a control processing procedure of the image input/output apparatus according to the present invention.

FIG. 44 is a flow chart showing a fourth control processing procedure of the image input/output apparatus according to the present invention. This corresponds to an example of the original reading control processing procedure in the step S3015 of FIG. 43. It should be noted that the process in FIG. 44 is performed by the CPU 3123 of FIG. 21 on the basis of the program stored in the memory 3124 or not-shown another storage medium, and symbols S3101 to S3108 denote respective steps. First, in the step S3101, the original reading condition setting screen 5200 of FIG. 37 is displayed to set an original reading condition.

Next, in the step S3102, it waits for touching of the start key 3806 shown in FIG. 26. When the start key 3806 is touched, the flow advances to the step S3103 to judge whether or not the set original reading condition indicates reduction layout. If judged that the set original reading condition does not indicate the reduction layout (i.e., in a mode other than the reduction layout mode), the flow advances to the step S3108 to perform an original reading process in an ordinary mode, and the flow returns (i.e., the process ends).

Conversely, if judged in the step S3103 that the set original reading condition indicates the reduction layout, the flow advances to the step S3104 to calculate reading magnifications in the main and sub scan directions on the basis of the original size, the kind of layout and the recording size set in the step S3101. When the original including plural sizes is input, the magnifications for these sizes are calculated such that all the original image sizes after magnification changing become identical.

Next, in the step S3105, the reader unit 3001 performs the original reading operation (FIG. 36) on the basis of the reading magnification calculated in the step S3104, and the flow advances to the step S3106 to store the read original image data in the HDD 3006.

Next, in the step S3107, it is judged whether or not all the originals were read, i.e., the original read in the step S3105 is the last original. If judged that the read original is not the last original, the flow returns to the step S3105.

Conversely, if judged in the step S3107 that the original read in the step S3105 is the last original, i.e., the reading and recording operations for all the originals ended, the flow returns (i.e., the process ends).

Hereinafter, a reduction layout continuous printing operation of the image input/output apparatus according to the present invention will be explained with reference to FIGS. 45 and 46.

Figure 45:
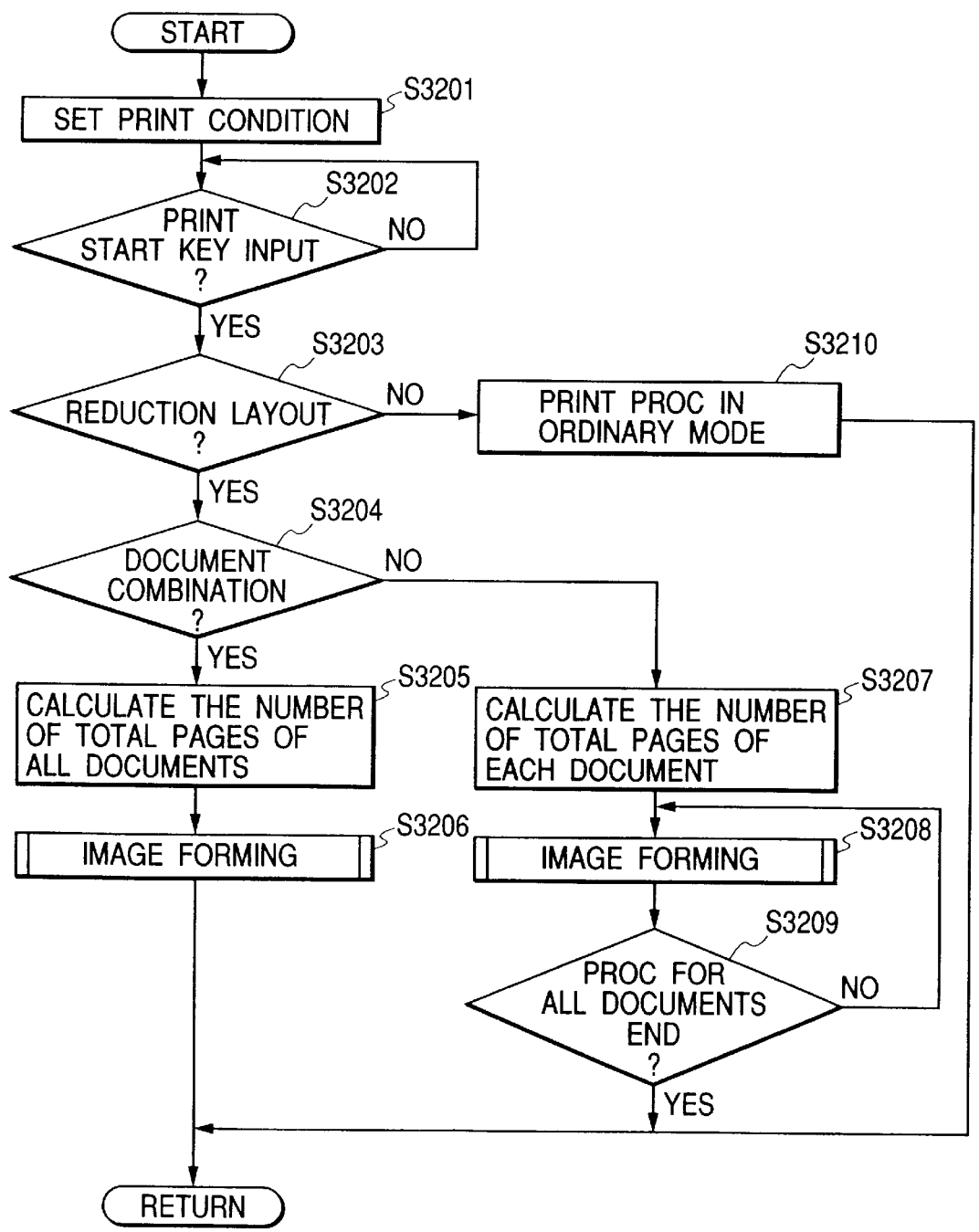
FIG. 45 is a flow chart showing a control processing procedure of the image input/output apparatus according to the present invention.

FIG. 45 is a flow chart showing a fifth control processing procedure of the image input/output apparatus according to the present invention. This corresponds to an example of the printing process control procedure in the step S3014 of FIG. 43. It should be noted that the process in FIG. 45 is performed by the CPU 3123 of FIG. 21 on the basis of the program stored in the memory 3124 or not-shown another storage medium, and symbols S3201 to S3210 denote respective steps.

First, in the step S3201, the printing setting screen 5700 of FIG. 42 is displayed to set a printing condition.

In the step S3202, it waits for touching of the printing start key 4211. When the printing start key 4211 is touched, the flow advances to the step S3203 to judge whether or not the reduction layout is set. If judged that the reduction layout is not set (i.e., in a mode other than the reduction layout mode), the flow advances to the step S3210 to perform a printing process in an ordinary mode, and the flow returns (i.e., the process ends).

Conversely, if judged in the step S3203 that the reduction layout is set, the flow advances to the step S3204 to judge whether or not the document combination is set, i.e., the first reduction image arrangement mode is selected and set by the document combination button 4208 of FIG. 42. If judged that the document combination is set (i.e., the first reduction image arrangement mode is selected and set), the flow advances to the step S3205.

In the step S3205, the number of total pages of all of the plural selected documents is calculated, and the flow advances to the step S3206 to call a later-described image forming routine in FIG. 46, and perform the image forming (i.e., the image forming is performed in the first and second reduction image arrangement modes). After the image forming ended, the flow returns (i.e., the process ends).

Conversely, if judged in the step S3204 that the document combination is not set (i.e., the first reduction image arrangement mode is not selected, but the second reduction image arrangement mode is selected and set), the flow advances to the step S3207 to calculate the number of total pages of each of the plural selected documents is calculated, and the flow further advances to the step S3208 to call the later-described image forming routine in FIG. 46, and perform the image forming. Namely, the image forming is performed in the second reduction image arrangement mode.

Next, in the step S3209, it is judged whether or not the process for all the selected documents ended. If judged that the process for all the selected documents ended, the flow returns (i.e., the process ends).

Conversely, if judged in the step S3209 that the process for all the selected documents does not end, the flow returns to the step S3208 to again call the image forming routine.

Hereinafter, the image forming process (operation) in the reduction layout of the image input/output apparatus according to the present invention will be explained with reference to FIG. 46.

Figure 46:
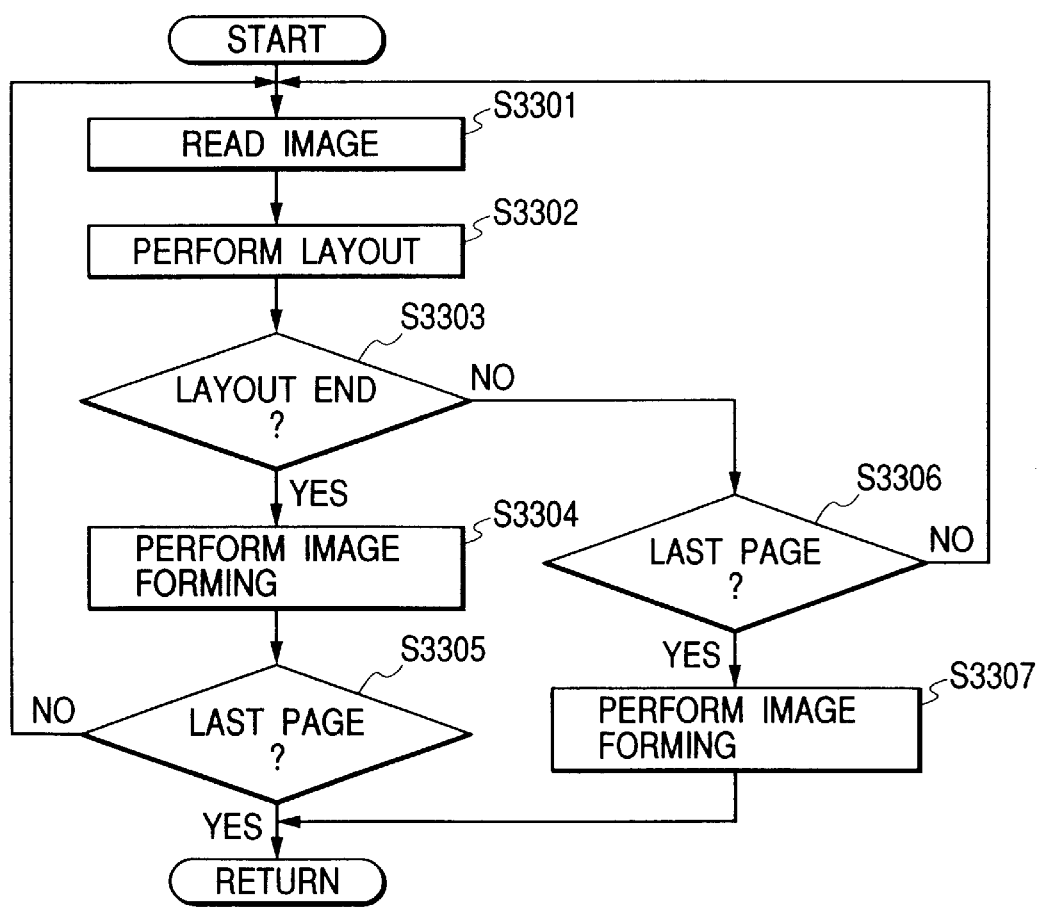
FIG. 46 is a flow chart showing a control processing procedure of the image input/output apparatus according to the present invention.

FIG. 46 is a flow chart showing a sixth control processing procedure of the image input/output apparatus according to the present invention. This corresponds to an example of the image forming routine process control procedure in the reduction layout shown in the steps S3205 and S3208 of FIG. 45. It should be noted that the process in FIG. 46 is performed by the CPU 3123 of FIG. 21 on the basis of the program stored in the memory 3124 or not-shown another storage medium, and symbols S3301 to S3307 denote respective steps.

First, in the step S3301, the original image data is sequentially read from the HDD 3006. Then, in the step S3302, the read image data is subjected to a magnification change process, a rotation process and the like by the data processing unit 3121 of the core unit 3010, and the processed data is sequentially laid out on the page memory of the data processing unit 3121, in accordance with the kind of layout and the layout size (i.e., the recording sheet size). At this time, the CPU 3123 controls a magnification change rate by the data processing unit 3121 in accordance with the image data size (i.e., the stored original image size), the output sheet (recording medium) size, and the like.

Next, in the step S3303, it is judged whether or not the layout for the predetermined kind of layout ends. If judged that the layout ends, then in the step S3304 the image forming is performed by the printer unit 3002 on the basis of the image data laid out on the memory.

Next, in the step S3305, it is judged whether or not the image forming for all the pages of the documents to be processed ends. If judged that the image forming for all the pages ends, the flow returns (i.e., the process ends).

Conversely, if judged that the image forming for all the pages does not end, the flow returns to the step S3301.

On the other hand, if judged in the step S3303 that the layout for the predetermined kind of layout does not end yet, the flow advances to the step S3306 to further judge whether or not the layout for all the pages to be processed ends. This is because the number of pages to be processed may not be divided by "N" of the kind of reduction layout (N in 1; N is natural number of 2 or more).

If judged in the step S3306 that the layout for all the pages to be processed ends, then in the step S3307 the image forming is performed by the printer unit 3002 on the basis of the image data laid out on the memory, and the flow returns (i.e., the process ends).

Conversely, if judged in the step S3306 that the layout for all the pages to be processed does not end, the flow returns to the step S3301.

FIG. 47 is a schematic diagram showing an output example in a case where the document combination is not performed in the reduction layout output (i.e., the second reduction image arrangement mode is selected). In this case, it is assumed that the selected documents consist of the document 1 (including five pages) and the document 2 (including seven pages). This process which corresponds to the case where the four-in-one selection key 5502 of FIG. 40 is selected is controlled by the CPU 3123.

When the document combination is not performed in the reduction layout output, the pages of the documents 1 and 2 are subjected to the image forming respectively on the four-divided areas (page 1 of document 1/page 2 of document 1/page 3 of document 1/page 4 of document 1) of the sheet 1, the four-divided areas (page 5 of document 1/blank/blank/blank) of the sheet 2, the four-divided areas (page 1 of document 2/page 2 of document 2/page 3 of document 2/page 4 of document 2) of the sheet 3, and the four-divided areas (page 5 of document 2/page 6 of document 2/page 7 of document 2/blank) of the sheet 4, as shown in FIG. 47. Namely, the CPU 3123 inhibits from forming the image of the page included in the document 1 and the image of the page included in the document 2 on one sheet.

FIG. 48 is a schematic diagram showing an output example in a case where the document combination is performed in the reduction layout output (i.e., the first reduction image arrangement mode is selected by the document combination button 4208 of FIG. 42). In this case, it is assumed that the selected documents consist of the document 1 (including five pages) and the document 2 (including seven pages). This process which corresponds to the case where the four-in-one selection key 5502 of FIG. 40 is selected is also controlled by the CPU 3123.

When the document combination is performed in the reduction layout output, the pages of the documents 1 and 2 are subjected to the image forming respectively on the four-divided areas (page 1 of document 1/page 2 of document 1/page 3 of document 1/page 4 of document 1) of the sheet 1, the four-divided areas (page 5 of document 1/page 1 of document 2/page 2 of document 2/page 3 of document 2) of the sheet 2, and the four-divided areas (page 4 of document 2/page 5 of document 2/page 6 of document 2/page 7 of document 2) of the sheet 3, as shown in FIG. 48. Namely, the CPU 3123 permits to form the image of the page included in the document 1 and the image of the page included in the document 2 on one sheet (sheet 2 in this case).

It should be noted that the CPU 3123 performs the control such that the selected documents are subjected to the image forming in the order of selection.

As explained above, according to the present embodiment, when the plural documents stored in the image input/output apparatus are subjected to the reduction layout output, the image forming for these plural documents can be performed continuously on the laid-out areas of the output sheet.

Further, when the reduction layout output is performed, the output mode can be changed to the mode that the documents are separated and the image forming is performed such that the first page of each document is surely set on the front face of the output sheet.

Further, even if the sizes of the image data stored in the HDD 3006 for each document or each page are different from others, it is possible to prevent that the formed image is partially dropped out of the sheet. Thus, the desired output can be obtained.

The printer unit 3002 of FIG. 19 can apply, as a printing method, any of an electrophotographic method, an inkjet method, a thermal transfer method, a sublimation method, and the like.

Hereinafter, the configuration of a data processing program which can be read by the image input/output apparatus according to the present invention will be explained with reference to FIG. 49.

FIG. 49 is a diagram for explaining the memory map of a storage medium which stores the various data processing programs capable of being read by the image input/output apparatus according to the present invention.

It should be noted that, though not shown in the drawings, information such as version information, a creator and the like which manages a program group stored in the storage medium is also stored in the medium. Further, information such as an icon for discriminatively displaying the program and the like which depends on an OS or the like on the program reading side might be stored in the medium.

Further, data depending on various programs are managed as the directory information in the storage medium. Further, in a case where programs to be installed and other data have been compressed, a program or the like used to decompress the programs and the data might be stored in the medium.

The functions shown in FIGS. 25, 33, 43, 44, 45 and 46 in the present embodiment might be executed by a host computer on the basis of a program externally installed. In this case, the present invention is applicable to a case where a group of the information including the programs is supplied to an output apparatus from a storage medium such as a CD-ROM, a flash memory, a floppy disk (FD) or the like, or from an external storage medium through a network.

As described above, it is needless to say that the object of the present invention can be attained in a case where the storage medium recording the program codes of software to realize the functions of the above embodiments is supplied to a system or apparatus, and then a computer (or CPU or MPU) in this system or apparatus reads and executes the stored program codes.

In this case, the program codes themselves read from the storage medium execute the new functions of the present invention, whereby the storage medium storing these program codes constitutes the present invention.

As the storage medium from which the program codes are supplied, for example, a floppy disk, a hard disk, an optical disk, a magnetooptical disk, a CD-ROM, a CD-R, a magnetic tape, a nonvolatile memory card, a ROM, an EEPROM, a silicon disk, or the like can be used.

Further, it is needless to say that the present invention includes not only the case where the functions of the above embodiments are executed by the program codes read by the computer, but also a case where an OS (operating system) or the like running on the computer executes a part or all of the actual processes based on instructions of the program codes and thus the functions of the above embodiments are executed by such the processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such the processes.

Further, the present invention is applicable to a system structured by plural equipment or to an apparatus structured by one equipment. Further, it is needless to say that the present invention is applicable to a case where programs are supplied to the system or the apparatus. In this case, when the storage medium storing the programs represented by the software to attain the present invention is subjected to reading by the system or apparatus, such the system or the apparatus can enjoy the effects of the present invention.

Further, when the programs represented by the software to attain the present invention are downloaded from a data base on a network and read according to a communication program, such the system or the apparatus can enjoy the effects of the present invention.

As explained above, the plural documents managed by the document management means are selected by the document selection means, the first two-faced output mode that the image forming is performed such that the pages of the plural documents selected by the document selection means are set to be continuous between the front and back faces of the recording sheet or the second two-faced output mode that the first page of each of the plural documents selected by the document selection means is surely subjected to the image forming on the front face of the recording sheet is selected by the two-faced output mode selection means, and the image forming means is controlled by the control means to perform the image forming in the first two-faced output mode or the second two-faced output mode on the basis of the selection result of the two-faced output mode selection means. Thus, when the plural documents stored in the image input/output apparatus are subjected to the two-faced output, the operation change can be easily performed between the operation that the image forming is performed continuously on the front and back faces of the sheet even if this image forming extends over the plural documents and the operation that the image forming is performed such that the documents are separated from others and thus the first page of each document is surely set on the front face of the output sheet.

Further, the plural documents managed by the document management means are selected by the document selection means, the first reduction image arrangement mode that the respective original images of the plural selected documents selected by the document selection means are subjected to the image forming such that these original images of the plural documents are continuously arranged on the recording medium or the second reduction image arrangement mode that the respective original images of the plural documents selected by the document selection means are subjected to image forming such that the first original image of each document is surely arranged at the head of the recording medium is selected by the reduction image arrangement mode selection means, and the image forming means is controlled by the control means to perform the image forming in the first reduction image arrangement mode or the second reduction image arrangement mode on the basis of the selection result of the reduction image arrangement mode selection means. Thus, when the plural documents stored in the image input/output apparatus are subjected to the reduction layout, the operation change can be easily performed between the operation that the images of the plural documents are continuously formed in the layout areas of the sheet and the operation that the image forming is performed such that the documents are separated from others and thus the first page of each document is surely set on the front face of the output sheet.

Further, the second magnification change is provided, and the control means controls the magnification change rate of the second magnification change means in accordance with the size of the recording medium. Thus, even if the sizes of the image data stored in the HDD 3006 for each document or each page are different from others, it is possible to prevent that the formed image is partially dropped out of the sheet.

Further, the plural documents managed by the document management means are selected, the first two-faced output mode that the image forming is performed such that the pages of the plural selected documents are set to be continuous between the front and back faces of the recording medium or the second two-faced output mode that the first page of each of the plural selected documents is surely subjected to the image forming on the front face of the recording medium is selected, and the image forming is performed in the first two-faced output mode or the second two-faced output mode on the basis of the result of the two-faced output mode selection. Thus, when the plural documents stored in the image input/output apparatus are subjected to the two-faced output, the operation change can be easily performed between the operation that the image forming is performed continuously on the front and back faces of the sheet even if this image forming extends over the plural documents and the operation that the image forming is performed such that the documents are separated from others and thus the first page of each document is surely set on the front face of the output sheet.

Further, the plural documents managed by the document management means are selected, the first reduction image arrangement mode that the respective original images of the plural selected documents are subjected to the image forming such that these original images of the plural documents are continuously arranged on the recording medium or the second reduction image arrangement mode that the respective original images of the plural selected documents are subjected to image forming such that the first original image of each document is surely arranged at the head of the recording medium is selected, and the image forming is performed in the first reduction image arrangement mode or the second reduction image arrangement mode on the basis of the result of the reduction image arrangement mode. Thus, when the plural documents stored in the image input/ output apparatus are subjected to the reduction layout output, the operation change can be easily performed between the operation that the images of the plural documents are continuously formed in the layout areas of the sheet and the operation that the image forming is performed such that the documents are separated from others and thus the first page of each document is surely set on the front face of the output sheet.

Accordingly, by the simple handling at the time of image output designation, the operation that the plural documents stored in the image input/output apparatus are subjected to the image forming continuously on the front and back faces of the sheet even if this image forming extends over the plural documents and the operation that the plural documents stored in the image input/output apparatus are subjected to the image forming in the layout areas of the sheet can be easily performed.

Fourth Embodiment

It should be noted that, in the fourth embodiment, FIGS. 19 to 30 are similarly applicable.

Figure 50:
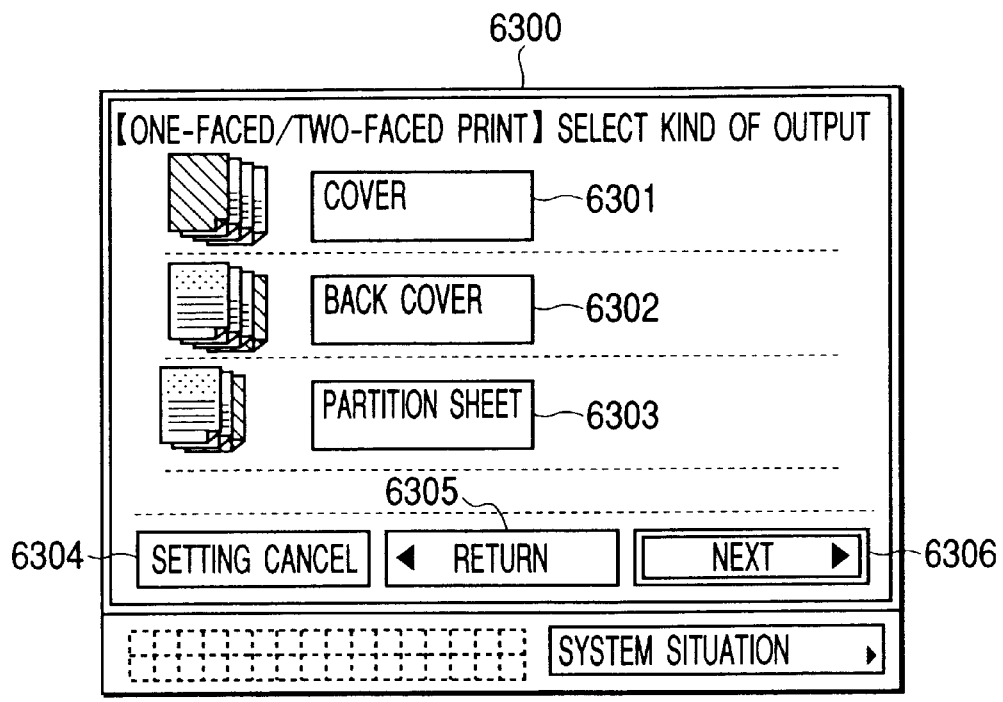
FIG. 50 is a schematic diagram showing an example of a cover/partition sheet detailed setting screen displayed on the touch panel of the operation unit in FIG. 26, in the fourth embodiment.

FIG. 50 is a schematic diagram showing an example of a cover/partition sheet detailed setting screen displayed on the touch panel 3816 of the operation unit 3009 in FIG. 26.

In FIG. 50, numeral 6300 denotes the cover/partition sheet detailed setting screen which is displayed by touching the document combination button 4208 and further touching the cover/partition sheet key 6204 on the printing setting screen 4200.

Numeral 6301 denotes a cover selection key which is touched to add a cover, numeral 6302 denotes a back cover selection key which is touched to add a back cover, and numeral 6303 denotes a partition sheet selection key which is touched to insert a partition sheet.

Numeral 6304 denotes a setting cancel key which is touched to cancel the setting on the cover/partition sheet detailed setting screen 6300, and numeral 6305 denotes a return key which is touched to return to the printing setting screen 4200. Numeral 6306 denotes an advance key which is touched to establish the setting on the cover/partition sheet detailed setting screen 6300 and advance to a later-described sheet feed stage selection screen 6400 of FIG. 51.

Figure 51:
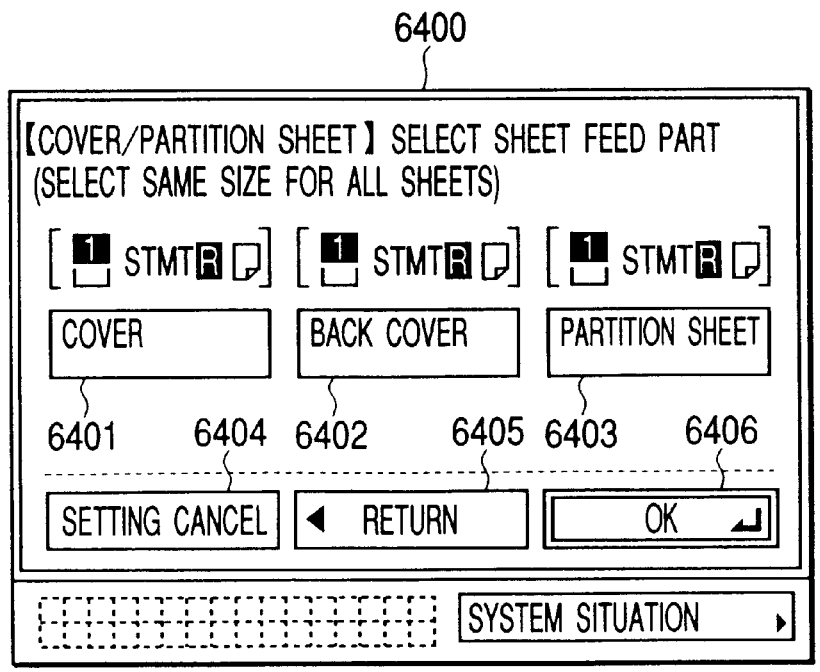
FIG. 51 is a schematic diagram showing an example of a sheet feed stage selection screen displayed on the touch panel of the operation unit in FIG. 26.

FIG. 51 is a schematic diagram showing an example of the sheet feed stage selection screen 6400 displayed on the touch panel 3816 of the operation unit 3009 in FIG. 26.

In FIG. 51, numeral 6401 denotes a cover feed stage selection key which is touched to select a cover feed stage, numeral 6402 denotes a back cover feed stage selection key which is touched to select a back cover feed stage, and numeral 6403 denotes a partition sheet feed stage selection key which is touched to select a partition sheet feed stage. When any of the cover feed stage selection key 6401, the back cover feed stage selection key 6402 and the partition sheet feed stage selection key 6403 is touched, a later-described sheet feed stage selection screen 6500 of FIG. 52 is displayed.

Numeral 6404 denotes a setting cancel key which is touched to cancel the setting on the sheet feed stage selection screen 6400, and numeral 6405 denotes a return key which is touched to return to the cover/partition sheet detailed setting screen 6300. Numeral 6406 denotes an OK key which is touched to establish the setting on the sheet feed stage selection screen 6400 and return to the printing setting screen 4200 of FIG. 30.

Figure 52:
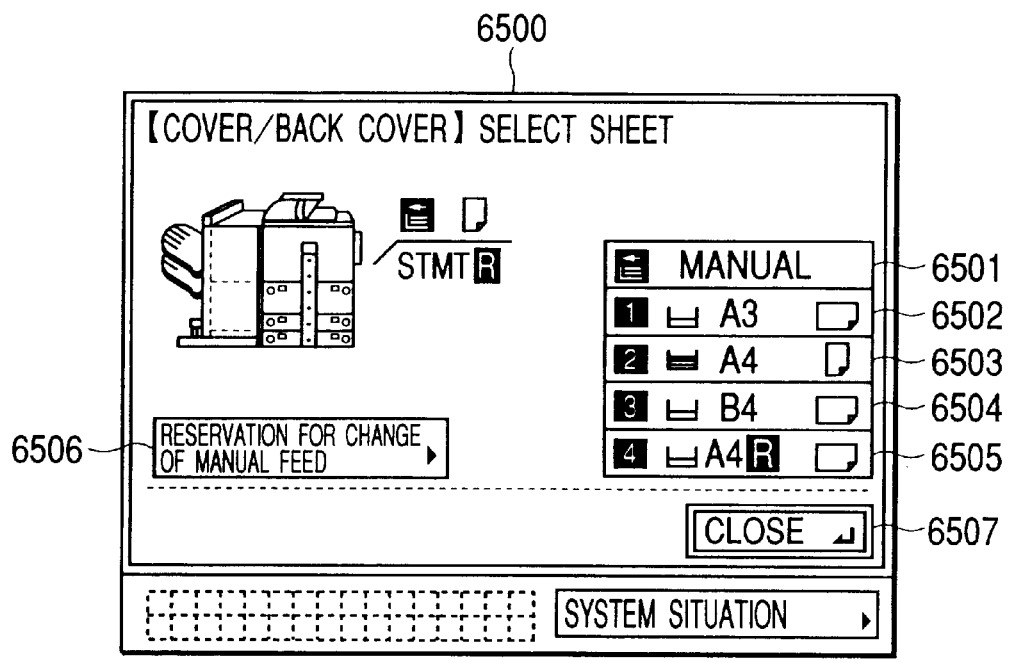
FIG. 52 is a schematic diagram showing an example of the sheet feed stage selection screen displayed on the touch panel of the operation unit in FIG. 26.

FIG. 52 is a schematic diagram showing an example of the sheet feed stage selection screen 6500 displayed on the touch panel 3816 of the operation unit 3009 in FIG. 26. The sheet feed stage selection screen 6500 is displayed when any of the cover feed stage selection key 6401, the back cover feed stage selection key 6402 and the partition sheet feed stage selection key 6403 on the sheet feed stage selection screen 6400 of FIG. 51 is touched.

In FIG. 52, numerals 6501 to 6505 denote respective sheet feed stage selection keys. When one of these keys 6501 to 6505 is touched, the sheet feed stage corresponding to the sheet feed origin for the cover, the back cover or the partition sheet selected on the sheet feed stage selection screen 6400 of FIG. 51 is selected. Numeral 6506 denotes a manual change reservation key which is touched to perform reservation setting for changing the sheet on the manual feed tray 3211 at manual feed timing. Numeral 6507 denotes a close key which is touched to close the current screen and return to the sheet feed stage selection screen 6400.

Figure 53:
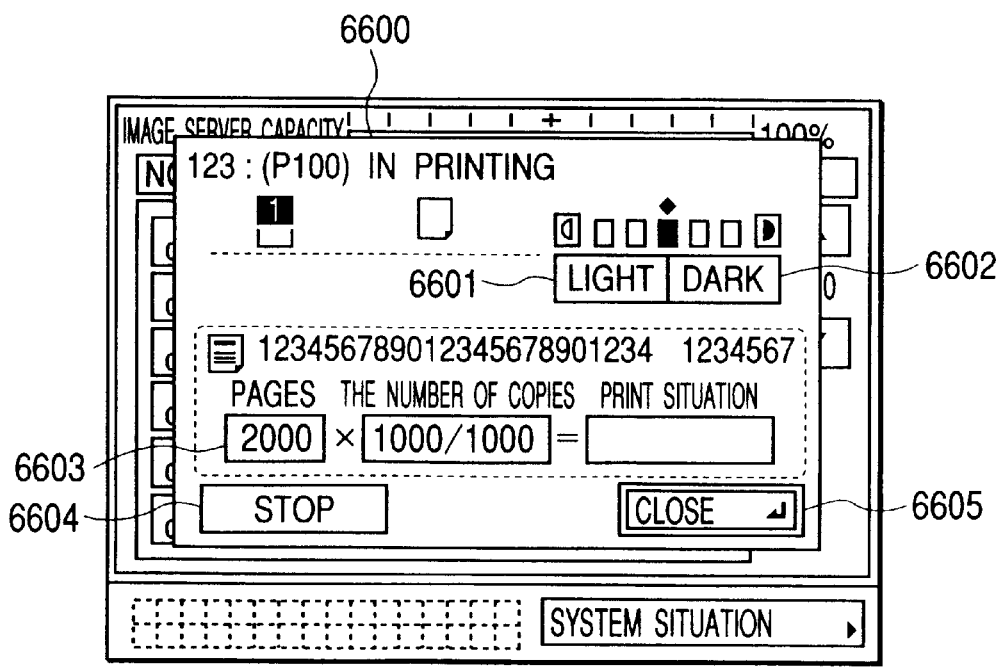
FIG. 53 is a schematic diagram showing an example of an under-printing output screen displayed on the touch panel of the operation unit in FIG. 26.

FIG. 53 is a schematic diagram showing an example of an under-printing output screen 6600 displayed on the touch panel 3816 of the operation unit 3009 in FIG. 26. The under-printing output screen 6600 is displayed when the printing start key 4211 of FIG. 30 is touched and thus the printing is started.

In FIG. 53, numerals 6601 and 6602 respectively denote light and dark density setting keys which are touched to change a printing density. Numeral 6603 denotes a printing situation display area in which the printing situation of the currently processed printing output is displayed. Numeral 6604 denotes a stop key which is touched to stop the currently processed printing output, and numeral 6605 denotes a close key which is touched to close the under-printing output screen 6600.

Figure 54:
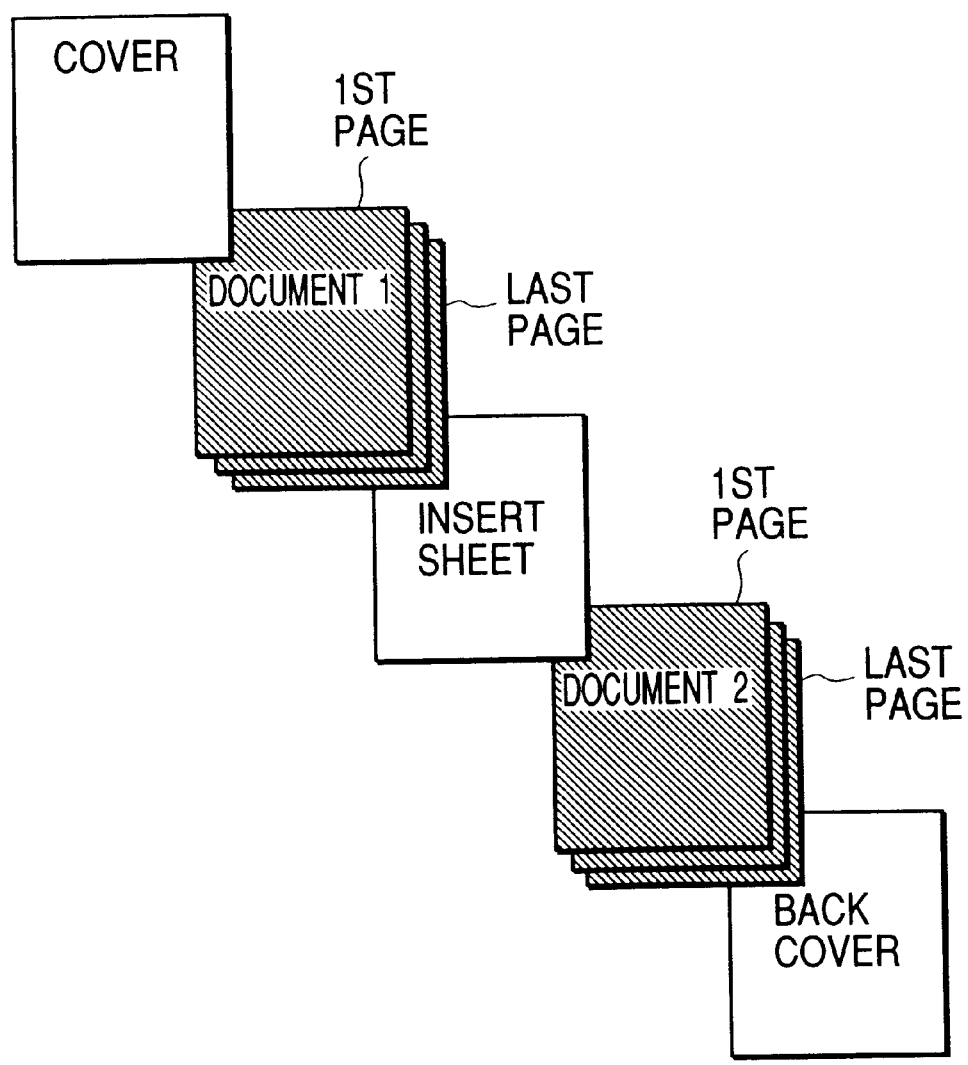
FIG. 54 is a schematic diagram showing an output example of the image input/output apparatus to which the image forming apparatus of the present invention is applicable.

FIG. 54 is a schematic diagram showing an output example of the image input/output apparatus to which the image forming apparatus of the present invention is applicable. This corresponds to the case where the document 1 and the document 2 are selected in this order on the document list display screen 4000 of FIG. 28, the setting is performed on the cover/partition sheet detailed setting screen 6300 of FIG. 50 to add the cover, the partition sheet (insert sheet) and the back cover, and the printing output is performed according to the setting. It should be noted that the operation to obtain the output result of FIG. 54 is controlled by the CPU 3123. As shown in FIG. 54, the CPU 3123 controls the transportation of the partition sheet such that this partition sheet (insert sheet) is positioned between the sheet on which the image of the last page of the document 1 was formed and the sheet on which the image of the first page of the document 2 was formed. Namely, the CPU 3123 controls the sheet feed unit to feed the partition sheet according as the image of the final page of the document 1 was formed, and then controls the image forming unit to form the image of the first page of the document 2.

Hereinafter, a control procedure of an insert sheet output method for the plural documents by the image input/output apparatus to which the image forming apparatus of the present invention is applicable will be explained with reference to FIG. 55.

Figure 55:
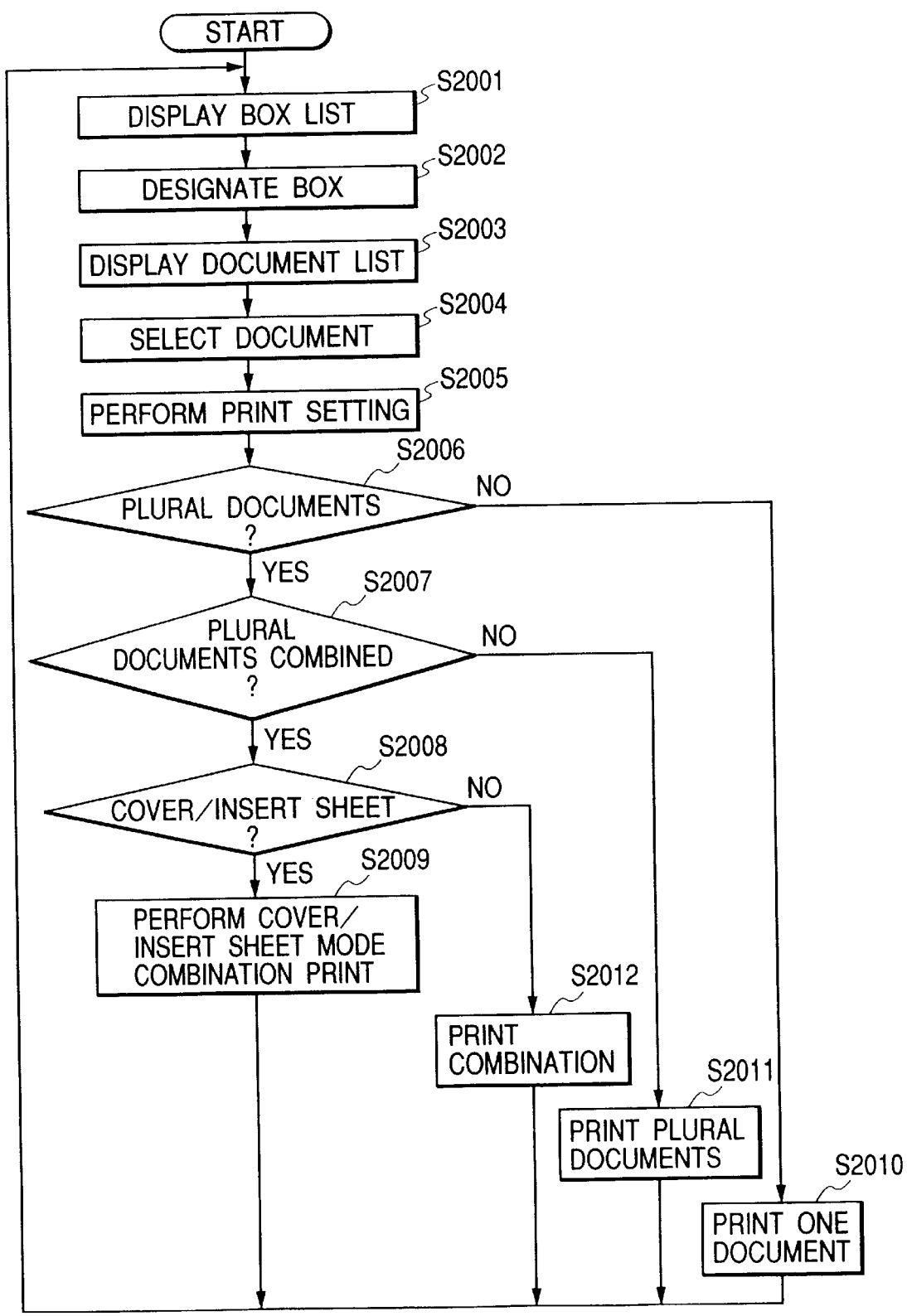
FIG. 55 is a flow chart showing a second control processing procedure of the image input/output apparatus to which the image forming apparatus of the present invention is applicable.

FIG. 55 is a flow chart showing a second control processing procedure of the image input/output apparatus to which the image forming apparatus of the present invention is applicable. This corresponds to the control procedure of the insert sheet output method for the plural documents. It should be noted that the process in FIG. 55 is performed by the CPU 3123 of FIG. 21 on the basis of the program stored in the memory 3124 or not-shown another storage medium, and symbols S2001 to S2012 denote respective steps.

First, in the step S2001, when the memory box function selection key 3805 on the operation unit 3009 is touched, the memory box list display screen 3900 of FIG. 27 is displayed.

Next, in the step S2002, the selection key 3901 corresponding to the memory box "00" is touched, and the flow advances to the step S2003 to display the document list display screen 4000 of FIG. 28.

Next, in the step S2004, the document displayed on the document list display screen 4000 is selected. In this example, as shown in FIG. 29, the plural documents are simultaneously selected by sequentially touching the document selection keys 4006 and 4008. Then, when the print key 4014 is touched, the flow advances to the step S2005.

In the step S2005, the various printing settings (including the settings of document combination, no document combination, cover, back cover, partition sheet, etc.) are performed on the various screens, and the printing start key 4211 is touched after the settings ended. Thus, the flow advances to the step S2006 to start the printing operation.

In the step S2006, it is judged whether or not the plural documents are selected in the step S2004. If judged that only one document is selected, the flow advances to the step S2010. In the step S2010, the selected and designated document is read from the HDD 3006 and subjected to the printing operation. In the printing operation, the above print session 3505 is created, and the image output job 3401 is created.

When the printing operation is started, the under-printing output screen 6600 of FIG. 53 is displayed. After the printing operation for one document ended, the under-printing output screen 6600 is closed, and the flow returns to the step S2001.

Conversely, if judged in the step S2006 that the plural documents are selected in the step S2004, the flow advances to the step S2007 to judge whether or not the document combination for the plural selected documents is designated in the step S2005. If judged that the document combination is not designated (i.e., the document combination button 4208 of FIG. 30 is not touched), the flow advances to the step S2011. In the step S2011, the plural selected and designated documents are sequentially read from the HDD 3006 and subjected to the printing operation. Namely, the print session 3505 is created for each document, the image output job 3401 is created, and the printing operation is performed.

When the printing operation is started, the under-printing output screen 6600 of FIG. 53 is displayed. After the printing operation for all of the plural documents ended in the step S2011, the under-printing output screen 6600 is closed, and the flow returns to the step S2001.

Conversely, if judged in the step S2007 that the document combination for the plural selected documents is designated (i.e., the document combination button 4208 of FIG. 30 is touched) in the step S2005, the flow advances to the step S2008 to judge whether or not insertion of cover/back cover/insert sheet is set. If judged that the insertion of cover/back cover/insert sheet is not set (i.e., the cover/partition sheet key 4204 of FIG. 30 is not touched, or the cover/back cover/insert sheet is not set in the process shown in FIGS. 50 to 52), the flow advances to the step S2012 to sequentially output each page of the plural selected documents. Namely, the print session 3505 is created, the image output job 3401 is created, and the printing operation is performed. In this case, the sum of the page numbers included in the plural selected documents are processed as one image output job.

When the printing operation is started, the under-printing output screen 6600 of FIG. 53 is displayed. After the printing operation for the plural combined documents (i.e., combination document printing) ended in the step S2012, the under-printing output screen 6600 is closed, and the flow returns to the step S2001.

Conversely, if judged in the step S2008 that the insertion of cover/back cover/insert sheet is set (i.e., the cover/ partition sheet key 4204 of FIG. 30 is touched, or the cover/back cover/insert sheet is set in the process shown in FIGS. 50 to 52) in the step S2005, the flow advances to the step S2009 to perform the image forming in a cover/partition sheet/back cover setting mode. Namely, the print session 3505 is created, the image output job 3401 is created, and the printing operation is performed. In this case, the sum of the page numbers included in the plural selected documents are processed as one image output job. Here, the case where the cover, the partition sheet and the back cover are all set will be explained.

First, one cover (blank) is fed from the sheet feed stage designated for the cover and discharged as it is without any image forming. Next, the image data of the document 1 is read and subjected to the image forming. After the image of the document 1 was formed, one partition sheet (blank) is fed from the sheet feed stage designated for the partition sheet and discharged as it is without any image forming. Next, the image data of the document 2 is read and subjected to the image forming. After the image of the document 2 was formed, one back cover (blank) is fed from the sheet feed stage designated for the back cover and discharged as it is without any image forming (FIG. 54). In this case, each of the cover, the partition sheet (insert sheet, and the back cover is acceptable by one piece and plural pieces.

When the printing is started, the under-printing output screen 6600 of FIG. 53 is displayed. After the combination document printing in the cover/partition sheet/back cover setting mode of the step S2009 ended, the under-printing output screen 6600 is closed, and the flow returns to the step S2001.

As explained above, according to the present invention, when the plural documents stored in the image input/output apparatus (hard disk) are collectively printed and output, the insert sheet is inserted between the successive documents without demanding the operator that the operator himself indicates by the operation unit the page position to which the insert sheet should be inserted, whereby it is possible to easily discriminate the boundary between the successive documents.

Further, the stapling process can be designated for the group of the sheets to which the cover and/or the back cover are incorporated or in which the plural documents are combined (e.g., in a case where a stapling mode is set by the user on a mode setting screen (not shown) displayed by touching the sorter key 4205 of FIG. 30), whereby it is possible to easily obtain the printed outputs in the state that the plural documents have been adjusted or aligned. Thus, for example, the plural documents each of which consists of the plural pages can be subjected to the bookbinding as one document. Further, since the insert sheet can be inserted for each document, each document can be sectioned into, e.g., a chapter 1, a chapter 2, and the like.

Further, in the present embodiment, it was explained the example that the cover, the partition sheet and the back cover are discharged as the blank sheets. However, it is possible to form images on the cover, the partition sheet and/or the back cover.

Further, when the two-faced process is being set, if the document 1 consists of odd number pages, it is possible to set the back face of the last page of the document 1 to be blank and insert the partition sheet. Further, in this case, it is possible to form the image of the first page of the document 2 on the inserted partition sheet.

By performing the image forming on the partition sheet, for example, in a case where the feed origin of the partition sheet is set to the sheet feed stage from which a sheet of which kind and color are different from those of the sheet on which the ordinary document is printed is fed, even if the plural documents are collectively output, it is possible to define the boundary between the successive documents by using the kinds and colors of the sheets. In this case, it is possible to evade a waste of the sheet which should be inserted between the successive documents.

Further, by performing the image forming on the cover and/or the back cover, for example, if the feed origin of the cover and/or the back cover is set to the sheet feed stage from which a sheet of which kind and color are different from those of the sheet on which the ordinary document is printed is fed, and if the document corresponding to the cover, the document corresponding to the body and the document corresponding to the back cover are collectively designated, it is possible to easily make an impressive booklet in which only the cover and the back cover are printed on high-quality sheets.

Further, when the plural documents are collectively output, it is possible to continue page numbering even at the boundary of the successive documents without resetting it. Namely, if a mode to form on the sheet a page number together with the image is previously set, the user can select such the mode on the operation unit 3009 (i.e., a not-shown page mode selection means), whereby the above continuous page numbering can be realized.

Thus, for example, in a case where the document 1 including two pages, the document 2 including three pages and the document 3 including two pages are output as one document and thus the image forming is started from the document 1 in due order, when the image of the first page of the document 2 is formed on the sheet, a page number "3" (instead of "1") is formed on this sheet. Similarly, when the image of the first page of the document 3 is formed on the sheet, a page number "6" is formed on this sheet.

Further, when the cover/insert sheet mode is being set, a mode in which the user can select on the operation unit 3009 (not-shown page mode selection means) whether the page number should be added to the cover and/or the insert sheet is previously set. In this case, for example, if it is selected to add the page number to the insert sheet, this page number is added to the insert sheet, and the page numbers of the following pages are thus renumbered. Conversely, if it is selected not to add the page number to the insert sheet, any page number is not added to the insert sheet (in this case, the above example is resultingly obtained).

Further, for example, it is assumed that plural certain documents should be collected as one document in consideration of a macro theme, but the particular themes included in this macro theme are slightly different such as the chapter 1, the chapter 2, and the like. In this case, a demand from the user to reset the page number (restart the page number from "1") at the boundary of the documents is thought. Thus, at least a mode (a second mode) to reset the page number according to the end (boundary) of each document and form the reset number on the sheet and a mode (a first mode) not to reset the page number but to continue the page number even at the end of the document and form the continued number on the sheet are provided, whereby the user can appropriately select either of the first and second modes on the operation unit 3009 (not-shown page mode selection means).

Further, to insert the insert sheet is considered that a possibility that the content and the theme are different between the documents before and after the insert sheet is high. Thus, when the plural documents are combined and output, the image forming apparatus can automatically select and execute the second mode to reset the page number according to the end (boundary) of each document and form the reset number on the sheet, according as the insert sheet insertion mode is set. Further, the image forming apparatus can inhibit from executing a mode itself to add the page number on the sheet.

As described above, even in these cases, the user can select whether or not the page number should be added to the cover and/or the back cover.

In the present embodiment, the combination of the documents stored in the HDD 3006 of the apparatus was mainly explained. However, the present embodiment is not limited to this. Namely, the present embodiment is applicable to the combination of the documents input from the scanner, the combination of the document input from the scanner and the document stored in the HDD 3006, the combination of the plural documents output from a host, and the like.

As described above, according to the present invention, when the plural documents stored in the image input/output apparatus are output, the insert sheet is automatically insert between the successive documents, whereby it is possible to easily section the successive documents.

It should be noted that the image forming apparatus according to the present invention can apply, as the printing method, any of the electrophotographic method, the inkjet method, the thermal transfer method, the sublimation method, and the like.

Further, it should be noted that each of the cover, the insert sheet and the back cover can consist of a single sheet or plural sheets. Further, the number of such the sheets can be set from the operation unit 3009 or the PS/WS 3011.

Hereinafter, the configuration of a data processing program which can be read by the image input/output apparatus according to the present invention will be explained with reference to FIG. 56.

FIG. 56 is a diagram for explaining the memory map of a storage medium which stores the various data processing programs capable of being read by the image input/output apparatus according to the present invention.

It should be noted that, though not shown in the drawings, information such as version information, a creator and the like which manages a program group stored in the storage medium is also stored in the medium. Further, information such as an icon for discriminatively displaying the program and the like which depends on an OS or the like on the program reading side might be stored in the medium.

Further, data depending on various programs are managed as the directory information in the storage medium. Further, in a case where programs to be installed and other data have been compressed, a program or the like used to decompress the programs and the data might be stored in the medium.

The functions shown in FIGS. 25 and 55 in the present embodiment might be executed by a host computer on the basis of a program externally installed. In this case, the present invention is applicable to a case where a group of the information including the programs is supplied to an output apparatus from a storage medium such as a CD-ROM, a flash memory, a floppy disk (FD) or the like, or from an external storage medium through a network.

As described above, it is needless to say that the object of the present invention can be attained in a case where the storage medium recording the program codes of software to realize the functions of the above embodiments is supplied to a system or apparatus, and then a computer (or CPU or MPU) in this system or apparatus reads and executes the stored program codes.

In this case, the program codes themselves read from the storage medium execute the new functions of the present invention, whereby the storage medium storing these program codes constitutes the present invention.

As the storage medium from which the program codes are supplied, for example, a floppy disk, a hard disk, an optical disk, a magnetooptical disk, a CD-ROM, a CD-R, a magnetic tape, a nonvolatile memory card, a ROM, an EEPROM, a silicon disk, or the like can be used.

Further, it is needless to say that the present invention includes not only the case where the functions of the above embodiments are executed by the program codes read by the computer, but also a case where an OS (operating system) or the like running on the computer executes a part or all of the actual processes based on instructions of the program codes and thus the functions of the above embodiments are executed by such the processes.

Further, it is needless to say that the present invention includes a case where the program codes read from the storage medium are once stored in a memory provided in a function expansion board inserted in the computer or a function expansion unit connected to the computer, and then a CPU or the like provided in the function expansion board or the function expansion unit performs all or a part of the actual processes based on instructions of the program codes, whereby the functions of the above embodiments are achieved by such the processes.

Further, the present invention is applicable to a system structured by plural equipment or to an apparatus structured by one equipment. Further, it is needless to say that the present invention is applicable to a case where programs are supplied to the system or the apparatus. In this case, when the storage medium storing the programs represented by the software to attain the present invention is subjected to reading by the system or apparatus, such the system or the apparatus can enjoy the effects of the present invention.

Further, when the programs represented by the software to attain the present invention are downloaded from a data base on a network and read according to a communication program, such the system or the apparatus can enjoy the effects of the present invention.

As explained above, the control means controls the image forming means to collectively print and output the plural documents selected by the document selection means, and the insert sheet insertion means inserts one insert sheet between the successive output documents. Thus, even when the plural documents stored in the image forming apparatus are collectively output, it is possible to easily section the successive documents.

Further, the control means controls the image forming means to collectively print and output the plural documents selected by the document selection means, the cover insertion means inserts one cover before the first document to be output, the insert sheet insertion means inserts one insert sheet between the successive documents to be output, and the back cover insertion means inserts one back cover after the last document to be output. Thus, even when the plural documents stored in the image forming apparatus are collectively output, it is possible to easily make the booklet in which the boundary of the documents can be easily discriminated and also to which the cover and the back cover are added.

Therefore, even when the plural documents stored in the image forming apparatus are collectively output, the insert sheet is automatically inserted between the successive documents, whereby it is possible to easily discriminate the boundary between the successive documents.

It should be noted that the above first to fourth embodiments can be appropriately combined with others.

What is claimed is:

1. An image forming apparatus that includes an image forming unit for performing a print process, said apparatus comprising:

a plural-document selector, adapted to select plural desired documents from among mutually independent plural documents capable of being printed by the image forming unit;

a first instruction receiver, adapted to receive a first instruction to collectively instruct printing of the plural desired documents selected by said plural-document selector from among the mutually independent plural documents capable of being printed by the image forming unit;

a controller, adapted to cause the image forming unit to print the plural desired documents selected by said plural-document selector, in accordance with the first instruction; and a second instruction receiver, adapted to receive a second instruction to cause processing of the plural desired documents selected by said plural-document selector as data included in one document, wherein said controller controls so as to cause printing of the plural desired documents selected by said plural-document selector, in response to the first instruction, as the data included in one document, in a case where the second instruction is received together with the first instruction, and wherein said controller controls so as to not cause printing of the plural desired documents selected by said plural-document selector, in response to the first instruction, as the data included in one document, but instead to cause printing of the plural desired documents selected by said plural-document selector as documents respectively different from each other, in a case where the second instruction is not received.

2. An apparatus according to claim 1, wherein the image forming unit includes a binder for binding sheets, wherein said apparatus further comprises a binding instruction receiver, adapted to receive a binding instruction to instruct execution of a binding process by the binder, and wherein, when causing the binder to execute the binding process in response to the binding instruction, said controller controls so as to permit the binder to bind as one sheaf sheets on which images of the plural desired documents selected by said plural-document selector and printed in response to the first instruction have been printed, in a case where the second instruction is received together with the first instruction, and controls so as to inhibit the binder from binding as one sheaf the sheets on which the images of the plural desired documents selected by said plural-document selector and printed in response to the first instruction have been printed, in a case where the second instruction is not received.

3. An apparatus according to claim 2, wherein, when said controller causes the binder to execute the binding process in response to the binding instruction, said controller controls so as to permit binding of the sheets on which the images of the plural desired documents selected by said plural-document selector and printed in response to the first instruction have been printed, independently for each document, in a case where the second instruction is not received.

4. An apparatus according to claim 1, wherein the image forming unit includes a function to execute a two-sided print mode to perform image formation on front and back sides of a sheet, wherein said apparatus further comprises a two-sided print instruction receiver, adapted to receive a two-sided print instruction instructing execution of the two-sided print mode by the image forming unit, and wherein, when a first document and a second document are mutually independent and are selected by said plural-document selector, and the image forming unit is caused to execute said two-sided print mode in response to the two-sided print instruction, said controller controls printing of the first document and the second document by permitting printing of an image of a page of the second document on a back side of a sheet on which an image of a page of the first document has been printed, in a case where the second instruction is received together with the first instruction, and controls printing of the first document and the second document by inhibiting printing of an image of a page of the second document on a back side of a sheet on which an image of a page of the first document has been printed, in a case where the second instruction is not received.

5. An apparatus according to claim 4, wherein, when the first document and the second document are selected by said plural-document selector and the image forming unit is caused to execute the two-sided print mode in response to the two-sided print instruction, said controller controls printing of the first document and the second document by permitting printing of an image of a first page of the second document on a back side of a sheet on which an image of a last page of the first document has been printed, in a case where the second instruction is received together with the first instruction.

6. An apparatus according to claim 4, wherein, when the first document and the second document are selected by said plural-document selector and the image forming unit is caused to execute the two-sided print mode in response to the two-sided print instruction, said controller controls printing of the first document and the second document so that an image of a last page of the first document and an image of a first page of the second document are respectively printed on mutually different sheets, in a case where the second instruction is not received.

7. An apparatus according to claim 6, wherein, when the image forming unit is caused to execute the two-sided print mode in response to the two-sided print instruction, said controller controls printing of the first document and the second document so that a back side of a sheet on which an image of a last page of the first document that includes odd-number pages has been printed is blank, in a case where the second instruction is not received.

8. An apparatus according to claim 1, wherein said plural-document selector includes a setting unit, adapted to set a print order of the plural desired documents selected by said plural-document selector, in case of selecting the plural desired documents from among the mutually independent plural documents capable of being printed by the image forming unit, and wherein, in a case where the image forming unit is caused to execute, according to the first instruction, the printing of the plural desired documents selected by said plural-document selector, said controller causes the image forming unit to print the plural desired documents selected by said plural-document selector based on the first instruction, in a print order set by the setting unit.

9. An apparatus according to claim 1,
wherein the image forming unit includes a function to execute a layout print mode to form images of plural pages on a same side of a single sheet,
wherein said apparatus further comprises a layout print instruction receiver, adapted to receive a layout print instruction to instruct execution of the layout print mode by the image forming unit, and
wherein, when a first document and a second document that are mutually independent are selected by said plural-document selector, and the image forming unit is caused to execute the layout print mode in response to the layout print instruction, said controller controls printing of the first document and the second document by permitting printing of an image of a page included in the first document and an image of a page included in the second document on a same side of a single sheet, in a case where the second instruction is received together with the first instruction, and controls printing of the first document and the second document by inhibiting printing of an image of a page of the first document and an image of a page of the second document on a same side of a single sheet, in a case where the second instruction is not received.

10. An apparatus according to claim 9, wherein, when the first document and the second document are selected by said plural-document selector, and the image forming unit is caused to execute the layout print mode in response to the layout print instruction, said controller controls printing of the first document and the second document by permitting printing of an image of a last page of the first document and an image of a first page of the second document on a same side of a single sheet, in a case where the second instruction is received together with the first instruction.

11. An apparatus according to claim 9, wherein, when the image forming unit is caused to execute the layout print mode in response to the layout print instruction, said controller controls printing of the first document and the second document so that images of plural pages of the second document are formed on a same side of a single sheet different from a same side of a single sheet on which images of plural pages of the first document are formed, in a case where the second instruction is not received.

12. An apparatus according to claim 1,
wherein the image forming unit selectively feeds a sheet and a partition sheet, and
wherein, when a first document and a second document are selected by said plural-document selector, said controller controls feeding of the partition sheet so that the partition sheet is arranged between a sheet on which an image of the first document has been formed and a sheet on which an image of the second document has been formed, in a case where the second instruction is received together with the first instruction.

13. An apparatus according to claim 12, wherein, when the first document and the second document are selected by said plural-document selector, said controller causes feeding of the partition sheet according to when an image of a last page of the first document is formed, and then causes an image of a first page of the second document to be formed, in a case where the second instruction is received together with the first instruction.

14. An apparatus according to claim 1,
wherein said controller causes the image forming unit to restart a print process of the image forming unit, if the print process has been interrupted, and
wherein, when a first document, a second document, and a third document are selected by said plural-document selector, and the print process of the image forming unit is interrupted after print processing of the first document and the second document has ended and before print processing of the third document has ended, said controller causes the image forming unit to restart the print process from the first document among the first, second, and third documents selected by said plural-document selector, in a case where the second instruction is received together with the first instruction, and causes the image forming unit to restart the print process from the third document among the first, second, and third documents selected by said plural-document selector, in a case where the second instruction is not received.

15. An apparatus according claim 1, further comprising a cancel instruction receiver, adapted to receive a cancel instruction to instruct cancellation of a print process of the image forming unit,
wherein said controller controls to cancel the print process by said image forming unit in response to said cancel instruction, and
wherein, when the plural documents are selected by said plural-document selector and the cancel instruction is received during the print process of any of the plural documents selected by said plural-document selector, said controller causes cancellation of print process of all of the plural documents selected by said plural-document selector, in a case where the second instruction is received together with the first instruction, and causes cancellation of a print process of a document among the plural documents selected by said plural-document selector and being subjected to the print process by the image forming unit but not cause cancellation of print processes of others of the plural documents selected by said plural-document selector, in a case where the second instruction is not received.

16. An apparatus according to claim 1,
wherein the image forming unit includes a function to execute a page number print mode to print a page number on a sheet on which an image of a document to be printed is formed,
wherein said apparatus further comprises a page number print instruction receiver, adapted to receive a page number print instruction to instruct execution of the page number print mode by the image forming unit, and
wherein, when the page number print mode is executed in response to the page number print instruction, said controller causes page numbers for images of the plural documents selected by said plurality-document selector to be printed, in response to the first instruction, to be applied continuously among those plural documents without resetting a page number for each document, in a case where the second instruction is received together with the first instruction, and cause page numbers of images of the plural documents selected by said plural-document selected to be printed, in response to the first instruction, not be applied continuously among those plural documents and resetting a page number for each document, in a case where the second instruction is not received.

17. A control method of an image forming apparatus that includes an image forming unit for performing a print process, said method comprising:
- a plural-document selection step of selecting plural desired documents from among mutually independent plural documents capable of being printed by the image forming unit;
- a first instruction reception step of receiving a first instruction to collectively instruct printing of the plural desired documents selected in said plural-document selection step;
- a control step of causing the image forming unit to print the plural desired documents selected in said plural-document selection step, in accordance with the first instruction; and
- a second instruction reception step of receiving a second instruction to cause processing of the plural desired documents selected in said plural-document selection step as data included in one document,
- wherein said control step includes causing the plural desired documents selected in said plural-document selection step to be printed, in response to the first instruction, as the data included in one document, in a case where the second instruction is received together with the first instruction, and causing the plural desired documents selected in said plural-document selection step not to be printed, in response to the first instruction, as the data included in one document, but to print the plural desired documents as documents respectively different from each other, in a case where the second instruction is not received.

18. A method according to claim 17,
- wherein the image forming unit includes a binder for binding sheets,
- wherein said method further comprises a binding instruction reception step of receiving a binding instruction to instruct execution of a binding process by the binder, and
- wherein, when the binder is caused to execute the binding process in response to the binding instruction, said control step includes controlling to permit the binder to bind as one sheaf sheets on which images of the plural desired documents selected in said plural-document selection step and printed in response to the first instruction have been printed, in a case where the second instruction is received together with the first instruction, and includes controlling to inhibit the binder from binding as one sheaf the sheets on which the images of the plural desired documents selected in said plural-document selection step and printed in response to the first instruction have been printed, in a case where the second instruction is not received.

19. A method according to claim 18, wherein, when the binder is caused to execute the binding process in response to the binding instruction, said control step includes controlling to permit binding of the sheets on which the images of the plural desired documents selected in said plural-document selection step and printed in response to the first instruction have been printed, independently for each document, in a case where the second instruction is not received.

20. A method according to claim 17,
- wherein the image forming unit includes a function to execute a two-sided print mode to perform image formation on front and back sides of a sheet,
- wherein said method further comprises a two-sided print instruction reception step of receiving a two-sided print instruction to instruct execution of the two-sided print mode by the image forming unit, and
- wherein, when a first document and a second document are mutually independent and are selected in said plural-document selection step, and the image forming unit is caused to execute the two-sided print mode in response to the two-sided print instruction, said control step includes controlling printing of the first document and the second document by permitting printing of an image of a page of the second document on a back side of a sheet on which an image of a page of the first document has been printed, in a case where the second instruction is received together with the first instruction, and controlling printing of the first document and the second document by inhibiting printing of an image of a page of the second document on a back side of a sheet on which an image of a page of the first document has been printed, in a case where the second instruction is not received.

21. A method according to claim 20, wherein, when the first document and the second document are selected in said plural-document selection step, and the image forming unit is caused to execute the two-sided print mode in response to the two-sided print instruction, said control step includes controlling printing of the first document and the second document by permitting printing of an image of a first page of the second document on a back side of a sheet on which an image of a last page of the first document has been printed, in a case where the second instruction is received together with the first instruction.

22. A method according to claim 20, wherein, when the first document and the second document are selected in said plural-document selection step, and the image forming unit is caused to execute the two-sided print mode in response to the two-sided print instruction, said control step includes controlling printing of the first document and the second document so that an image of a last page of the first document and an image of a first page of the second document are respectively printed on mutually different sheets, in a case where the second instruction is not received.

23. A method according to claim 22, wherein, when the image forming unit is caused to execute the two-sided print mode in response to the two-sided print instruction, said control step includes controlling printing of the first document and the second document so that a back side of a sheet on which an image of a last page of the first document that includes odd-number pages has been printed is blank, in a case where the second instruction is not received.

24. A method according to claim 17,
- wherein said plural-document selection step includes a setting step of setting a print order of the plural desired documents selected in said plural-document selection step, and
- wherein, in a case where the image forming unit is caused to execute, based on the first instruction, printing of the plural desired documents selected in said plural-document selection step, said control step includes causing the image forming unit to print the plural desired documents selected in said plural-document selection step based to the first instruction, according to the print order set in the setting step.

25. A method according to claim 17,
- wherein the image forming unit includes a function to execute a layout print mode to form images of plural pages on a same side of a single sheet,
- wherein said method further comprises a layout print instruction reception step of receiving a layout print instruction to instruct execution of the layout print mode by the image forming unit, and wherein, when a first document and a second document that are mutually independent are selected in said plural-document selection step, and the image forming unit is caused to execute the layout print mode in response to the layout print instruction, said control step includes controlling printing of the first document and the second document by permitting printing of an image of a page included in the first document and an image of a page included in the second document on a same side of a single sheet, in a case where the second instruction is received together with the first instruction, and controlling printing of the first document and the second document by inhibiting printing of an image of a page of the first document and an image of a page of the second document on a same side of a single sheet, in a case where the second instruction is not received.

26. A method according to claim 25, wherein, when the first document and the second document are selected in said plural-document selection step, and the image forming unit is caused to execute the layout print mode in response to the layout print instruction, said control step includes controlling printing of the first document and the second document by permitting printing of an image of a last page of the first document and an image of a first page of the second document on a same side of a single sheet, in a case where the second instruction is received together with the first instruction.

27. A method according to claim 25, wherein, when the image forming unit is caused to execute the layout print mode in response to the layout print instruction, said control step includes controlling printing of the first document and the second document so that images of plural pages of the second document are formed on a same side of a single sheet different from a same side of a single sheet on which images of plural pages of the first document are formed, in a case where the second instruction in not received.

28. A method according to claim 17,
wherein, the image forming unit selectively feeds a sheet and a partition sheet, and
wherein, when a first document and a second document are selected in said plural-document selection step, said control step includes controlling feeding of the partition sheet so that the partition sheet is arranged between a sheet on which an image of the first document has been formed and a sheet on which an image of the second document has been formed, in a case where the second instruction is received together with the first instruction.

29. A method according to claim 28, wherein, when the first document and the second document are selected in said plural-document selection step, said control step includes causing feeding of the partition sheet based on when an image of a last page of the first document is formed, and then causing an image of a first page of the second document to be formed, in a case where the second instruction is received together with the first instruction.

30. A method according to claim 17,
wherein said control step includes controlling the image forming unit to restart a print process of the image forming unit, if the print process has been interrupted and
wherein, when a first document, a second document, and a third document are selected in said plural-document selection step, and a print process by the image forming unit is interrupted after print processes of the first document and the second document have ended and before a print process of the third document ends, said control step includes causing print processing to restart from the first document among the first, second, and third documents selected in said plural-document selection step, in a case where the second instruction is received together with the first instruction, and causing print processing to restart from the third document among the first, second, and third documents selected in said plural-document selection step, in a case where the second instruction is not received.

31. A method according to claim 17, further comprising a cancel instruction reception step of receiving a cancel instruction instructing cancellation of a print process of the image forming unit,
wherein said control step includes causing a print process of the image forming unit to be canceled in response to the cancel instructions, and
wherein, when the plural desired documents are selected in said plural-document selection step and the cancel instruction is received during a print process of any of the plural desired documents, said control step includes causing print processes of all of the plural desired documents selected in said plural-document selection step to be canceled, in a case where the second instruction is received together with the first instruction, and causing a print process of a desired document among the plural desired documents selected in said plural-document selection step and being subjected to print processing by the image forming unit to be canceled, but not causing print processes of others of the plural desired documents selected in said plural-document selection step to be canceled, in a case where the second instruction is not received.

32. A method according to claim 17,
wherein said image forming unit includes a function to execute a page number to print mode to print a page number on a sheet on which an image of a document to be printed is formed,
wherein said method further comprises a page number print instruction reception step of receiving a page number print instruction instructing execution of the page number print mode by the image forming unit, and
wherein, when the page number print mode is executed in response to the page number print instructions, said control step causes page numbers of images of the plural desired documents to be printed in response to the first instruction and selected in said plural-document selection step to be applied continuously among the plural desired documents without resetting a page number for each document, in a case where the second instruction is received together with the first instruction, and causes page numbers of images of the plural desired documents to be printed in response to the first instruction and selected in said plural-document selection step not be applied continuously among the plural desired documents and resetting a page number for each document, in a case where the second instruction is not received.

33. A storage medium storing a computer-readable program for executing a control method for an image forming apparatus that includes an image forming unit for performing a print process, the program comprising:
code for a plural-document selection step of selecting plural desired documents from among mutually independent plural documents capable of being printed by the image forming unit;

code for a first instruction reception step of receiving a first instruction to collectively instruct printing of the plural desired documents selected in the plural-document selection step;

code for a control step of causing the image forming unit to print the plural desired documents selected in the plural-document selection step, in accordance with the first instruction; and code for a second instruction reception step of receiving a second instruction to cause processing of the plural desired documents selected in the plural-document selection step as data included in one document, wherein the control step includes causing the plural desired documents selected in the plural-document selection step to be printed, in response to the first instruction, as the data included in one document, in a case where the second instruction is received together with the first instruction, and causing the plural desired documents selected in the plural-document selection step not to be printed, in response to the first instruction, as the data included in one document, but causing the plural desired documents to be printed as documents respectively different from each other, in a case where the second instruction is not received.

* * * * *

UNITED STATES PATENT AND TRADEMARK OFFICE
CERTIFICATE OF CORRECTION

PATENT NO. : 6,512,899 B2
DATED : January 28, 2003
INVENTOR(S) : Bungo Shimada et al.

It is certified that error appears in the above-identified patent and that said Letters Patent is hereby corrected as shown below:

Column 9,
Line 51, "a" should read -- an --.

Column 13,
Line 42, "joe" should read -- job --.

Column 22,
Line 62, "an" should read -- a --.

Column 24,
Line 5, "to hold" should read -- to hold priority of processing order of the session. A session status field 3704 is to hold an execution state of the --.

Column 25,
Line 64, "memory" should read -- memory. --

Column 31,
Line 7, "such the" should read -- such a --.

Column 36,
Line 3, "is touched" should be deleted.

Column 37,
Line 23, "such the" should read -- such a --.

Column 42,
Lines 5 and 15, "such the" should read -- such --.

Column 47,
Line 24, "sheet (insert sheet," should read -- sheet, (inserted sheet) --.

Column 49,
Line 33, "such the" should read -- such --.

Column 50,
Lines 19 and 29, "such the" should read -- such --; and
Line 31, "equipment" should read -- equipments --.

UNITED STATES PATENT AND TRADEMARK OFFICE
CERTIFICATE OF CORRECTION

PATENT NO.    : 6,512,899 B2
DATED         : January 28, 2003
INVENTOR(S)   : Bungo Shimada et al.

It is certified that error appears in the above-identified patent and that said Letters Patent is hereby corrected as shown below:

<u>Column 57,</u>
Line 64, "interrupted" should read -- interrupted, --.

Signed and Sealed this

Thirtieth Day of December, 2003

JAMES E. ROGAN
*Director of the United States Patent and Trademark Office*